United States Patent
Byröd et al.

(10) Patent No.: US 12,508,234 B2
(45) Date of Patent: *Dec. 30, 2025

(54) PHARMACEUTICAL FORMULATION OF ODEVIXIBAT

(71) Applicant: Albireo AB, Gothenburg (SE)

(72) Inventors: Eva Byröd, Mölndal (SE); Per-Göran Gillberg, Mölndal (SE); Anna-Maria Tivert, Gothenburg (SE); Rikard Bryland, Limhamn (SE); Ann-Charlotte Dahlquist, Lund (SE); Jessica Elversson, Dalby (SE); Nils Ove Gustafsson, Löddeköpinge (SE); Robert Lundqvist, Hälsö (SE); Ingvar Ymen, Saltsjö-Boo (SE); Martin Bohlin, Johanneshov (SE)

(73) Assignee: ALBIREO AB, Gothenburg (SE)

( * ) Notice: Subject to any disclaimer, the term of this patent is extended or adjusted under 35 U.S.C. 154(b) by 282 days.

This patent is subject to a terminal disclaimer.

(21) Appl. No.: 18/475,930

(22) Filed: Sep. 27, 2023

(65) Prior Publication Data

US 2024/0092748 A1    Mar. 21, 2024

Related U.S. Application Data

(62) Division of application No. 16/477,160, filed as application No. PCT/SE2019/050603 on Jun. 20, 2019, now Pat. No. 11,802,115.

(30) Foreign Application Priority Data

Jun. 20, 2018  (SE) .................................... 1850761-6
Jun. 20, 2018  (SE) .................................... 1850762-4

(51) Int. Cl.
| | | |
|---|---|---|
| A61K 9/50 | (2006.01) | |
| A61K 9/00 | (2006.01) | |
| A61K 9/10 | (2006.01) | |
| A61K 9/16 | (2006.01) | |
| A61K 9/48 | (2006.01) | |
| A61K 31/554 | (2006.01) | |
| A61P 1/16 | (2006.01) | |
| C07D 285/36 | (2006.01) | |

(52) U.S. Cl.
CPC ............ *A61K 9/5047* (2013.01); *A61K 9/009* (2013.01); *A61K 9/10* (2013.01); *A61K 9/4808* (2013.01); *A61K 9/4816* (2013.01); *A61K 9/4866* (2013.01); *A61K 9/5042* (2013.01); *A61K 9/5078* (2013.01); *A61K 9/5089* (2013.01); *A61K 31/554* (2013.01); *C07D 285/36* (2013.01); *C07B 2200/13* (2013.01)

(58) Field of Classification Search
None
See application file for complete search history.

(56) References Cited

U.S. PATENT DOCUMENTS

| | | |
|---|---|---|
| 3,539,380 A | 11/1970 | Johnson |
| 4,507,235 A | 3/1985 | Wunsch |
| 5,167,965 A | 12/1992 | Schulz |
| 5,384,130 A | 1/1995 | Kamada |
| 5,663,165 A | 9/1997 | Brieaddy |
| 5,723,458 A | 3/1998 | Brieaddy et al. |
| 5,811,388 A | 9/1998 | Friend et al. |
| 5,817,652 A | 10/1998 | Brieaddy et al. |
| 5,900,233 A | 5/1999 | Day |
| 5,910,494 A | 6/1999 | Brieaddy |
| 5,976,811 A | 11/1999 | Mullner et al. |
| 5,994,391 A | 11/1999 | Lee et al. |
| 5,998,400 A | 12/1999 | Brieaddy et al. |
| 6,020,330 A | 2/2000 | Enhsen et al. |
| 6,069,167 A | 5/2000 | Sokol |
| 6,277,831 B1 | 8/2001 | Frick et al. |
| 6,346,527 B1 | 2/2002 | Takanaka et al. |
| 6,355,672 B1 | 3/2002 | Yasuma et al. |
| 6,387,924 B2 | 5/2002 | Lee et al. |
| 6,387,944 B1 | 5/2002 | Frick et al. |
| 6,426,340 B1 | 7/2002 | Gibson et al. |
| 6,562,860 B1 | 5/2003 | Keller et al. |
| 6,635,280 B2 | 10/2003 | Shell et al. |

(Continued)

FOREIGN PATENT DOCUMENTS

| | | |
|---|---|---|
| DE | 3930168 A1 | 3/1991 |
| DE | 19825804 C2 | 8/2000 |

(Continued)

OTHER PUBLICATIONS

[No Author Listed], "Practical Pharmaceutical Preparation Technology," People's Medical Publishing House, Jan. 1999, 286-287 (Machine Translation).

AccessData.FDA.gov [online], "LIVMARLI® (maralixibat) oral solution, Initial U.S. Approval: 2021," FDA Drug Label (Reference ID: 5345945), last revised on Mar. 2024, 30 pages.

Adams et al., "Hepascore: an accurate validated predictor of liver fibrosis in chronic hepatitis C infection," Clin. Chem., 2005, 51(10):1867-1873.

(Continued)

*Primary Examiner* — Bethany P Barham
*Assistant Examiner* — Peter Anthopolos
(74) *Attorney, Agent, or Firm* — Fish & Richardson P.C.

(57) ABSTRACT

The invention relates to a pharmaceutical formulation, e.g. a paediatric formulation, of odevixibat, which comprises a plurality of small particles. The formulation may be used in the treatment of liver diseases such as bile acid-dependent liver diseases, and particularly cholestatic liver diseases such as biliary atresia, progressive familial intrahepatic cholestasis (PFIC), Alagille syndrome (ALGS) and paediatric cholestatic pruritus. The invention also relates to a process for the preparation of the pharmaceutical formulation.

20 Claims, 6 Drawing Sheets

Specification includes a Sequence Listing.

(56) References Cited

U.S. PATENT DOCUMENTS

| | | | |
|---|---|---|---|
| 6,642,269 B2 | 11/2003 | Frick et al. | |
| 6,676,979 B2 | 1/2004 | Marlett et al. | |
| 6,784,201 B2 | 8/2004 | Lee et al. | |
| 6,906,058 B2 | 6/2005 | Starke et al. | |
| 6,943,189 B2 | 9/2005 | Keller et al. | |
| 7,019,023 B2 | 3/2006 | Frick et al. | |
| 7,125,864 B2 | 10/2006 | Starke et al. | |
| 7,132,416 B2 | 11/2006 | Starke et al. | |
| 7,132,557 B2 | 11/2006 | Wilkes et al. | |
| 7,192,945 B2 | 3/2007 | Starke et al. | |
| 7,192,946 B2 | 3/2007 | Starke et al. | |
| 7,192,947 B2 | 3/2007 | Starke et al. | |
| 7,226,943 B2 | 6/2007 | Starke et al. | |
| 7,238,684 B2 | 7/2007 | Starke et al. | |
| 7,514,421 B2 | 4/2009 | Abrahamsson et al. | |
| 7,615,536 B2 | 11/2009 | Frick et al. | |
| 7,767,229 B1 | 8/2010 | Milne et al. | |
| 7,923,468 B2 | 4/2011 | Frick et al. | |
| 7,939,061 B2 | 5/2011 | Prakash et al. | |
| 7,956,085 B2 | 6/2011 | Frick et al. | |
| 8,048,413 B2 | 11/2011 | Huguet | |
| 8,067,584 B2 | 11/2011 | Starke et al. | |
| 8,101,583 B2 | 1/2012 | Glombik et al. | |
| 8,106,023 B2 | 1/2012 | Glombik et al. | |
| 9,295,677 B2 | 3/2016 | Ling et al. | |
| 9,339,480 B2 | 5/2016 | Young et al. | |
| 9,409,875 B2 | 8/2016 | Bohlin et al. | |
| 9,684,018 B2 | 6/2017 | Horanzy | |
| 9,688,720 B2 | 6/2017 | Gillberg et al. | |
| 9,694,018 B1 | 7/2017 | Gillberg et al. | |
| 9,701,649 B2 | 7/2017 | Bohlin et al. | |
| 9,745,276 B2 | 8/2017 | Bohlin et al. | |
| 9,872,844 B2 | 1/2018 | Zernel et al. | |
| 10,000,528 B2 | 6/2018 | Gillberg et al. | |
| 10,011,633 B2 | 7/2018 | Gillberg et al. | |
| 10,093,697 B2 | 10/2018 | Gillberg et al. | |
| 10,183,920 B2 | 1/2019 | Ymen et al. | |
| 10,221,212 B2 | 3/2019 | Gillberg et al. | |
| 10,428,109 B1 | 10/2019 | Bhat et al. | |
| 10,487,111 B2 | 11/2019 | Gillberg et al. | |
| 10,709,755 B2 | 7/2020 | Ando et al. | |
| 10,793,534 B2 | 10/2020 | Gillberg | |
| 10,941,127 B2 | 3/2021 | Gilberg et al. | |
| 10,975,045 B2 | 4/2021 | Gillberg et al. | |
| 10,975,046 B2 | 4/2021 | Lundqvist et al. | |
| 10,981,952 B2 | 4/2021 | Gilberg et al. | |
| 10,995,115 B2 | 5/2021 | Bhat et al. | |
| 11,014,898 B1 | 5/2021 | Gillberg et al. | |
| 11,111,224 B2 | 9/2021 | Gillberg | |
| 11,180,465 B2 | 11/2021 | Gillberg et al. | |
| 11,225,466 B2 | 1/2022 | Gillberg et al. | |
| 11,261,212 B2 | 3/2022 | Gillberg et al. | |
| 11,267,794 B2 | 3/2022 | Gillberg et al. | |
| 11,306,064 B2 | 4/2022 | Gillberg et al. | |
| 11,365,182 B2 | 6/2022 | Lundqvist et al. | |
| 11,377,429 B2 | 7/2022 | Gillberg et al. | |
| 11,572,350 B1 | 2/2023 | Gillberg et al. | |
| 11,583,539 B2 | 2/2023 | Gillberg et al. | |
| 11,603,359 B2 | 3/2023 | Gillberg et al. | |
| 11,708,340 B2 | 7/2023 | Gillberg et al. | |
| 11,732,006 B2 | 8/2023 | Gillberg et al. | |
| 11,773,071 B2 | 10/2023 | Gillberg et al. | |
| 11,801,226 B2 | 10/2023 | Byrod et al. | |
| 11,802,115 B2 | 10/2023 | Byrod et al. | |
| 11,844,822 B2 | 12/2023 | Ando et al. | |
| 11,859,851 B2 | 1/2024 | Voysey | |
| 11,891,368 B2 | 2/2024 | Gillberg et al. | |
| 12,024,495 B2 | 7/2024 | Gillberg et al. | |
| 12,060,338 B2 | 8/2024 | Gillberg et al. | |
| 12,091,394 B2 | 9/2024 | Lundqvist et al. | |
| 12,134,606 B2 | 11/2024 | Gillberg et al. | |
| 2002/0142054 A1 | 10/2002 | Marlett et al. | |
| 2003/0125316 A1 | 7/2003 | Keller et al. | |
| 2003/0143183 A1 | 7/2003 | Knudsen et al. | |
| 2003/0153541 A1 | 8/2003 | Dudley et al. | |
| 2003/0166927 A1 | 9/2003 | Starke et al. | |
| 2003/0199515 A1 | 10/2003 | Mudipalli et al. | |
| 2003/0215843 A1 | 11/2003 | Poupon et al. | |
| 2004/0014806 A1 | 1/2004 | Bhat et al. | |
| 2004/0038862 A1 | 2/2004 | Goodwin et al. | |
| 2004/0062745 A1 | 4/2004 | Green et al. | |
| 2004/0067933 A1 | 4/2004 | Starke et al. | |
| 2004/0077625 A1 | 4/2004 | Tremont et al. | |
| 2004/0082647 A1 | 4/2004 | Babiak et al. | |
| 2004/0176438 A1 | 9/2004 | Tremont et al. | |
| 2005/0009805 A1 | 1/2005 | Sasahara et al. | |
| 2005/0038009 A1 | 2/2005 | Starke et al. | |
| 2005/0113362 A1 | 5/2005 | Lindstedt et al. | |
| 2005/0118326 A1 | 6/2005 | Anfinsen | |
| 2005/0124557 A1 | 6/2005 | Lindqvist | |
| 2005/0171204 A1 | 8/2005 | Lindstedt et al. | |
| 2005/0197376 A1 | 9/2005 | Kayakiri et al. | |
| 2005/0215882 A1 | 9/2005 | Chenevert et al. | |
| 2005/0266080 A1 | 12/2005 | Desai et al. | |
| 2005/0282822 A1 | 12/2005 | Alstermark et al. | |
| 2005/0287178 A1 | 12/2005 | Steed | |
| 2006/0083790 A1 | 4/2006 | Anderberg et al. | |
| 2007/0197522 A1 | 8/2007 | Edwards et al. | |
| 2008/0207592 A1 | 8/2008 | Frick et al. | |
| 2008/0300171 A1 | 12/2008 | Balkan et al. | |
| 2009/0131395 A1 | 5/2009 | Antonelli et al. | |
| 2010/0130472 A1 | 5/2010 | Young et al. | |
| 2010/0286122 A1 | 11/2010 | Belyk | |
| 2011/0003782 A1 | 1/2011 | Pellicciari | |
| 2011/0152204 A1 | 6/2011 | Gedulin et al. | |
| 2011/0294767 A1 | 12/2011 | Gedulin et al. | |
| 2012/0114588 A1 | 5/2012 | Starke et al. | |
| 2012/0157399 A1 | 6/2012 | Young et al. | |
| 2013/0029938 A1 | 1/2013 | Aquino et al. | |
| 2013/0059807 A1 | 3/2013 | Gedulin et al. | |
| 2013/0108573 A1 | 5/2013 | Gedulin et al. | |
| 2013/0109671 A1* | 5/2013 | Gedulin | A61K 9/1617 514/249 |
| 2013/0225511 A1 | 8/2013 | Gillberg et al. | |
| 2013/0236541 A1* | 9/2013 | Gillberg | A61P 1/12 424/463 |
| 2014/0275090 A1 | 9/2014 | Gedulin et al. | |
| 2015/0031636 A1 | 1/2015 | Gillberg et al. | |
| 2015/0031637 A1 | 1/2015 | Gillberg et al. | |
| 2016/0039777 A1 | 2/2016 | Bohlin et al. | |
| 2016/0146715 A1 | 5/2016 | Shim et al. | |
| 2016/0193277 A1 | 7/2016 | Gillberg et al. | |
| 2016/0194353 A1 | 7/2016 | Gillberg et al. | |
| 2016/0229822 A1 | 8/2016 | Bohlin | |
| 2016/0237049 A1 | 8/2016 | Bohlin | |
| 2017/0143738 A1 | 5/2017 | Ando et al. | |
| 2017/0143783 A1 | 5/2017 | Ando et al. | |
| 2017/0182059 A1 | 6/2017 | Gillberg et al. | |
| 2017/0182115 A1 | 6/2017 | Gillberg et al. | |
| 2017/0240516 A1 | 8/2017 | Ymen et al. | |
| 2018/0022776 A1 | 1/2018 | Gillberg et al. | |
| 2018/0030088 A1 | 2/2018 | Gillberg et al. | |
| 2018/0030089 A1 | 2/2018 | Gillberg et al. | |
| 2018/0140219 A1 | 5/2018 | Yin et al. | |
| 2018/0162904 A1 | 6/2018 | Gillberg et al. | |
| 2018/0362577 A1 | 12/2018 | Gillberg et al. | |
| 2019/0177286 A1 | 6/2019 | Ymen et al. | |
| 2019/0276493 A1 | 9/2019 | Bhat et al. | |
| 2019/0367467 A1 | 12/2019 | Gillberg et al. | |
| 2020/0002299 A1 | 1/2020 | Lundqvist | |
| 2020/0109165 A1 | 4/2020 | Bhat et al. | |
| 2020/0140484 A1 | 5/2020 | Gillberg et al. | |
| 2020/0247768 A1 | 8/2020 | Gillberg et al. | |
| 2020/0247769 A1 | 8/2020 | Gillberg et al. | |
| 2020/0330545 A1 | 10/2020 | Gillberg et al. | |
| 2020/0376071 A1 | 12/2020 | Ando et al. | |
| 2021/0017141 A1 | 1/2021 | Gillberg et al. | |
| 2021/0024475 A1 | 1/2021 | Lundqvist | |
| 2021/0147372 A1 | 5/2021 | Gillberg | |
| 2021/0171479 A1 | 6/2021 | Gillberg | |
| 2021/0171480 A1 | 6/2021 | Gillberg | |
| 2021/0171481 A1 | 6/2021 | Gillberg | |
| 2021/0171482 A1 | 6/2021 | Gillberg | |
| 2021/0171483 A1 | 6/2021 | Gillberg | |

(56) References Cited

U.S. PATENT DOCUMENTS

| | | |
|---|---|---|
| 2021/0177767 A1 | 6/2021 | Byrod |
| 2021/0179572 A1 | 6/2021 | Gillberg |
| 2021/0236511 A1 | 8/2021 | Byrod |
| 2021/0299141 A1 | 9/2021 | Gillberg |
| 2021/0340175 A1 | 11/2021 | Gillberg |
| 2021/0387956 A1 | 12/2021 | Gillberg |
| 2022/0041567 A1 | 2/2022 | Gillberg et al. |
| 2022/0041568 A1 | 2/2022 | Gillberg et al. |
| 2022/0143043 A1 | 5/2022 | Gillberg |
| 2022/0162176 A1 | 5/2022 | Gillberg |
| 2022/0281832 A1 | 9/2022 | Lundqvist et al. |
| 2022/0402885 A1 | 12/2022 | Gillberg et al. |
| 2023/0049950 A1 | 2/2023 | Gillberg et al. |
| 2023/0109432 A1 | 4/2023 | Gillberg et al. |
| 2023/0250073 A1 | 8/2023 | Gillberg et al. |
| 2023/0302012 A1 | 9/2023 | Gillberg et al. |
| 2023/0330176 A1 | 10/2023 | Gillberg et al. |
| 2023/0338392 A1 | 10/2023 | Lindström et al. |
| 2023/0398125 A1 | 12/2023 | Lindström et al. |
| 2023/0406832 A1 | 12/2023 | Gillberg et al. |
| 2024/0067617 A1 | 2/2024 | Starke et al. |
| 2024/0092748 A1 | 3/2024 | Byrod et al. |
| 2024/0109854 A1 | 4/2024 | Gillberg et al. |
| 2024/0130976 A1 | 4/2024 | Byrod et al. |
| 2024/0173333 A1 | 5/2024 | Mattsson et al. |
| 2024/0207286 A1 | 6/2024 | Lindström et al. |
| 2025/0019353 A1 | 1/2025 | Gillberg et al. |
| 2025/0019354 A1 | 1/2025 | Lundqvist et al. |
| 2025/0100983 A1 | 3/2025 | Gillberg et al. |
| 2025/0257097 A1 | 8/2025 | Gillberg et al. |

FOREIGN PATENT DOCUMENTS

| | | |
|---|---|---|
| EP | 0278464 A1 | 8/1988 |
| EP | 0489423 A1 | 6/1992 |
| EP | 0372542 B1 | 10/1992 |
| EP | 0549967 A1 | 7/1993 |
| EP | 0573848 A2 | 12/1993 |
| EP | 0624593 A2 | 11/1994 |
| EP | 0624594 A2 | 11/1994 |
| EP | 0624595 A2 | 11/1994 |
| EP | 0624596 A2 | 11/1994 |
| EP | 0864582 A2 | 9/1998 |
| EP | 1173205 A1 | 1/2002 |
| EP | 1535913 A1 | 6/2005 |
| EP | 1719768 A1 | 11/2006 |
| EP | 2144599 A2 | 1/2010 |
| EP | 3210977 A2 | 8/2017 |
| GB | 1573487 A | 8/1980 |
| GB | 2262888 B | 7/1996 |
| JP | 2000513028 A | 10/2000 |
| JP | 2004516285 A | 6/2004 |
| JP | 3665055 B2 | 6/2005 |
| JP | 4870552 B2 | 2/2012 |
| JP | 2013541584 A | 11/2013 |
| JP | 2013542953 A | 11/2013 |
| JP | 5421326 B2 | 2/2014 |
| JP | H02258719 A | 10/2019 |
| WO | WO 199103249 A1 | 3/1991 |
| WO | WO 199316055 A1 | 8/1993 |
| WO | WO 199400111 A1 | 1/1994 |
| WO | WO 199418183 A1 | 8/1994 |
| WO | WO 199418184 A1 | 8/1994 |
| WO | WO 199605188 A1 | 2/1996 |
| WO | WO 199608484 A1 | 3/1996 |
| WO | WO 199616051 A1 | 5/1996 |
| WO | WO 199733882 A1 | 9/1997 |
| WO | WO 199803818 A1 | 1/1998 |
| WO | WO 199807449 A2 | 2/1998 |
| WO | WO 199838182 A1 | 9/1998 |
| WO | WO 199840375 A2 | 9/1998 |
| WO | WO 199856757 A1 | 12/1998 |
| WO | WO 199901149 A1 | 1/1999 |
| WO | WO 199932478 A1 | 7/1999 |
| WO | WO 199935135 A1 | 7/1999 |
| WO | WO 199964409 A2 | 12/1999 |
| WO | WO 199964410 A1 | 12/1999 |
| WO | WO 200001687 A1 | 1/2000 |
| WO | WO 200038725 A1 | 7/2000 |
| WO | WO 200038726 A1 | 7/2000 |
| WO | WO 200038727 A1 | 7/2000 |
| WO | WO 200038728 A1 | 7/2000 |
| WO | WO 200038729 A1 | 7/2000 |
| WO | WO 200047568 A2 | 8/2000 |
| WO | WO 200061568 A2 | 10/2000 |
| WO | WO 200062810 A1 | 10/2000 |
| WO | WO 200134570 A1 | 5/2001 |
| WO | WO 200160807 A1 | 8/2001 |
| WO | WO 200166533 A1 | 9/2001 |
| WO | WO 200168096 A2 | 9/2001 |
| WO | WO 200168637 A2 | 9/2001 |
| WO | WO 200208211 A2 | 1/2002 |
| WO | WO 200232428 A1 | 4/2002 |
| WO | WO 200250051 A1 | 6/2002 |
| WO | WO 200253548 A1 | 7/2002 |
| WO | WO 2003020710 A1 | 3/2003 |
| WO | WO 2003022286 A1 | 3/2003 |
| WO | WO 2003022804 A2 | 3/2003 |
| WO | WO 2003022825 A1 | 3/2003 |
| WO | WO 2003022830 A1 | 3/2003 |
| WO | WO 2003043992 A1 | 5/2003 |
| WO | WO 2003051821 A1 | 6/2003 |
| WO | WO 2003051822 A1 | 6/2003 |
| WO | WO 2003061663 A1 | 7/2003 |
| WO | WO 2003091232 A2 | 11/2003 |
| WO | WO 2003106482 A1 | 12/2003 |
| WO | WO 2004006899 A1 | 1/2004 |
| WO | WO 2004020421 A1 | 3/2004 |
| WO | WO 2004056748 A1 | 7/2004 |
| WO | WO 2004076430 A1 | 9/2004 |
| WO | WO 2004089350 A1 | 10/2004 |
| WO | WO 2005082874 A1 | 9/2005 |
| WO | WO 2007009655 A1 | 1/2007 |
| WO | WO 2007009656 A2 | 1/2007 |
| WO | WO 2008058628 A1 | 5/2008 |
| WO | WO 2008058630 A1 | 5/2008 |
| WO | WO 2008058631 A1 | 5/2008 |
| WO | WO 2010062861 A2 | 6/2010 |
| WO | WO 2010041268 A3 | 9/2010 |
| WO | WO 2010106249 A1 | 9/2010 |
| WO | WO 2011137135 A1 | 11/2011 |
| WO | WO 2011150286 A2 | 12/2011 |
| WO | WO 2012064266 A1 | 5/2012 |
| WO | WO 2012064267 A1 | 5/2012 |
| WO | WO 2012064268 A1 | 5/2012 |
| WO | WO 2013063512 A1 | 5/2013 |
| WO | WO 2013063526 A1 | 5/2013 |
| WO | WO 2013168671 A1 | 11/2013 |
| WO | WO 2014174066 A1 | 10/2014 |
| WO | WO 2016062848 A1 | 4/2016 |
| WO | WO 2017138876 A1 | 8/2017 |
| WO | WO 2017138877 A1 | 8/2017 |
| WO | WO 2017138878 A1 | 8/2017 |
| WO | WO 2019017724 A1 | 1/2019 |
| WO | WO 2019032026 A1 | 2/2019 |
| WO | WO 2019032027 A1 | 2/2019 |
| WO | WO 2019172834 A1 | 9/2019 |
| WO | WO 2019234077 A1 | 12/2019 |
| WO | WO 2019245448 A1 | 12/2019 |
| WO | WO 2019245449 A1 | 12/2019 |
| WO | WO 2020194531 A1 | 1/2020 |
| WO | WO 2020161216 A1 | 8/2020 |
| WO | WO 2020161217 A1 | 8/2020 |
| WO | WO 2020167958 A1 | 8/2020 |
| WO | WO 2020167964 A1 | 8/2020 |
| WO | WO 2020167981 A1 | 8/2020 |
| WO | WO 2020167985 A1 | 8/2020 |
| WO | WO 2021110883 A1 | 6/2021 |
| WO | WO 2021110884 A1 | 6/2021 |
| WO | WO 2021110885 A1 | 6/2021 |
| WO | WO 2021110886 A1 | 6/2021 |
| WO | WO 2021110887 A1 | 6/2021 |
| WO | WO 2022029101 A1 | 2/2022 |
| WO | WO 2022101379 A1 | 5/2022 |

(56) References Cited

FOREIGN PATENT DOCUMENTS

| | | |
|---|---|---|
| WO | WO 2022117778 A1 | 6/2022 |
| WO | WO 2022253997 A1 | 12/2022 |
| WO | WO 2023203248 A1 | 10/2023 |
| WO | WO 2024008766 A1 | 1/2024 |

OTHER PUBLICATIONS

Alashkar et al., "Persisting Hyperbilirubinemia in Patients with Paroxysmal Nocturnal Hemoglobinuria (PNH) Chronically Treated with Eculizumab: The Role of Hepatocanalicular Transport Variants," Abstract, Presented at Proceedings of the 57th Annual Meeting of the American Society of Hematology, Orlando, FL, USA, Dec. 5-8, 2015, Amer. Soc. Hematol., Blood, 2015, 126(23).
AlbireoPharma.com [online], "Initiation of a Phase II Trial for A4250, the Company's Lead Compound for Cholestatic Liver Diseases and NASH," Albireo Pharma Press Release, Feb. 5, 2015, retrieved from URL<http://www.albireopharma.com/News.aspx?PageID=1600872>, 2 pages.
Albireo's Lead Compound in Cholestatic Liver Diseases, A4250, Projects Against Bile Acid-Mediated Cholestatic Liver Injury in Mice, Albireo Press Release, Apr. 11, 2014, 2 pages.
Al-Dury, "Ileal Bile Acid Transporter Inhibition for the Treatment of Chronic Constipation, Cholestatic Pruritus, and NASH," Frontiers in Pharmacology, 2018, 9:931.
Alissa et al., "Invited Review: Update on Progressive Familial Intrahepatic Cholestasis," Journal of Pediatric Gastroenterology and Nutrition, 2008, 46:241-252.
Almasio et al., "Role of S-adenosyl-L-methionine in the treatment of intrahepatic cholestasis," Drugs, 1990, 40 Suppl (3):111-123.
Alnouti, "Bile acid sulfation: a pathway of bile acid elimination and detoxification," Toxicological Sciences, 2009, 108(2):225-246.
Alonso et al., "Histologic pathology of the liver in progressive familial intrahepatic cholestasis," Journal of Pediatric Gastroenterology and Nutrition, 14:128-133, 1994.
Alvarez et al., "Reduced hepatic expression of farnesoid X receptor in hereditary cholestasis associated to mutation in ATP8B1," Hum. Mol. Genet., 2004, 13(20):2451-2460.
Alvarez, "Development of crystallization processes for pharmaceutical applications," LACCEI, 2007, 2E.3-1-2E.3-9.
Alvarez, "Treatments in chronic cholestasis in children." Ann. Nestlé, 2008, 66:127-135.
American Diabetes Association, "Management of Dyslipidemia in Adults with Diabetes," Diabetes Care, Jan. 2003, 26(1).
Anakk et al., "Bile acids activate YAP to promote liver carcinogenesis," Cell Rep., Nov. 27, 2013, 5(4):1060-1069.
Angulo et al., "Independent Predictors of Liver Fibrosis in Patients With Nonalcoholic Steatohepatitis," Hepatology, Dec. 1999, 30(6):1356-1362.
Angulo et al., "The NAFLD fibrosis score: a noninvasive system that identifies liver fibrosis in patients with NAFLD," Hepatology, 2007, 45(4):846-854.
Angulo, "Use of ursodeoxycholic acid in patients with liver disease," Current Gastroenterology Reports, Feb. 2002, 4(1):37-44.
Anzivino et al., "ABCB4 and ABCB11 mutations in intrahepatic cholestasis of pregnancy in an Italian population," Dig. Liver Dis., 2013, 45(3):226-232.
Appleby et al., "Effects of conventional and a novel colonic-release bile acid sequestrant, A3384, on fibroblast growth factor 19 and bile acid metabolism in healthy volunteers and patients with bile acid diarrhoea," United Eur. Gastroent. J., 5:380-388, 2017.
Arnell et al., "Follow-up in children with progressive familial intrahepatic cholestasis after partial external biliary diversion," J. Pediatr. Gastroenterol. Nutr., 2010, 51(4):494-499.
Artursson et al., "Correlation Between Oral Drug Absorption in Humans and Apparent Drug Permeability Coefficients in Human Intestinal Epithelial (CACO-2) Cells," Biochemical and Biophysical Research Communications, Mar. 1991, 175(3):880-885.

Asami et al., "Treatment of children with familial hypercholesterolemia with colestilan, a newly developed bile acid-binding resin," Atherosclerosis, 2002, 164:381-2.
Attili et al., "Bile Acid-induced Liver Toxicity: Relation to the Hydrophobic-Hydrophilic Balance of Bile Acids," Medical Hypotheses, 1986, 19:57-69.
Baghdasaryan et al., "Inhibition of intestinal bile acid absorption by ASBT inhibition A4250 protects against bile acid-mediated cholestatic liver injury in mice," J. Hepatology, 2014, 60:S57.
Bajor et al., "Bile acids: short and long term effects in the intestine," Scandinavian J. Gastro., 2010, 45:645-664.
Baker et al. "Systematic review of progressive familial intrahepatic cholestasis," Clin. Res. Hepatol. Gastroenterol., 2019;43:20-36.
Balbach et al., "Pharmaceutical evaluation of early development candidates 'the 100 mg-approach'," Int. J. Pharm., May 4, 2004, 275(1):1-12.
Banker et al., "Modern Pharmaceutics," 3rd edition, Marcel Dekker, New York, 1996, pp. 451 and 596.
Baringhaus, "Substrate specificity of the ileal and the hepatic Na+/bile acid cotransporters of the rabbit. II. A reliable 3D QSAR pharmacophore model for the ileal Na+/bile acid cotransporter," J. Lipid Res., 1999, 40:2158-2168.
Bass et al., "Inherited Disorders of Cholestasis in Adulthood," Clin. Liver. Dis., 2013, 2(5):200-203.
Bastin et al., "Salt Selection and Optimisation Procedures for Pharmaceutical New Chemical Entities," Org. Process Res. Dev., 2000, 4:427-435.
Baumann et al., "Effects of odevixibat on pruritus and bile acids in children with cholestatic liver disease: Phase 2 study," Clin. Res. Hepatol. Gastroenterol., Sep. 2021, 45(5):101751.
Baumann et al., "The ileal bile acid transport inhibitor A4250 decreases pruritus and serum bile acids in cholestatic liver diseases—an ongoing multiple dose, open-label, multicenter study," Hepatology, 2017, 66(1): S91 (Abstract only).
Bavin, "Polymorphism in Process Development," Chemistry and Industry, 527-529, 1989.
Beausejour et al., "Description of two new ABCB11 mutations responsible for type 2 benign recurrent intrahepatic cholestasis in a French-Canadian family," Can. J. Gastroenterol., 2011, 25(6):311-314.
Belikov, "[The relationship between the chemical structure, properties of substances and their effect on the body]," Pharmacevticheskaja khimija, Moskva, "MEDpress-inform," 2007, Chapter 2.5-2.7, pp. 27-29, 5 pages (with English translation of the relevant parts).
Beraza et al., "Nor-ursodeoxycholic acid reverses hepatocyte-specific nemo-dependent steatohepatitis," Gut, 2011, 60: 387-396.
Bernstein et al., "Bile acids as endogenous etiologic agents in gastrointestinal cancer," World J. Gastroenterol., Jul. 2009, 15(27):3329-3340.
Billington et al., "Effects of bile salts on the plasma membranes of isolated rat hepatocytes," Biochem. J. 188: 321-327, 1980.
Blackmore et al., "Polymorphisms in ABCB11 and ATP8B1 Associated with Development of Severe Intrahepatic Cholestasis in Hodgkin's Lymphoma," J. Clin. Exp. Hepatol., 2013, 3(2):159-161.
Blank et al., "The NTCP-inhibitor Myrcludex B: Effects on Bile Acid Disposition and Tenofovir Pharmacokinetics," Clin. Pharmacol. Ther., Feb. 2018, 103(2):341-348.
Board of Appeal of European Patent Office, Case No. T 077/08-3.3.01, Datasheet for the decision of May 24, 2011, 17 pages.
Boncristani et al., "Respiratory Viruses," Encyclopedia of Microbiology, 2009, 19 pages.
Bonge et al., "Cytostar-T Scintillating Microplate Assay for Measurement of Sodium-Dependent Bile Acid Uptake in Transfected HEK-293 Cells," Analytical Biochemistry, 2000, 282:94-101.
Bonn et al., "SAT380—The orally available sodium/taurocholate co-transporting polypeptide inhibitor A2342 blocks hepatitis B and D entry in vitro," Poster, Presented at the European Association for the Study of the Liver; Jun. 22-26, 2022, J. Hepatol., 77(Suppl. 1):S843.
Bounford, "Investigations into the genetic causes of liver disease using molecular genetic technologies," Thesis for the degree of

(56) References Cited

OTHER PUBLICATIONS

Doctor of Philosophy, University of Birmingham, School of Clinical and Experimental Medicine, College of Medical and Dental Sciences, Jun. 2016, 266 pages.
Bowel Diversion Surgeries: Ileostomy, Colostomy, Ileoanal Reservoir and Continent Ileostomy, US Department of Health and Human Services: National Institute of Diabetes and Digestive And Kidney Diseases, Feb. 2009, retrieved on Jan. 27, 2014, retrieved from URL<http://digestive.niddk.nih.gov/ddiseases/pub/ileostomy/Bowel_Diversion_508.pdf>, 4 pages.
Braadland et al., "Suppression of bile acid synthesis as a tipping point in the disease course of primary sclerosing cholangitis," JHEP Rep., Aug. 2022, 4(11):100561.
Braga et al., "Crystal Polymorphism and Multiple Crystal Forms," Struct. Bond., Feb. 2009, 132:25-50.
Brunt et al., "Nonalcoholic Steatohepatitis: A Proposal for Grading and Staging the Histological Lesions," American Journal of Gastroenterology, Sep. 1999, 94(9): 2467-2474.
Brunzell et al., "Dyslipidemia of Central Obesity and Insulin Resistance," Diabetes Care, 1999, 22(Suppl. 3):C10-C13.
Bull et al., "Genetic and morphological findings in progressive familial intrahepatic cholestasis (Byler disease [PFIC-1] and Byler syndrome): evidence for heterogeneity," Hepatology, 26: 1, 155-164, 1997.
Bull et al., "Progressive Familial Intrahepatic Cholestasis," Clin. Liver Dis., Nov. 2018, 22:4:657-669.
Burrows, "Interventions for treating cholestasis in pregnancy," Cochrane Database Syst. Rev., 4:CD00493, 2001.
Byrn et al., "Pharmaceutical Solids: A Strategic Approach to Regulatory Considerations," Pharmaceutical Research, 1995, 12(7):945-954.
Byrne et al., "Missense mutations and single nucleotide polymorphisms in ABCB11 impair bile salt export pump processing and function or disrupt pre-messenger RNA splicing," Hepatology, 2009, 49(2):553-567.
Caira, "Crystalline Polymorphism of Organic Compounds," in: Topics in Current Chemistry, Jan. 1998, 198:163-208.
Camilleri, "Probiotics and irritable bowel syndrome: rationale, putative mechanisms, and evidence of clinical efficacy," Clin. Gastroenterol., 40(3):264-9, Mar. 2006.
Case-Lo, "What Is a Subcutaneous Injection?" Healthline.com [online], Sep. 2018, retrieved on Oct. 7, 2022, retrieved from URL<https://www.healthline.com/health/subcutaneous-injection>, 25 pages.
Centeno, "Molecular mechanisms triggered by low-calcium diets," Nutrition Research Reviews., 22(2):163-74, Dec. 2009.
Chalasani et al., "The diagnosis and management of nonalcoholic fatty liver disease: Practice guidance from the American Association for the Study of Liver Diseases," Hepatology, 2018, 67(1):328-357.
Chang et al., "Bile acids promote the expression of hepatitis C virus in replicon-harboring cells," Journal of Virology, Sep. 2007, 81(18):9633-9640.
Charach et al., "The association of bile acid excretion and atherosclerotic coronary artery disease," Therapeutic Advances in Gastroenterology, 2011, 4(2):95-101.
Chauhan et al., "Pharmaceutical polymers," Encycl. Biomed. Polymers and Polymeric Biomaterials, 2016, 5929-5942.
Chavez-Talavera et al., "Bile Acid Control of Metabolism and Inflammation in Obesity, Type 2 Diabetes, Dyslipidemia, and Nonalcoholic Fatty Liver Disease," Gastroenterology, May 2017, 152(7):1679-1694.e3.
Chen et al., "Bile salt export pump is dysregulated with altered farnesoid X receptor isoform expression in patients with hepatocellular carcinoma," Hepatology, 57(4):1530-1541, 2013.
Chen et al., "Diagnosis of BSEP/ABCB11 mutations in Asian patients with cholestasis using denaturing high performance liquid chromatography," J. Pediatr., 2008, 153(6):825-832.
Chen et al., "FIC1 and BSEP defects in Taiwanese patients with chronic intrahepatic cholestasis with low gamma-glutamyltranspeptidase levels," Journal of Pediatrics, 2002, 140(1):119-124.
Chen et al., "Inhibition of apical sodium-dependent bile acid transporter as a novel treatment for diabetes," Am. J. Physiol. Endocrinol. Metab., 2012, 302:E68-E76.
Chen et al., "Progressive Familial Intrahepatic Cholestasis, Type 1, Is Associated with Decreased Farnesoid X Receptor Activity," Gastroenterology, 2004, 126:756-764.
Chen et al., "Serum and urine metabolite profiling reveals potential biomarkers of human hepatocellular carcinoma," Molecular and Cellular Proteomics, 10:7, 2011.
Chen et al., "The effects of diets enriched in beta-glucans on blood lipoprotein concentrations," J. Clin. Lipidol., 3(3):154-8, May 2009.
Chen et al., "Treatment effect of rifampicin on cholestasis," Internet Journal of Pharmacology, 4(2), 2006.
Chey et al., "A Randomized Placebo-Controlled Phase II b Trial of A3309, A Bile Acid Transporter Inhibitor, for Chronic Idiopathic Constipation," Am. J. Gastroenterology, May 2011, 106:1803-1812.
Chiang, "Bile acids: Regulation of synthesis," J. Lipid Res., Oct. 2009, 50(10):1955-1966.
Chyall, "Preparation of Atorvastatin Calcium according to Example 10 of U.S. Pat. No. 5,273,995," Report Filename EC20082069.02.01, Apruit Consulting, Feb. 23, 2009, 4 pages.
ClinicalTrials.gov [online], "A Long-Term, Open-Label Study of LUM001 With a Double-Blind, Placebo Controlled, Randomized Drug Withdrawal Period to Evaluate Safety and Efficacy in Children With Alagille Syndrome (ALGS) (Iconic)," NCT02160782, Jun. 2014, last updated Sep. 9, 2014, retrieved from URL<http://clinicaltrials.gov/study/NCT02160782>, 4 pages.
ClinicalTrials.gov [online], "An Extension Study to Evaluate the Long-Term Safety and Durability of Effect of LUM001 in the Treatment of Cholestatic Liver Disease in Subjects With Alagille Syndrome (ALGS) (Imagine)," NCT02047318, Dec. 2013, last updated Nov. 2021, retrieved from URL<https://www.clinicaltrials.gov/study/NCT02047318>, 11 pages.
ClinicalTrials.gov [online], "An Extension Study to Evaluate the Long-Term Safety and Durability of Effect of LUM001 in the Treatment of Cholestatic Liver Disease in Subjects With Alagille Syndrome (Imagine-II)," NCT02117713, Mar. 2015, last updated Jul. 2021, retrieved from URL<https://www.clinicaltrials.gov/study/NCT02117713>, 11 pages.
ClinicalTrials.gov [online], "Efficacy and Safety of Odevixibat in Patients With Alagille Syndrome (Assert)," NCT04674761, Dec. 2020, last updated Apr. 2023, retrieved from URL<https://www.clinicaltrials.gov/study/NCT04674761>, 8 pages.
ClinicalTrials.gov [online], "Long Term Safety & Efficacy Study Evaluating The Effect of A4250 in Children With PFIC," NCT03659916, Sep. 2018, last updated Jul. 2024, retrieved from URL<https://www.clinicaltrials.gov/study/NCT03659916>, 14 pages.
ClinicalTrials.gov [online], "Long-term Safety and Efficacy of Odevixibat in Patients With Alagille Syndrome (Assert-EXT)," NCT05035030, Aug. 2021, last updated Oct. 2022, retrieved from URL<https://www.clinicaltrials.gov/study/NCT05035030>, 8 pages.
ClinicalTrials.gov [online], "This Study Will Investigate the Efficacy and Safety of A4250 in Children With PFIC Types 1 or 2 (PEDFIC 1)," NCT03566238, May 2018, last updated Sep. 2021, retrieved from URL<https://www.clinicaltrials.gov/study/NCT03566238>, 10 pages.
ClinicalTrials.gov [online], "Evaluation of LUM001 in the Reduction of Pruritus in Alagille Syndrome (ITCH)," NCT02057692, Nov. 2014, last updated Mar. 2019, retrieved from URL<http://clinicaltrials.gov/study/NCT02057692>, 9 pages.
ClinicalTrials.gov [online], "IBAT inhibitor A4250 for Cholestatic Pruritus," NCT02360852, Jan. 2015, last updated Feb. 2017, retrieved from URL<https://clinicaltrials.gov/study/NCT02360852>, 9 pages.
ClinicalTrials.gov [online], "Open Label Study to Evaluate Efficacy and Long Term Safety of LUM001 (Maralixibat) in the Treatment of Cholestatic Liver Disease in Patients With Progressive Familial Intrahepatic Cholestasis (Indigo)," NCT02057718, Mar. 2014, last updated Oct. 2023, retrieved from URL<http://clinicaltrials.gov/study/NCT02057718>, 11 pages.
ClinicalTrials.gov [online], "Open Label Study to Evaluate Safety and Efficacy of LUM001 in Patients With Primary Sclerosing

(56) References Cited

OTHER PUBLICATIONS

Cholangitis (Cameo)," NCT02061540, Mar. 2014, last updated Mar. 2019, retrieved from URL<http://clinicaltrials.gov/study/NCT02061540>, 10 pages.

ClinicalTrials.gov [online], "Phase 2 Study to Evaluate LUM001 in Combination With Ursodeoxycholic Acid in Patients With Primary Biliary Cirrhosis (Clarity)," NCT01904058, Aug. 2013, last updated Mar. 2019, retrieved from URL<http://clinicaltrials.gov/study/NCT01904058>, 3 pages.

ClinicalTrials.gov [online], "Safety and Efficacy Study of LUM001 in the Treatment of Cholestatic Liver Disease in Patients With Alagille Syndrome (IMAGO)," NCT01903460, Jul. 16, 2013, retrieved from URL<http://clinicaltrials.gov/ct2/show/NCT01903460?term=LUM001&rank=1>, 11 pages.

Coffin et al., "New and Old Biomarkers for Diagnosis and Management of Chronic Hepatitis B Virus Infection," Gastroenterology, Jan. 2019, 156(2):355-368.

Colorcon.com [online], "Achieving tablet stability with moisture management," retrieved on May 28, 2021, retrieved from URL<https://www.colorcon.com/connect-with-colorcon/achieving-tablet-stability-with-moisture-management>, 4 pages.

Copeland et al., "Novel splice-site mutation in ATP8B1 results in atypical progressive familial intrahepatic cholestasis type 1," J. Gastroenterol. Hepatol., 2013, 28(3):560-564.

Custer et al., "Severe combined immunodeficiency (SCID) in the mouse. Pathology, reconstitution, neoplasms," Am. J. Pathol., Sep. 1985, 120(3):464-477.

Damon et al., "Filtration and Drying Study on Amorphous and Form IV Atorvastatin Calcium," Report Filename GMS-CFEP-2007-20, Materials Science, Global Research and Development, Oct. 18, 2007, 4 pages.

Danese et al., "Analytical evaluation of three enzymatic assays for measuring total bile acids in plasma using a fully-automated clinical chemistry platform," PLoS One, 2017, 12(6):e0179200.

Danks et al., "Studies of the aetiology of neonatal hepatitis and biliary atresia," Arch. Dis. Child, May 1977, 52(5):360-367.

Das et al., "Non alcoholic steatohepatitis," JAPI, Mar. 2005, 53:195-199.

Dashti et al., "A Phospholipidomic Analysis of All Defined Human Plasma Lipoproteins," Sci. Rep., Nov. 2011, 1:139, 11 pages.

Davit-Spraul et al., "ATP8B1 and ABCB11 Analysis in 62 Children with Normal Gamma-Glutamyl Transferase Progressive Familial Intrahepatic Cholestasis (PFIC): Phenotypic Differences Between PFIC1 and PFIC2 and Natural History," Hepatology: Autoimmune, Cholestatic and Biliary Disease, May 2010, 51(5):1645-1655.

Davit-Spraul et al., "Liver transcript analysis reveals aberrant splicing due to silent and intronic variations in the ABCB11 gene," Mol. Genet. Metab., 2014, 113(3):225-229.

Davit-Spraul et al., "Progressive familial intrahepatic cholestasis," Orphanet J. Rare Dis., Jan. 2009, 4:1-12.

Dawson et al., "Bile acid transporters," J. Lipid Res. 2009, 50:2340-2357.

Dawson, "Role of the intestinal bile acid transporters in bile acid and drug disposition," Handb. Exp. Pharmacol., Jan. 2011, 201:169-203.

De Carvalho Dominguez Souza et al., "A novel hepatitis B virus species discovered in capuchin monkeys sheds new light on the evolution of primate hepadnaviruses," J. Hepatol., Jun. 2018, 68(6):1114-1122.

De Lédinghen et al., "Controlled attenuation parameter for the diagnosis of steatosis in non-alcoholic fatty liver disease," J. Gastroenterol. Hepatol., 2016, 31(4):848-855.

DeFronzo et al., "Insulin resistance, A multisurfaced syndrome responsible for NIDDM, obesity, hypertension, dyslipidemia and atherosclerotic cardiovascular disease," Diabetes Care, 1991, 14:173-194.

Deng et al., "Novel ATP8B1 mutation in an adult male with progressive familial intrahepatic cholestasis," World J. Gastroenterol., 2012, 18(44):6504-6509.

Di Ciaula et al., "Bile Acids and Cancer: Direct and Environmental-Dependent Effects," Ann. Hepatol., Nov. 2017, 16(Suppl. 1: s3-105.):s87-s105.

Di Lascio et al., "Steato-Score: Non-Invasive Quantitative Assessment of Liver Fat by Ultrasound Imaging," Ultrasound Med. Biol., 2018, 44(8):1585-1596.

Di Padova et al., "Double-blind placebo-controlled clinical trial of microporous cholestyramine in the treatment of intra- and extra-hepatic cholestasis: relationship between itching and serum bile acids," Methods Find. Exp. Clin. Pharmacol., Dec. 1984, 6(12):773-776 (Abstract Only).

Diaz-Frias et al., "Alagille Syndrome," StatPearls [Internet], last updated Aug. 12, 2023, retrieved from URL<https://www.ncbi.nlm.nih.gov/books/NBK507827/>, 5 pages.

Dixon et al., "An expanded role for heterozygous mutations of ABCB4, ABCB11, ATP8B1, ABCC2 and TJP2 in intrahepatic cholestasis of pregnancy," Scientific Reports, 2017, 7(1):11823.

Dong et al., "Structure-activity relationship for FDA approved drugs as inhibitors of the human sodium taurocholate cotransporting polypeptide (NTCP)," Mol. Pharm. 2013, 10(3):1008-1019.

Dongiovanni et al., "Genetic Predisposition in NAFLD and NASH: Impact on Severity of Liver Disease and Response to Treatment," Curr. Pharm. Des., 2013, 19:5219-5238.

Droge et al., "Exon-skipping and mRNA decay in human liver tissue: molecular consequences of pathogenic bile salt export pump mutations," Sci. Rep., 2016, 6:24827.

Droge et al., "Sequencing of FIC1, BSEP and MDR3 in a large cohort of patients with cholestasis revealed a high number of different genetic variants," J. Hepatol., 2017, 67(6):1253-1264.

Droge et al., "Sequencing of ATP8B1, ABCB11 and ABCB4 revealed 135 genetic variants in 374 unrelated patients with suspected intrahepatic cholestasis," Abstract No. A3-27, Presented at Proceedings of the [32nd Annual Meeting of the German Association for the Study of the Liver], Dusseldorf, Germany, Jan. 22-23, 2016, [Journal of Gastroenterology], 2015, 53(12).

Drumond et al., "Patients' appropriateness, acceptability, usability and preferences for pharmaceutical preparations: Results from a literature review on clinical evidence," Int. J. Pharm., 2017, 521(1-2):294-305.

Dyson et al., "[Chemistry of synthetic drugs]," Moscow, 1964, (English translation of relevant parts).

Earnest et al., "Protective role of wheat bran fiber: data from marker trials," Am. J. Med., Jan. 1999, 106(1A):32s-37s.

EASL Clinical Practice Guidelines: Management of cholestatic liver diseases, European Assoc. for the Study of the Liver, Journal of Hepatology, 2009, 51:237-267.

Ebel et al., "Health Care Resource Utilization by Patients with Alagille Syndrome," J. Pediatr., Feb. 2023, 253:144-151.

EC Pre-Grant Opposition in Ecuadorian Appln. No. SENADI-2021-1547, dated Aug. 1, 2023, 22 pages (with English translation).

Eisai, "Results from two phase 3 clinical trials of chronic constipation treatment GOOFICE 5 mg tablet," The Lancet Gastroenterol. Hepatol., Jul. 2018, 3 pages.

Elisofon et al., "Health status of patients with Alagille syndrome," J. Pediatr. Gastroenterol. Nutr., Dec. 2010, 51(6):759-765.

Ellinger et al., "Partial external biliary diversion in bile salt export pump deficiency: Association between outcome and mutation," World J. Gastroenterol., 2017, 23(29):5295-5303.

Ellis et al. "Feedback regulation of human bile acid synthesis," Falk Symposium, 2005, 141:73-79.

Ellis et al., "Zebrafish abcb11b mutant reveals strategies to restore bile excretion impaired by bile salt export pump deficiency," Hepatology, 2018, 67(4)1531-1545.

Emerick et al., "Partial external biliary diversion for intractable pruritus and xanthomas in Alagille syndrome," Hepatology, Jun. 2002, 35(6):1501-1506.

Engelen et al., "Oral size perception of particles: effect of size, type, viscosity and method," J. Text. Studies, 2005, 36(4):373-386.

Espenshade et al., "Regulation of Sterol Synthesis in Eukaryotes," Annu. Rev. Genet., 2007, 41:401-427.

Europa.eu [online], Bylvay, "Annex I: Summary of Product Characteristics," Göteborg, Sweden; Albireo AB, 2021, retrieved from

(56) References Cited

OTHER PUBLICATIONS

URL<https://www.ema.europa.eu/en/documents/product-information/bylvay-epar-product-information_en.pdf>, 44 pages.

European Medicines Agency [online], "What is Alagille Syndrome?," Jan. 21, 2014, retrieved on Oct. 3, 2014, retrieved from URL<http://www.ema.europa.eu/docs/en_GB/document_library/Orphan_designation/2014/01/WC500159874.pdf>, 6 pages.

Evason et al., "Morphologic findings in progressive familial intrahepatic cholestasis 2 (PFIC2): correlation with genetic and immunohistochemical studies," Am. J. Surg. Pathol., 2011, 35(5):687-696.

Extended European Search Report in European Appln. No. 11840392.2, mailed on Feb. 24, 2014, 7 pages.

Extended European Search Report in European Appln. No. 11840481.3, mailed on Feb. 13, 2024, 10 pages.

Farmer et al., "Currently available hypolipidaemic drugs and future therapeutic developments," Baillieres Clin. Endocrinol. Metab., 1995, 9(4):825-47.

Faubion et al., "Toxic bile salts induce rodent hepatocyte apoptosis via direct activation of Fas," The Journal of Clinical Investigation, 103(1):137-145, 1999.

Ferreira et al., "Hypertrophic Osteoarthropathy in Twins with Familial Intrahepatic Cholestasis Type I," Abstract No. 239, Presented at Proceedings of the IPTA 7th Congress on Pediatric Transplantation, Warsaw, Poland, Jul. 13-16, 2013.

Ferslew et al., "Altered Bile Acid Metabolome in Patients with Nonalcoholic Steatohepatitis," Dig. Dis. Sci., 2015, 60(11):3318-3328.

Fickert et al., "Bile acids trigger cholemic nephropathy in common bile-duct-ligated mice," Hepatology, Dec. 2013, 58(6):2056-2069.

Fiorucci et al., "Role of FXR in regulating bile acid homeostasis and relevance for human diseases," Curr. Drug. Targets Immune Endocr. Metabol. Disord., Sep. 2005, 5(3):289-303.

Fisher, "Milling of inactive pharmaceutical ingredients," Encyclopedia of Pharm. Tech., 2001, 2339-2351.

Folmer et al., "Differential effects of progressive familial intrahepatic cholestasis type 1 and benign recurrent intrahepatic cholestasis type 1 mutations on canalicular localization of ATP8B1," Hepatology, 2009, 50(5):1597-1605.

Formulation and Analytical Development for Low-Dose Oral Drug Products, Zheng (ed)., Feb. 2008, pp. 40 and 218.

Forner et al., "Treatment of hepatocellular carcinoma," Critical Reviews in Oncology/Hematology, 2006, 60:89-98.

Francalanci et al., "Progressive familial intrahepatic cholestasis: Detection of new mutations and unusual modality of transmission," Abstract No. 1526, Laboratory Investigation, Feb. 2011, 91(Suppl. 1):360A.

Francalanci et al., "Progressive familial intrahepatic cholestasis: Detection of new mutations and unusual modality of transmission," Abstract No. T.N.5., Presented at Proceedings of the 43rd Annual Meeting of the Italian Association for the Study of the Liver, Rome, Italy, Feb. 25-26, 2010, Digestive and Liver Disease, Feb. 2010, 42(Suppl.1):S16.

Fujino et al., "Pruritus in patients with chronic liver disease and serum autotaxin levels in patients with primary biliary cholangitis," BMC Gastro., 2019, 19:169.

Ganschow et al., "Odevixibat Treatment of Alagille Syndrome: A Case Report," JPGN Rep., Mar. 2023, 4(2):e301.

Gao et al., "Detection of hepatitis in children with idiopathic cholestatic bile salt export pump gene mutations," Shandong Yiyao, 2012, 52(10):14-16.

Gao et al., "Recent developments in the crystallization process: toward the pharmaceutical industry," Engineering, 2017, 3:343-353.

Gao et al., "The Identification of Two New ABCB11 Gene Mutations and the Treatment Outcome in a Young Adult with Benign Recurrent Intrahepatic Cholestasis: A Case Report," Hepatitis Monthly, 2017, 17(10):e55087/1-e55087/6.

Garsuch et al., "Comparative investigations on different polymers for the preparation of fast-dissolving oral films," Journal of Pharmacy and Pharmacology, 2010, 62:539-545.

Ghaffarzadegan et al., "Determination of free and conjugated bile acids in serum of Apoe(−/−) mice fed different lingonberry fractions by UHPLC-MS," Sci. Rep., Mar. 2019, 9(1):3800.

Ghallab et al., "Bile Microinfarcts in Cholestasis Are Initiated by Rupture of the Apical Hepatocyte Membrane and Cause Shunting of Bile to Sinusoidal Blood," Hepatology, Feb. 2019, 69(2):666-683.

Ghallab et al., "Inhibition of the renal apical sodium dependent bile acid transporter prevents cholemic nephropathy in mice with obstructive cholestasis," J. Hepatol., Feb. 2024, 80(2):268-281.

Gibney, "Shire Reports Topline Results from First of Three Placebo-Controlled Phase 2 Studies of SHP625 (LUM001) in Children with Alagille Syndrome," FierceBiotech.com [online], Apr. 9, 2015, retrieved from URL<http://www.firecebiotech.com/node/443176/print>, 3 pages.

Gildeeva, "Polymorphism: the influence on the quality of drugs and actual methods of analysis," Kachestvennaya Klinicheskaya Praktika = Good Clinical Practice, 2017, (1):56-60 (with English abstract).

Gillberg et al., "Clinical Pharmacology of odevixibat, a potent, selective ileal bile acid transport inhibitor with minimal systemic exposure," Abstract No. 167, Presented at Proceedings of the NASPGHAN Annual Meeting, Chicago, IL, Oct. 17-19, 2019, J. Pediatr. Gastroenterol. Nutr., 69(suppl 2):S113.

Gillberg et al., "The IBAT Inhibition by A3309—A Potential Mechanism for the Treatment of Constipation," Gastroenterology, 2010, 138(5 Suppl. 1):S-224.

Giovannoni et al., "Genetics and Molecular Modeling of New Mutations of Familial Intrahepatic Cholestasis in a Single Italian Center," PLoS One, 2015, 10(12):e0145021.

Giron, "Thermal analysis and calorimetric methods in the characterisation of polymorphs and solvates," Thermochimica Acta, Jan. 1995, 248:1-59.

Glagov et al., "Compensatory enlargement of human atherosclerotic coronary arteries," N. Engl. J. Med., May 1987, 316(22):1371-1375 (Abstract Only).

Glebe et al., "Pre-S1 Antigen-Dependent Infection of Tupaia Hepatocyte Cultures with Human Hepatitis B Virus," J. Virol., Sep. 2003, 77(17):9511-9521.

Glueck, "Colestipol and probucol: treatment of primary and familial hypercholesterolemia and amelioration of atherosclerosis," Ann. Intern. Med, Apr. 1982, 96(4): 475-82.

Goldschmidt et al., "Increased frequency of double and triple heterozygous gene variants in children with intrahepatic cholestasis," Hepatol. Res., 2016, 46(4):306-311.

Gonzales et al., "Efficacy and safety of maralixibat treatment in patients with Alagille syndrome and cholestatic pruritus (Iconic): a randomised phase 2 study," Lancet, Oct. 2021, 398(10311):1581-1592.

Gordienko et al., "Chemistry and Technology of Drugs and Biologically Active Compounds," Bulletin of MITHT, 2010, 5(1):93-97 (with machine translation).

Govers et al., "Characterization of the adsorption of conjugated and unconjugated bile acids to insoluble, amorphous calcium phosphate," Journal of Lipid Research, 35(5):741-748, 1994.

Graffner et al., "The ileal bile acid transporter inhibitor A4250 decreases serum bile acids by interrupting the enterohepatic circulation," Aliment. Pharmacol. Ther., 2015, 43(2):303-310.

Greten, "Molecular therapy for the treatment of hepatocellular carcinoma," Br. J. Cancer, 2009, 100:19-23.

Griffin, et al., "A novel gene mutation in ABCB11 in siblings with progressive familial intrahepatic cholestasis type 2," Abstract No. A200, Presented at Proceedings of 2016 Canadian Digestive Diseases Week, CDDW 2016, Montreal, QC, Feb. 26-29, 2016.

Grosser et al., "Substrate Specificities and Inhibition Pattern of the Solute Carrier Family 10 Members NTCP, ASBT and SOAT," Front. Mol. Biosci., May 2021, 8:689757.

Gunaydin et al., "Progressive familial intrahepatic cholestasis: diagnosis, management, and treatment," Hepatol. Med., 2018, 10:95-104.

Guo et al., "Serum Metabolomic Analysis of Coronary Heart Disease Patients with Stable Angina Pectoris Subtyped by Traditional Chinese Medicine Diagnostics Reveals Biomarkers Relevant to Personalized Treatments," Frontiers in Pharmacology, Jun. 2022, 12:1-14.

(56) References Cited

OTHER PUBLICATIONS

Guzman et al., "Does Nonalcoholic Fatty Liver Disease Predispose Patients to Hepatocellular Carcinoma in the Absence of Cirrhosis?" Archives of Pathology & Laboratory Medicine, Nov. 2008, 132(11):1761-1766.
Gwaltney et al., "Validation of the Prucision Instruments in Pediatric Patients with Progressive Familial Intrahepatic Cholestasis," Adv. Ther., Nov. 2022, 39(11):5105-5125.
Hancock et al., "Molecular Mobility of amorphous pharmaceutical solids below their glass transition temperatures," Pharm. Res., 12(6):799-806, 1995.
Hao et al., "Application of high-throughput sequencing technologies with target capture/target next-generation sequencing in diagnosis of neonatal intrahepatic cholestasis causes by citrin deficiency (NICDD)," International Journal of Clinical and Experimental Pathology, 2017, 10(3):3480-3487.
Harmanci et al., "Late onset drug induced cholestasis in a living-related liver transplantation donor to son with progressive familial intrahepatic cholestasis," Abstract No. P62., Presented at Proceedings of the 1st Congress of the Turkic World Transplantation Society, Astana, Kazakhstan, May 20-22, Experimental and Clinical Transplantation, May 2015, 13(2):76.
Harpavat et al., "Prognostic value of serum bile acids after Kasai portoenterostomy in biliary atresia," Abstract, Presented at Proceedings of the American Association for the Study of Liver Diseases (AASLD) Conference, San Francisco, CA, Dec. 2018, Hepatology, 2018, 68(1 Suppl.):85A-86A.
Harpavat et al., "Serum bile acids as a prognostic biomarker in biliary atresia following Kasai portoenterostomy," Hepatology, Mar. 2023, 77(3):862-873.
Hartley et al., "Alagille syndrome and other hereditary causes of cholestasis," Clin. Liver Dis., May 2013, 17(2):279-300.
Hasegawa et al., "Intractable itch relieved by 4-phenylbutyrate therapy in patients with progressive familial intrahepatic cholestasis type 1," Orphanet J. Rare Dis., 2014, 9:89.
Hayashi et al., "Assessment of ATP8B1 Deficiency in Pediatric Patients With Cholestasis Using Peripheral Blood Monocyte-Derived Macrophages," EBioMedicine, 2018, 27:187-199.
Hayashi et al., "Successful treatment with 4-phenylbutyrate in a patient with benign recurrent intrahepatic cholestasis type 2 refractory to biliary drainage and bilirubin absorption," Hepatol. Res., 2016, 46(2):192-200.
Heathcote, "Management of primary biliary cirrhosis," Hepatology, 2000, 31(4):1005-1013.
Hegyi et al., "Guts and Gall: Bile Acids in Regulation of Intestinal Epithelial Function in Health and Disease," Physiol. Rev., Oct. 2018, 98(4):1983-2023.
Henkel et al., "Expanding etiology of progressive familial intrahepatic cholestasis," World J. Hepatol., May 2019, 11(5):450-463.
hepc.liverfoundation.org [online], "Nonalcoholic Fatty Liver Disease," Brochure, 2016, retrieved on Feb. 1, 2018, retrieved from URL<http://hepc.liverfoundation.org/wp-content/uploads/2012/07/NAFLD-Brochure-2016.pdf>, 8 pages.
Herbst et al., "Taking the next step forward—Diagnosing inherited infantile cholestatic disorders with next generation sequencing," Mol. Cell. Probes, 2015, 29(5):291-298.
Higaki et al., "Inhibition of ileal Na+/bile acid cotransporter by S-8921 reduces serum cholesteral and prevents atherosclerosis in rabbits," Arteriosclerosis, Thrombosis, and Vascular Biology, 18(8):1304-1311, 1998.
Hilfiker et al., "Relevance of Solid-state Properties for Pharmaceutical Products," Polymorphism—In the Pharmaceutical Industry, Jun. 2006, pp. 1-19.
Ho et al., "Polymorphic variants in the human bile salt export pump (BSEP; ABCB11): functional characterization and interindividual variability," Pharmacogenet. Genomics, 2010, 20(1):45-57.
Hofmann, "Defective Biliary Secretion during Total Parenteral Nutrition," J. Ped. Gastro. Nutr, May 1995, 20(4):376-390.
Hofmann, "The enterohepatic circulation of bile acids in mammals: form and functions," Front. Biosci., Jan. 2009, 14(7):2584-2598.
Hollands et al., "Ileal exclusion for Byler's disease: an alternative surgical approach with promising early results for pruritus," Journal of Pediatric Surgery, Feb. 1988, 33(2): 220-224.
Holz et al., "Can genetic testing guide the therapy of cholestatic pruritus? A case of benign recurrent intrahepatic cholestasis type 2 with severe nasobiliary drainage-refractory itch," Hepatol. Commun., 2018, 2(2):152-154.
Holz et al., "Plasma separation and anion adsorption results in rapid improvement of nasobiliary drainage (NBD)-refractory pruritus in BRIC type 2," Abstract No. KV275, Presented at Proceedings of the [Visceral Medicine 2016, 71st Annual Meeting of the German Society of Gastroenterology, Digestive and Metabolic Diseases with Endoscopy Section—10th Autumn Conference of the German Society of General and Visceral Surgery], Hamburg, Germany, Sep. 21-24, 2016, [Journal of Gastroenterology], 2016, 54(8).
Hsu et al., "Adult progressive intrahepatic cholestasis associated with genetic variations in ATP8B1 and ABCB11," Hepatol. Res., 2009, 39(6):625-631.
Hu et al., "Diagnosis of ABCB11 gene mutations in children with intrahepatic cholestasis using high resolution melting analysis and direct sequencing," Mol. Med. Rep., 2014, 10(3):1264-1274.
Hu et al., "Genetic diagnosis of progressive familial intrahepatic cholestasis type 2," Linchuang Erke Zazhi, 2013, 31(10):905-909 (Abstract Only).
Huang et al., "Discovery of Potent, Nonsystemic Apical Sodium-Codependent Bile Acid Transporter Inhibitors (Part 2)," J. Med. Chem., 2005, 48:5853-5868.
Imagawa et al., "Clinical phenotype and molecular analysis of a homozygous ABCB11 mutation responsible for progressive infantile cholestasis," J. Hum. Genet., 2018, 63(5):569-577.
Imagawa et al., "Generation of a bile salt export pump deficiency model using patient-specific induced pluripotent stem cell-derived hepatocyte-like cells," Sci. Rep., 2017, 7:41806.
Imagawa et al., "Splicing analysis using induced pluripotent stem cell-derived hepatocyte-like cells generated from a patient with progressive familial intrahepatic cholestatsis type 2," Abstract No. 166, Presented at Proceedings of the World Congress of Pediatric Gastroenterology, Hepatology and Nutrition 2016, Montreal, QC, Canada, Oct. 5-8, 2016, Journal of Pediatric Gastroenterology and Nutrition, 2016, 63(Suppl. 2):S51.
International Preliminary Report on Patentability in International Appln No. PCT/EP2015/074573, dated Apr. 25, 2017, 8 pages.
International Preliminary Report on Patentability in International Appln No. PCT/JP2015/068240, dated Jan. 5, 2017, 12 pages (with English translation).
International Preliminary Report on Patentability in International Appln No. PCT/SE2011/051335, mailed May 23, 2011, 7 pages.
International Preliminary Report on Patentability in International Appln No. PCT/SE2011/051336, mailed May 23, 2013, 10 pages.
International Search Report and Written Opinion in International Appln. No. PCT/EP2021/081462, dated Jan. 1, 2022, 18 pages.
International Search Report and Written Opinion in International Appln No. PCT/EP2014/058432, issued Jul. 11, 2014, 9 pages.
International Search Report and Written Opinion in International Appln No. PCT/EP2019/064602, dated Aug. 9, 2019, 10 pages.
International Search Report and Written Opinion in International Appln No. PCT/EP2020/084569, dated Mar. 9, 2021, 13 pages.
International Search Report and Written Opinion in International Appln. No. PCT/EP2015/074573, mailed Apr. 28, 2016, 11 pages.
International Search Report and Written Opinion in International Appln. No. PCT/EP2020/052940, dated Mar. 23, 2020, 12 pages.
International Search Report and Written Opinion in International Appln. No. PCT/EP2020/052942, dated Mar. 23, 2020, 9 pages.
International Search Report and Written Opinion in International Appln. No. PCT/EP2020/084567, dated Feb. 11, 2021, 13 pages.
International Search Report and Written Opinion in International Appln. No. PCT/EP2020/084568, dated Feb. 11, 2021, 13 pages.
International Search Report and Written Opinion in International Appln. No. PCT/EP2020/084570, dated Feb. 11, 2021, 13 pages.
International Search Report and Written Opinion in International Appln. No. PCT/EP2020/084571, dated Feb. 4, 2021, 14 pages.
International Search Report and Written Opinion in International Appln. No. PCT/EP2021/071618, dated Oct. 4, 2021, 13 pages.

(56) References Cited

OTHER PUBLICATIONS

International Search Report and Written Opinion in International Appln. No. PCT/EP2021/084081, mailed on Jan. 27, 2022, 13 pages.
International Search Report and Written Opinion in International Appln. No. PCT/EP2022/065165, dated Aug. 23, 2022, 9 pages.
International Search Report and Written Opinion in International Appln. No. PCT/EP2023/060601, mailed on Aug. 11, 2023, 7 pages.
International Search Report and Written Opinion in International Appln. No. PCT/EP2023/065469, mailed on Sep. 5, 2023, 7 pages.
International Search Report and Written Opinion in International Appln. No. PCT/EP2023/068476, mailed on Sep. 18, 2023, 12 pages.
International Search Report and Written Opinion in International Appln. No. PCT/EP2023/080648, mailed on Feb. 9, 2024, 8 pages.
International Search Report and Written Opinion in International Appln. No. PCT/EP2023/085144, mailed on Feb. 19, 2024, 12 pages.
International Search Report and Written Opinion in International Appln. No. PCT/JP2015/068240, dated Sep. 15, 2015, 11 pages (with English translation).
International Search Report and Written Opinion in International Appln. No. PCT/SE2011/051335, mailed Feb. 3, 2012, 12 pages.
International Search Report and Written Opinion in International Appln. No. PCT/SE2011/051366, mailed Feb. 22, 2012, 18 pages.
International Search Report and Written Opinion in International Appln. No. PCT/SE2018/050802, dated Oct. 26, 2018, 14 pages.
International Search Report and Written Opinion in International Appln. No. PCT/SE2018/050803, dated Oct. 26, 2018, 14 pages.
International Search Report and Written Opinion in International Appln. No. PCT/SE2019/050208, dated Jul. 8, 2019, 15 pages.
International Search Report and Written Opinion in International Appln. No. PCT/SE2019/050603, dated Sep. 18, 2019, 11 pages.
Ishak et al., "Histological grading and staging of chronic hepatitis," J. Hepatol., 1995, 22:696-699.
Ishibashi et al., "Hypercholesterolemia in low density lipoprotein receptor knockout mice and its reversal by adenovirus-mediated gene delivery," Journal of Clinical Investigation, 92(2):883-893, 1993.
Ivashkin et al., "A novel mutation of ATP8B1 gene in young patient with familial intrahepatic cholestasis.," Abstract No. LBO-38, Presented at Proceedings of the 25th Annual Conference of the Asian Pacific Association for the Study of the Liver, APASL 2016, Tokyo, Japan, Feb. 20-24, 2016, Hepatology International, 2016, 10(1):S461.
Jacquet et al., "Alagille Syndrome in Adult Patients: It is Never Too Late," American Journal of Kidney Diseases, May 2007, 49(5):705-709.
Jankowska et al., "Cholestatic liver disease in children," Przegl. Epidemiol., 56:16-21, 2002.
Jankowska et al., "Ileal exclusion in children with progressive familial intrahepatic cholestasis," J. Pediatr. Gastroenterol. Nutr., 2014, 58(1):92-95.
Jansen et al., "Endogenous bile acids as carcinogens," Journal of Hepatology, Sep. 2007, 47(3):434-435.
Jaquotot-Haerranz et al., "Clinical variability of mutations in the ABCB11 gene: a case report," Rev. Esp. Enferm. Dig., 2013, 105(1):52-54.
Jericho et al., "Bile Acid Pool Dynamics in Progressive Familial Intrahepatic Cholestasis with Partial External Bile Diversion," Journal of Pediatric Gastroenterology and Nutrition, 2015, 60(3):368-374.
Jiang et al., "Non alcoholic steatohepatitis a precursor for hepatocellular carcinoma development," World Journal of Gastroenterology: WJG, Nov. 2014, 20(44):16464-16473.
Jirsa et al., "Indel in the FIC1/ATP8B1 gene-a novel rare type of mutation associated with benign recurrent intrahepatic cholestasis," Hepatol. Res., 2004, 30(1):1-3.
Jung et al., "Prenatal molecular diagnosis of inherited cholestatic diseases," J. Pediatr. Gastroenterol. Nutr., 2007, 44(4):453-458.

Kagawa et al., "Phenotypic differences in PFIC2 and BRIC2 correlate with protein stability of mutant Bsep and impaired taurocholate secretion in MDCK II cells," Am. J. Physiol. Gastrointest. Liver Physiol., 2008, 294(1):G58-67.
Kamath et al, "Consequences of JAG1 mutations," J. Med. Genet., Dec. 2003, 40(12):891-895.
Kamath et al, "Potential of ileal bile acid transporter inhibition as a therapeutic target in Alagille syndrome and progressive familial intrahepatic cholestasis," Liver Int., Aug. 2020, 40:8:1812-1822.
Kamath et al., "Outcomes of Childhood Cholestasis in Alagille Syndrome: Results of a Multicenter Observational Study," Hepatol. Commun., Jan. 2020, 4(3):387-398.
Kamath et al., "Outcomes of liver transplantation for patients with Alagille syndrome: the studies of pediatric liver transplantation experience," Liver Transpl., Aug. 2012, 18(8):940-948.
Kamath et al., "Systematic Review: The Epidemiology, Natural History, and Burden of Alagille Syndrome," J. Pediatr. Gastroenterol. Nutr., Aug. 2018, 67(2):148-156.
Kang et al., "Progressive Familial Intrahepatic Cholestasis in Korea: A Clinicopathological Study of Five Patients," J. Pathol. Transl. Med., May 2019, 53(4):253-260.
Karpen et al., "Ileal bile acid transporter inhibition as an anticholestatic therapeutic target in biliary atresia and other cholestatic disorders," Hepatol. Int., Sep. 2020, 14(5):677-689.
Karpen et al., "Not all (bile acids) who wander are lost: the first report of a patient with an isolated NTCP defect," Hepatology, 2015, 61(1):24-27.
Khosla et al., "Recurrent Post-partum Jaundice: Rare Genetic Disorder With Novel Genetic Mutations Identified," Presented at Proceedings of the 80th Annual Scientific Meeting of the American-College-of-Gastroenterology, Honolulu, HI, USA. Oct. 16-21, 2015, American Journal of Gastroenterology, 2015, 110(1):S397.
Khurana et al., "Bile Acids Regulate Cardiovascular Function," Clin. Transl. Sci., Jun. 2011, 4(3):210-218.
Kim, "Novel mutation of ABCB11 heterozygote associated with transient neonatal intrahepatic cholestasis," Abstract No. H-P-045, Presented at Proceedings of the 49th Annual Meeting of the European Society for Pediatric Gastroenterology, Hepatology and Nutrition, ESPGHAN 2016, Athens, Greece, May 25-28, 2016., Journal of Pediatric Gastroenterology and Nutrition, 2016, 62(1):620.
Kirstgen et al., "Hepatitis D Virus Entry Inhibitors Based on Repurposing Intestinal Bile Acid Reabsorption Inhibitors," Viruses, Apr. 2021, 13(4):666.
Kirstgen et al., "Identification of Novel HBV/HDV Entry Inhibitors by Pharmacophore- and QSAR-Guided Virtual Screening," Viruses, Jul. 2021, 13(8):1489.
Kirstgen et al., "Selective Hepatitis B and D virus entry inhibitors from the group of pentacyclic lupane-type betulin-derived triterpenoids," Sci. Rep., Dec. 2020, 10(1):21772.
Kleiner et al., "Design and validation of a histological scoring system for nonalcoholic fatty liver disease," Hepatology, 2005, 41(6):1313-1321.
Klomp et al., "Characterization of mutations in ATP8B1 associated with hereditary cholestasis," Hepatology, 2004, 40(1):27-38.
Knisely et al., "Hepatocellular Carcinoma in ten children under five years of age with bile salt export pump deficiency," Hepatology, Aug. 2006, 44(2):478-486.
Kojima et al., "First adult case of sporadic localized glomerulocystic kidney mimicking a tumor," Oncol. Lett., Mar. 2015, 9:2368-2370.
König et al., "Kinetics of the bile acid transporter and hepatitis B virus receptor Na+/taurocholate cotransporting polypeptide (NTCP) in hepatocytes," J. Hepatol., Oct. 2014, 61:867-875.
Kooistra, et al., "KLIFS: A structural kinase-ligand interaction database," Nucleic Acids Res., 2016, 44(D1):D365-D371.
Korman et al., "Assessment of Activity in Chronic Active Liver Disease," N. Engl. J. Med., 2010, 290(25):1399-1402.
Kosters et al., "Bile acid transporters in health and disease," Xenobiotica, Jul. 2008, 38(7-8):1043-1071.
Kozarewicz, "Regulatory perspectives on acceptability testing of dosage forms in children," Int. J. Pharm., 2014, 469(2):245-248.
Krantz et al., "Alagille syndrome," J. Med. Genet., Feb. 1997, 34(2):152-157.

(56) References Cited

OTHER PUBLICATIONS

Krawczyk et al., "Prolonged cholestasis triggered by hepatitis A virus infection and variants of the hepatocanalicular phospholipid and bile salt transporters," Ann. Hepatol., 2012, 11(5):710-744.
Kremer et al., "Pathogenesis and treatment of pruritus in cholestasis," Drugs, 2008, 68(15):2163-2182.
Kremer et al., "Serum autotaxin is increased in pruritus of cholestasis, but not of other origin, and responds to therapeutic interventions," Hepatology, Oct. 2012, 56:4:1391-400.
Krones et al., "Bile acid-induced cholemic nephropathy," Dig. Dis., 2015, 33(3):367-375.
Krones et al., "Norursodeoxycholic acid ameliorates cholemic nephropathy in bile duct ligated mice," J. Hepatol., Jul. 2017, 67(1):110-119.
Kullak-Ublick et al., "Enterohepatic bile salt transporters in normal physiology and liver disease," Gastroenterology, Jan. 2004, 126(1):322-342.
Kumar et al., "Cholestatic presentation of chronic hepatitis C: a clinical and histological study with a review of the literature," Dig. Dis. Sci., 2001, 46(10):2066-2073.
Kumar et al., "Use of ursodeoxycholic acid in liver diseases," J. Gastroenterol. Hepatol., 2001, 16:3-14.
Kümmerer, "Pharmaceuticals in the environment," Ann. Rev. Environ. Resour., Nov. 2010, 35:57-75.
Kurata et al., "A novel class of apical sodium-dependent bile acid transporter inhibitors: the amphiphilic 4-oxo-1-phenyl-1,4-dihydroquinoline derivatives," Bioorganic & Medicinal Chemistry Letters, 2004, 14:1183-1186.
Kurbegov et al., "Biliary diversion for progressive familial intrahepatic cholestasis: Improved liver morphology and bile acid profile," Gastroenterology, 125(4):1227-1234, 2003.
Kuznetsova, "[High-quality X-ray phase analysis Guidelines]," Irkutsk State University (GOUVPOIGU), Department of General Physics, 2005, 56 pages (with English translation).
Lachman et al., "The Theory and Practice of Industrial Pharmacy," 3rd Ed., 1987, p. 42.
Lala et al., "Liver Function Tests," StatPearls [Internet], last updated Jul. 30, 2023, retrieved from URL<https://www.ncbi.nlm.nih.gov/books/NBK482489/>, 13 pages.
Lam et al., "A patient with novel ABCB11 gene mutations with phenotypic transition between BRIC2 and PFIC2," J. Hepatol., 2006, 44(1):240-242.
Lam et al., "Levels of plasma membrane expression in progressive and benign mutations of the bile salt export pump (Bsep/Abcb 11) correlate with severity of cholestatic diseases," Am. J. Physiol. Cell Physiol., 2007, 293(5):C1709-16.
Lang et al,. "Genetic variability, haplotype structures, and ethnic diversity of hepatic transporters MDR3 (ABCB4) and bile salt export pump (ABCB11)," Drug Metab. Dispos., 2006, 34(9):1582-1599.
Lang et al., "Mutations and polymorphisms in the bile salt export pump and the multidrug resistance protein 3 associated with drug-induced liver injury," Pharmacogenet. Genomics, 2007, 17(1):47-60.
Lanzini et al., "Intestinal absorption of the bile acid analogue 75Se-homocholic acid-taurine is increased in primary biliary cirrhosis and reverts to normal during ursodeoycholic acid administrations," Gut, 2003, 52:1371-1375.
Lee et al., "Early Diagnosis of ABCB11 Spectrum Liver Disorders by Next Generation Sequencing," Pediatr. Gastroenterol. Hepatol. Nutr., 2017, 20(2):114-123.
Lempp et al., "Hepatitis Delta Virus: Replication Strategy and Upcoming Therapeutic Options for a Neglected Human Pathogen," Viruses, Jul. 2017, 9(7):172.
Leonard et al., "Clinical utility gene card for: Alagille Syndrome (ALGS)," Eur. J. Hum. Genet., Mar. 2014, 22(3).
Lewis et al., "Effects of 2164U90 on ileal bile acid adsorption and serum cholesterol in rats and mice," Journal of Lipid Research, 36(5):1098-1105, 1995.
Li et al., "Apical sodium-dependent bile acid transporter, drug target for bile acid related diseases and delivery target for prodrugs: Current and future challenges," Pharmacol. Ther., Aug. 2020, 212:107539, 23 pages.
Li et al., "ATP8B1 and ABCB11 mutations in Chinese patients with normal gamma- glutamyl transferase cholestasis: Phenotypic differences between progressive familial intrahepatic cholestasis type 1 and 2," Abstract No. OP284, Hepatol. Int., 2017, 11(1):5180.
Li et al., "Clinical feature and gene mutation analysis of one pedigree with progressive familial intrahepatic cholestasis type II," Hepatology International 2017, 11(1):5362, Abstract No. PP0347, Presented at Proceedings of the 26th Annual Conference of the Asian Pacific Association for the Study of the Liver, APASL 2017, Shanghai, China., Feb. 15-19, 2017.
Li et al., "Effect of Resistant Starch Film Properties on the Colon-Targeting Release of Drug From Coated Pellets," J. Control. Release, Nov. 2011, 152(Suppl 1):e5-e7.
Lichtinghagen R, et al., "The Enhanced Liver Fibrosis (ELF) score: normal values, influence factors and proposed cut-off values," J. Hepatol., Aug. 2013, 59(2):236-42.
Liepelt et al., "Stromal cell-derived factor-1 (SDF-1) as a target in liver diseases," Am. J. Physiol. Gastrointest. Liver Physiol., Aug. 2016, 311(2):G203-G209.
Lin et al., "Clinical and genetic analysis of an infant with progressive familial intrahepatic cholestasis type II]." Zhongguo Dang Dai Er Ke Za Zhi., 2018, 20(9)758-764 (with English abstract).
Lindström et al., "Preclinical Characterization of the Novel, Orally Bioavailable Hepatitis B Viral Entry Inhibitor A2342," Poster, Presented at Proceedings of the AASLD: The Liver Meeting 2021, American Association for the Study of Liver Diseases, Nov. 12-15, 2021, 3 pages.
Ling, "Congenital cholestatic syndromes: What happens when children grow up?" Can. J. Gastroenterol., Nov. 2007, 21(11):743-751.
Liu et al., "A novel class of apical sodium-dependent bile salt transporter inhibitors: 1-(2,4-bifluorophenyl)-7-dialkylamino-1,8-naphthyridine-3-carboxamides," Acta Pharmaceutica Sinica B, Mar. 2017, 7(2):223-229.
Liu et al., "ABCB11 gene mutations in Chinese children with progressive intrahepatic cholestasis and low gamma glutamyltransferase," Liver International, 2010, 30(6):809-815.
Liu et al., "Association of variants of ABCB11 with transient neonatal cholestasis," Pediatr. Int., 2013, 55(2):138-144.
Liu et al., "Characterization of ATP8B1 gene mutations and a hot-linked mutation found in Chinese children with progressive intrahepatic cholestasis and low GGT," J. Pediatr. Gastroenterol. Nutr., 2010, 50(2):179-183.
Liu et al., "Characterization of ATP8B1 mutations and a hot linked mutation found in Chinese children with progressive intrahepatic cholestasis and low GGT," Hepatology International, 2009, 3(1):184-185, Abstract No. PE405, Presented at Proceedings of the 19th Conference of the Asian Pacific Association for the Study of the Liver, Hong Kong, China, Feb. 13-16, 2009.
Liu et al., "Homozygous p.Ser267Phe in SLC10A1 is associated with a new type of hypercholanemia and implications for personalized medicine," Scientific Reports, 2017, 7(9214):1-7.
Liu et al., "Patient-centred pharmaceutical design to improve acceptability of medicines: similarities and differences in paediatric and geriatric populations," Drugs, Oct. 2014, 74(16):1871-1889.
Loh et al., "Overview of milling techniques for improving the solubility of poorly water-soluble drugs," Asian J. Pharm. Sci., 2015, 10:225-274.
Longo et al., "Hyperlipidemia in chronic cholestatic liver disease," Curr. Treat. Options Gastrenterol., 2001, 4:111-114.
Lopez et al., "Effect of formulation variables on oral grittiness and preferences of multiparticulate formulations in adult volunteers," Eur. J. Pharm. Sci., 2016, 92:156-162.
Lopez et al., "Formulation approaches to pediatric oral drug delivery: benefits and limitations of current platforms," Expert Opin. Drug Deliv., 2015, 12(11):1727-1740.
Lowjaga et al., "Long-term trans-inhibition of the hepatitis B and D virus receptor NTCP by taurolithocholic acid," Am. J. Gastrointest. Liver Physiol., Jan. 2021, 320(1):G66-G80.

(56) References Cited

OTHER PUBLICATIONS

Lozano et al., "Cocarcinogenic effects of intrahepatic bile acid accumulation in cholangiocarcinoma development," Mol. Cancer Res., Jan. 2014, 12(1):91-100.
Lv et al., "Noninvasive Quantitative Detection Methods of Liver Fat Content in Nonalcoholic Fatty Liver Disease," J. Clin. Transl. Hepatol., 2018, 6(2):217-221.
Lykavieris et al., "Outcome of liver disease in children with Alagille syndrome: a study of 163 patients," Gut, 2001, 49:431-435.
Ma et al., "Bile Acids, Obesity, and the Metabolic Syndrome," Best Pract. Res. Clin. Gastroenterol., Aug. 2014, 28(4):573-583.
Maggiore et al., "Relapsing features of bile salt export pump deficiency after liver transplantation in two patients with progressive familial intrahepatic cholestasis type 2," J. Hepatol. 2010, 53(5):981-6.
Manghat et al., "Colesevelam hydrochloride: a specifically engineered bile acid sequestrant," Future Lipidology, 3(3):237-255, Jun. 2008.
Mariotti et al., "Animal models of biliary injury and altered bile acid metabolism," Biochim. Biophys. Acta Mol. Basis Dis., Apr. 2018, 1864(4 Pt B):1254-1261.
Masahata et al., "Recurrence of Progressive Familial Intrahepatic Cholestasis Type 2 Phenotype After Living-donor Liver Transplantation: A Case Report," Transplant. Proc., 2016, 48(9):3156-3162.
Maek et al., "The developmental biology of genetic Notch disorders," Development, May 2017, 144(10):1743-1763.
Massei et al., "Cholestasis as a presenting feature of acute Epstein-Barr virus infection," The Pediatric Infectious Disease Journal, Jul. 2001, 20(7):721-722.
Matte et al., "Analysis of gene mutations in children with cholestasis of undefined etiology," J. Pediatr. Gastroenterol. Nutr., 2010, 51(4):488-493.
McCullough et al., "The epidemiology and risk factors of NASH," Blackwell Publishing, Chapter 3, 2005.
McKay et al., "Mutation detection in cholestatic patients using microarray resequencing of ATP8B1 and ABCB11 [version 2; peer review: 2 approved, 1 approved with reservations]," F1000 Res., 2013, 2:32.
McMichael et al., "Reproduction, endogenous and exogenous sex hormones, and colon cancer: a review and hypothesis," J. Natl. Cancer Inst., 65(6):1201-07, Dec. 1980.
McPherson et al., "Simple non-invasive fibrosis scoring systems can reliably exclude advanced fibrosis in patients with non-alcoholic fatty liver disease," Gut, 2010, 59(9):1265-9.
Meaux et al., "Circulating autotaxin levels in healthy teenagers: Data from the Vitados cohort," Front. Pediatr., Feb. 2023, 11:1094705.
MedLibrary.org [online], "Bylvay," [package insert], Boston, MA: Albireo Pharma, Inc.; Jun. 2023, retrieved from URL< https://medlibrary.org/lib/rx/meds/bylvay/ >, 6 pages.
Mehl et al. "Liver transplantation and the management of progressive familial intrahepatic cholestasis in children," World J. Transplant., 2016, 6(2):278-90.
MerckManuals.com [online], "Obesity," 2008, Merck Manual for Health Care Professionals, Section-Nutritional Disorders, Chapter—"Obesity and the metabolic syndrome," retrieved on Feb. 22, 2012, retrieved from URL<http://www.merchmanuals.com/professional/nutritional_disorders/obesity_and the_metabolic_syndrome/metabolic_syndrome.html?qt-metabolicsyndrome&alt=sh>, 10 pages.
Mertens et al., "Bile Acid Signaling Pathways from the Enterohepatic Circulation to the Central Nervous System," Front. Neurosci., Nov. 2017, 11:617.
Michielsen et al., "Viral hepatitis and hepatocellular carcinoma," World J. Surg. Oncol., May 2005, 3(27):1-18.
Miethke et al., "Pharmacological inhibition of apical sodium-dependent bile acid transporter changes bile composition and blocks progression of sclerosing cholangitis in multidrug resistance 2 knockout mice," Hepatology, Feb. 2016, 63(2):512-523.
Miloh et al., "Benign Recurrent Intrahepatic Cholestasis (BRIC) Is Characterized By Partial Function of the Familial Intrahepatic Cholestasis 1 (FIC-1) Gene Product," Abstract No. 292, Presented at Proceedings of the Digestive Disease Week Meeting/107th Annual Meeting of the American-Gastroenterological Association, Los Angeles, CA, USA., Gastroenterology, May 2006, 130:A759-A760.
Mishra et al., "Investigation of organoleptic characteristics in the development of soft chews of calcium carbonate as mineral supplement," Yakugaku Zasshi, 2009, 129(12):1537-1544.
Mistry et al., "Evidence of acceptability of oral paediatric medicines: a review," J. Pharm. Pharmacol., 2017, 69(4):361-376.
Mizuochi et al., "Characterization of urinary bile acids in a pediatric BRIC-1 patient: effect of rifampicin treatment," Clin. Chim. Acta., 2012, 413(15-16):1301-1304.
Moghadamrad et al., "Cholestasis in a patient with gallstones and a normal gamma-glutamyl transferase," Hepatology, 2013, 57(6):2539-2541.
Morissette et al., "High-throughput crystallization: polymorphs, salts, co-crystals and solvates of pharmaceutical solids," Advanced Drug Delivery Reviews, 2004, 56:275-300.
Morotti et al., "Progressive Familial Intrahepatic Cholestasis (PFIC) Type 1, 2, and 3: A Review of the Liver Pathology Findings," Seminars in Liver Disease, Feb. 2011, 31(1):3-10.
Mouzaki et al., "Non-alcoholic steatohepatitis: the therapeutic challenge of a global epidemic," Annals of Gastroenterology, 2012, 25: 207-217.
Mowat et al., "Respiratory chain complex III [correction of complex] in deficiency with pruritus: a novel vitamin responsive clinical feature," J. Pediatr., 134(3):352-4, Mar. 1999.
Müller et al., "Characterisation of the hepatitis B virus crossspecies transmission pattern via Na+/taurocholate co-transporting polypeptides from 11 New World and Old World primate species," PLoS One, Jun. 2018, 13(6):e0199200.
Mwesigwa et al, "An investigation into moisture barrier film coating efficacy and its relevance to drug stability in solid dosage forms," International Journal of Pharmaceutics, Jan. 2016, 497:70-77.
Nagasaka et al., "Depletion of high-density lipoprotein and appearance of triglyceride-rich low-density lipoprotein in a Japanese patient with FIC1 deficiency manifesting benign recurrent intrahepatic cholestasis," J. Pediatr. Gastroenterol. Nutr., 2007, 45(1)96-105.
Nagase et al., "Preparation of Benzothiazepine derivatives with activity of bringing about high blood GLP-1 concentration," CAPLUS Database, Jul. 2002, retrieved from STN Database on Mar. 31, 2014, retrieved from URL<https://stneasy.cas.org/tmp/20140331/443268-0025347726-200/349520738.html>, 2 pages.
Narchi et al., "Intrahepatic cholestasis in two Omani siblings associated with a novel homozygous ATP8B1 mutation, c.379C>G (p.L127V).," Saudi J. Gastroenterol., 2017, 23(5):303-305.
Neuman, et al., "Biomarkers in nonalcoholic fatty liver disease," Can. J. Gastroenterol. Hepatol., 2014, 28(11):607-618.
Ng et al., "Autoimmune haemolytic anaemia with giant cell hepatitis and concurrent bile salt export pump deficiency: Challenges in diagnosis and management," Abstract No. H-P-127, Presented at Proceedings of the 51st Annual Meeting European Society for Paediatric Gastroenterology, Hepatology and Nutrition, ESPGHAN 2018, Geneva, Switzerland, May 9-12, 2018, Journal of Pediatric Gastroenterology and Nutrition, 2018, 66(2):860.
Noe et al., "Impaired expression and function of the bile salt export pump due to three novel ABCB11 mutations in intrahepatic cholestasis," J. Hepatol., 2005, 43(3):536-543.
O'Neill et al., "Comparison of efficacy of plant stanol ester and sterol ester: short-term and longer-term studies," American Journal of Cardiology, 96(1A):29d-36D, Jul. 2005.
Office Action and Search Report in Swedish Appln. No. 2250981-4, dated Mar. 17, 2023, 8 pages.
Office Action in Russian Appln. No. 2021100978, dated Dec. 20, 2022, 16 pages (with English Translation).
Office action in Russian Appln. No. 2021100978/10(001827), dated Oct. 13, 2023, 12 pages (with English Translation).
Office Action in Swedish Appln. No. 1850761-6, dated Dec. 17, 2018, 8 pages.
Office Action in Swedish Appln. No. 1850762-4, dated Dec. 27, 2018, 7 pages.
Office Action in Swedish Appln. No. 1850915-8, dated Feb. 15, 2019, 6 pages.

(56) References Cited

OTHER PUBLICATIONS

Office Action in Swedish Appln. No. 1950463-8, dated Sep. 26, 2019, 3 pages.
Office Action in Swedish Appln. No. 1950464-6, dated Sep. 26, 2019, 3 pages.
Okubo et al., "II, Daihyoteki Shikkan No. Shinryo to Genkyo to Shorai Tenbo 6. Nanjisei Benpi," The Journal of the Japanese Society of Internal Medicine, Jan. 2013, 102(1):83-89 (English Translation).
Ovchinsky et al., "Changes in Hepatic Parameters in Patients with Alagille Syndrome Treated with Odevixibat: Pooled Data from the Phase 3 Assert and Assert-EXT Studies," Presented at the 2023 NASPGHAN/CPNP/APGNN Annual Meeting, Oct. 4-7, 2023, San Diego, CA, J. Pediatr. Gastroenterol. Nutr., Sep. 2023, 77(S1):S253-S254.
Ovchinsky et al., "Efficacy and Safety of Odevixibat in Patients With Alagille Syndrome: Interim Results From the Open-Label, Phase 3 Assert-EXT Study," Abstract No. H-0023, Presented at the Annual Meeting of the American Association for the Study of Liver Diseases, Nov. 4-8, 2022, Washington, D.C., Hepatology, Oct. 2022, 76(Suppl. 1):701-703.
Ovchinsky et al., "Efficacy and safety of odevixibat in patients with Alagille syndrome (Assert): a phase 3, double-blind, randomised, placebo-controlled trial," Lancet Gastroenterol. Hepatol., Apr. 2024, 23:S2468-1253(24)00074-8.
Ovchinsky et al., "Efficacy and Safety Outcomes With Odevixibat Treatment: Pooled Data From the Phase 3 Assert and Assert-EXT Studies in Patients With Alagille Syndrome," Abstract No. THU-284, Presented at the Annual Meeting of the European Association for the Study of the Liver (EASL): The International Liver Congress, Vienna, Austria, Jun. 21-24, 2023, J. Hepatol., Jun. 2023, 78(suppl. 1):S965-S966.
Ovchinsky et al., "Fat-Soluble Vitamin Levels in Patients With Alagille Syndrome Treated With Odevixibat in the Phase 3 Assert Study," Abstract No. 4615-C, Presented at the Annual Meeting of the American Association for the Study of Liver Diseases (AASLD): The Liver Meeting 2023, Boston, MA, Nov. 10-14, 2023, Hepatology, Oct. 2023, 78(S1):S2103-S2104.
Ovchinsky et al., "Individual Pruritus and Bile Acid Responses Over Time With Odevixibat Treatment: Pooled Data From the Phase 3 Assert and Assert-EXT Studies in Patients With Alagille Syndrome," Abstract No. 122, Presented at the Annual Meeting of the American Association for the Study of Liver Diseases (AASLD): The Liver Meeting 2023, Boston, MA, Nov. 10-14, 2023, Hepatology, Oct. 2023, 78(S1):S124-S126.
Ovchinsky et al., "Outcomes With Odevixibat Treatment in Patients With Alagille Syndrome: Analysis of Pruritus Responders From the Phase 3 Assert Study," Abstract No. 4617-C, Presented at the Annual Meeting of the American Association for the Study of Liver Diseases (AASLD): The Liver Meeting 2023, Boston, MA, Nov. 10-14, 2023, Hepatology, Oct. 2023, 78(S1):S2106-S2107.
Painter et al., "Sequence variation in the ATP8B1 gene and intrahepatic cholestasis of pregnancy," Eur. J. Hum. Genet., 2005, 13(4):435-439.
Parikh et al., "Batch Fluid Bed Granulation," Handbook of Pharmaceutical Granulation Technology, 2010, pp. 204-260.
Park et al., "Clinical and ABCB11 profiles in Korean infants with progressive familial intrahepatic cholestasis," World J. Gastroenterol., 2016, 22(20):4901-4907.
Parker et al., "Molecular mechanisms underlying bile acid-stimulated glucagon-like peptide-1 secretion," British Journal of Pharmacology, 2012, 165:414-423.
Parks et al., "A proposed modification to Hy's law and Edish criteria in oncology clinical trials using aggregated historical data," Pharmacoepidemiol. Drug Saf., Jun. 2013, 22(6):571-578.
Patani et al., "Bioisosterism: A Rational Approach in Drug Design," Chem. Rev., 1996, 96:3147-3176.
Pauli-Magnus et al., "Enterohepatic transport of bile salts and genetics of cholestasis," Journal of Hepatology, 2005, 43(2):342-357.
Pauli-Magnus et al., "Impaired expression and function of the bile salt export pump due to three novel ABCB11 mutations in intrahepatic cholestasis," Abstract, Presented at Proceedings of the 54th Annual Meeting of the American Association for the Study of Liver Diseases, Boston, MA, USA, Oct. 24-28, 2003, American Association for the Study of Liver Diseases, Hepatology, 2003, 38(4 Suppl. 1):518A.
Pawlowska et al., "Factors affecting catch-up growth after liver transplantation in children with cholestatic liver diseases," Ann. Transplant., Jan.-Mar. 2010, 15(1):72-76.
Peng et al., "[Relationship between phenotype and genotype of ABCB11 deficiency in siblings and literature review]," Zhonghua er ke za zhi (Chinese Journal of Pediatrics), 2018, 56(6):440-444.
Perez et al., "Bile-acid-induced cell injury and protection," World J. Gastroenterol., Apr. 2009, 15(14):1677-1689.
Perumpail et al., "Clinical epidemiology and disease burden of nonalcoholic fatty liver disease," World Journal of Gastroenterology, Dec. 2017, 23(47): 8263-8276.
Pfister et al., "Native liver survival in bile salt export pump deficiency: results of a retrospective cohort study," Hepatol. Commun., Mar. 2023, 7(4):e0092.
Pharmapproach.com [online], "Oral Administration of Drugs: Advantages and Disadvantages," May 2023, retrieved on Oct. 7, 2022, retrieved from URL<https://www.pharmapproach.com/oral-administration-of-drugs-advantages-and-disadvantages/>, 7 pages.
Pharmapproach.com [online], "Subcutaneous Route of Drug Administration: Advantages and Disadvantages," Jun. 2023, retrieved on Oct. 7, 2022, retrieved from URL<https://www.pharmapproach.com/subcutaneous-route-of-drug-administration-advantages-and-disadvantages/>, 5 pages.
Plump et al., "Severe hypercholesterolemia and atherosclerosis in apolipoprotein E-deficient mice created by homologous recombination in ES cells," Cell, (71):343-353, 1992.
pmda.go.jp [online], "Establishment of Standards and Test Methods for Novel Pharmaceuticals," Pharmaceutical Affairs Bureau Notification, May 1, 2002, No. 568, retrieved from URL<https://www.pmda.go.jp/files/000156301.pdf>, (with Machine Translation) 87 pages.
Podesta et al., "Treatment of pruritus of primary biliary cirrhosis with rifampin," Dig. Dis. Sci., 1991, 36(2):216-220.
Pose et al., "3,5-Diethoxycarbonyl-1,4-Dihydrocollidine Diet: A Rodent Model in Cholestasis Research," Methods Mol. Biol., Apr. 2019, 1981:249-257.
Poupon et al., "Chronic Cholestatic Disease," J. Hepatology, 2000, 32(1):12-140.
PR Newswire [online], "Lumena Pharmaceuticals Now Dosing Patients in the Indigo Phase 2 Clinical Trial of LUM001 in Pediatric Patients with Progressive Familial Intrahepatic Cholestasis," May 9, 2014, retrieved on Oct. 3, 2014, retrieved from URL<http://www.prnewswire.com/news-releases/lumena-pharmaceuticals-now-dosing-patients-in-the-indigo-phase-2-clinical-trial-of-lum001-in-pediatric-patients-with-progressive-familial-intrahepatic-cholestasis-258609691.html>, 3 pages.
Qiu et al., "Defects in myosin VB are associated with a spectrum of previously undiagnosed low γ-glutamyltransferase cholestasis," Hepatology, 2017, 65(5):1655-1669.
Qiu et al., "Disruption of BSEP function in HepaRG cells alters bile acid disposition and is a susceptive factor to drug-induced cholestatic injury," Mol. Pharmaceutics, 13:4, 2016 (Abstract only).
Quigley et al., "Advancing treatment options for chronic idiopathic constipation," Expert Opin. Pharmacother., 2016, 17(4):501-511.
Rancaniello, "How many viruses on earth?" Virology Blog, Sep. 2013, 6 pages.
Rao et al., "Inhibition of ileal bile acid uptake protects against nonalcoholic fatty liver disease in high-fat diet-fed mice," Sci. Transl. Med., Sep. 2016, 8(357):357ra122.
Rasche et al., "Highly diversified shrew hepatitis B viruses corroborate ancient origins and divergent infection patterns of mammalian hepadnaviruses," Proc. Natl. Acad. Sci. USA, Aug. 2019, 116(34):17007-17012.
Reeder et al., "Quantitative assessment of liver fat with magnetic resonance imaging and spectroscopy," J. Magn. Reson. Imaging, 2011, 34(4):729-749.

(56) References Cited

OTHER PUBLICATIONS

Renga et al., "Role of FXR in regulating bile acid homeostasis and relevance for human diseases," Curr. Drug. Targets Immune Endocr. Metab. Disord., 5(3):289-303, Sep. 2005.
Ricci, "Bridging studies in support of oral pediatric formulation development," Int. J. Pharmaceuticals, 2013, 457:323-326.
Rodriguez-Spong et al., "General principles of pharmaceutical solid polymorphism: a supramolecular perspective," Adv. Drug Deliv., 2004, 56:241-274.
Rolo et al., "Bile acids affect liver mitochondrial bioenergetics: Possible relevance for cholestasis therapy," Toxicological Sciences, 57: 177-185, 2000.
Rumbo et al., "Double heterozygous mutation causing PFIC2 with synchronic hepatocellular carcinomas before two years of age," Abstract No. P.752, Presented at Proceedings of the 27th International Congress of The Transplantation Society, TTS 2018, Madrid, Spain, Jun. 30-Jul. 5, 2018, Transplantation, 2018, 102(7 Suppl. 1):S848.
Rust et al., "Effect of cholestyramine on bile acid pattern and synthesis during administration of ursodeoxycholic acid in man," Eur. J. Clin. Invest., 2000, 30:135-139.
Ryder, "Guidelines for the diagnosis and treatment of hepatocellular carcinoma (HCC) in adults," Gut, May 2003, 52:(Suppl.111):iii1-iii8.
Saleh et al., "Alagille syndrome: clinical perspectives," Appl. Clin. Genet., Jun. 2016, 9:75-82.
Sangkhathat et al., "Variants Associated with Infantile Cholestatic Syndromes Detected in Extrahepatic Biliary Atresia by Whole Exome Studies: A 20-Case Series from Thailand," J. Pediatr. Genet., 2018, 7:67-73.
Sanyal et al., "The etiology of hepatocellular carcinoma and consequences of treatment," The Oncologist, 2010, 15(Suppl 4):14-22.
Satapathy et al., "Epidemiology and Natural History of Nonalcoholic Fatty Liver Disease," Seminars in Liver Disease, Aug. 2015, 35(3): 221-235.
Sattler et al., "Functional analysis of previously uncharacterised disease-causing mutations of the bile salt export pump," Abstract, Presented at Proceedings of the International Liver Congress/ 52nd Annual Meeting of the European Association for the Study of the Liver, Amsterdam, Netherlands, Apr. 19-23, 2017, Journal of Hepatology 2017, 66(1):5177.
Scheimann et al., "Prevalence of Abcb 11 mutations among children with cholelithiasis," Abstract, Presented at Proceedings of the Digestive Disease Week Meeting/108th Annual Meeting of the American-Gastroenterological Association, Washington, DC, USA, May 19-24, 2007, Gastroenterology, 2007, 132(4 Suppl. 2):A452.
Scheuer, "Primary Biliary Cirrhosis," Proc. R. Soc. Med., Dec. 1967, 60:1257-1260.
Schiller, "Review article: the therapy of constipation," Alimentary Pharmacology and Therapeutics, 15(6):749-763, 2001.
Schneider et al., "Efficacy of fat-soluble vitamin supplementation in infants with biliary atresia," Pediatrics, Sep. 2012, 130(3):e607-e614.
Schonherr, "Profound Methyl Effects in Drug Discovery and a Call for New C—H Methylation Reactions," Angew. Chem. Int. Ed., 2013, 52:12256-12267.
Schumpelick et al., "[Ulcerative colitis—late functional results of ileal pouch-anal anastomosis]," Chirung, 69(10):1013-19, Oct. 1998 (with English Abstract).
Sciveres, "Relapsing features of bile salt export pump (BSEP) deficiency in a patient successfully transplanted for progressive familial intrahepatic cholestasis type 2 (PFIC2)," Abstract No. CO18, Presented at Proceedings of the 17th National Congress SIGENP, Pescara, Italy, Oct. 7-9, 2010, Digestive and Liver Disease, Oct. 2010, 42(Suppl. 5):S329.
Search Report in Swedish Appln. No. 1850474-6, dated Oct. 11, 2018, 3 pages.
Search Report in Swedish Appln. No. 1850761-6, dated Dec. 17, 2018, 3 pages.
Search Report in Swedish Appln. No. 1850762-4, dated Dec. 27, 2018, 3 pages.
Search Report in Swedish Appln. No. 1850915-8, dated Feb. 15, 2019, 2 pages.
Search Report in Swedish Appln. No. 1950463-8, dated Sep. 26, 2019, 2 pages.
Search Report in Swedish Appln. No. 1950464-6, dated Sep. 26, 2019, 3 pages.
Setkina et al., "Biopharmaceutical aspects of drug technology and ways to modify bioavailability," Vestnik VSUM, 2014, 12(4):162-172 (with English abstract).
Shah et al., "Progressive Familial Intrahepatic Cholestasis Type 2 in an Indian Child," J. Pediatr. Genet., 2017, 6(2):126-127.
Shah et al., "Role of Caco-2 Cell Monolayers in Prediction of Intestinal Drug Absorption," Biotechnol. Prog., 2006, 22:186-198.
Shang et al., "Colesevelam improves insulin resistance in a diet-induced obesity (F-DIO) rat model by increasing the release of GLP-1," Am. J. Physiol. Gastrointest. Liver Physiol., 2010, 298:G419-G424.
Shaprio et al., "DHPLC screening for mutations in progressive familial intrahepatic cholestasis patients," J. Hum. Genet., 2010, 55(5):308-313.
Sharma et al., "Spectrum of genomic variations in Indian patients with progressive familial intrahepatic cholestasis," BMC Gastroenterol., 2018, 18(1):107.
Sharma et al., "Spectrum of sequence variations in Indian patients with progressive familial intrahepatic cholestasis show several novel polymorphisms,". Abstract No. M-20, Presented at Proceedings of the 58th Annual Conference of the Indian Society of Gastroenterology, ISGCON 2017, Bhubaneswar, India, Dec. 14-17, 2017, Indian Journal of Gastroenterology 2017, 36(1):A99.
Sheflin-Findling et al., "Partial internal biliary diversion for Alagille syndrome: case report and review of the literature," J. Pediatr. Surg., Jul. 2012, 47(7):1453-1456.
Sherrif et al., "Hepatotoxicity from anabolic androgenic steroids marketed as dietary supplements: contribution from ATP8B1/ABCB11 mutations?" Liver International: Official Journal of the International Association for the Study of the Liver, 2013, 33(8):1266-1270.
Shimizu et al., "Living-related liver transplantation for siblings with progressive familial intrahepatic cholestasis 2, with novel genetic findings," Am. J. Transplant., 2011, 11(2):394-398.
Shneider et al., "Placebo-Controlled Randomized Trial of an Intestinal Bile Salt Transport Inhibitor for Pruritus in Alagille Syndrome," Hepatol. Commun., Sep. 2018, 2(10):1184-1198.
Simons, "The fate of the orally administered bile acid sequestrant, polidexide, in humans," Clin. Exp. Pharmacol. Physiol., 3(1):99-101, Jan.-Feb. 1976.
Singh et al., "Alagille Syndrome and the Liver: Current Insights," Euroasian J. Hepatogastroenterol., Jul.-Dec. 2018, 8(2):140-147.
Singhal et al., "Drug polymorphism and dosage form design: a practical perspective," Adv. Drug Deliv. Rev., Feb. 23, 2004, 56(3):335-347.
Sirtori, "Mechanisms of lipid-lowering agents," Cardiology, 78(3):226-35, 1991.
Slavetinsky et al., "Odevixibat and partial external biliary diversion showed equal improvement of cholestasis in a patient with progressive familial intrahepatic cholestasis," BMJ Case Rep, 2020, 13:e234185.
Sohn et al., "Benign Recurrent Intrahepatic Cholestasis Type 2 in Siblings with Novel ABCB11 Mutations," Pediatr. Gastroenterol. Hepatol. Nutr., 2019, 22(2):201-206.
Somagutta et al., "Bile Cast Nephropathy: A Comprehensive Review," Cureus, Mar. 2022, 14(3):e23606.
Sorrentino et al., "A Clinical-Morphological Study on Cholestatic Presentation of Nonalcoholic Fatty Liver Disease," Digestive Disease and Sciences, Jun. 2005, 50(6):1130-1135.
Sprong et al., "Dietary Calcium Phosphate Promotes Listeria monocytogenes colonization and translocation in rats red diets containing corn oil but not milk fat1," J. Nutrition, 132(6):1269-1274, 2002.
Squires et al., "Clinical Variability After Partial External Biliary Diversion in Familial Intrahepatic Cholestasis 1 Deficiency," J. Pediatr. Gastroenterol. Nutr., 2017, 64(3):425-430.

(56) References Cited

OTHER PUBLICATIONS

Staels et al., "Bile acid sequestrants and the treatment of type 2 diabetes mellitus," Drugs, 67(10):1383-92, 2007.
Stalke et al., "Diagnosis of monogenic liver diseases in childhood by next-generation sequencing," Clin. Genet., Mar. 2018, 93(3):665-670.
Stein, "Managing Dyslipidemia in the High-Risk Patient," Am. J. Cardiol., 2002, 89:50-57.
Sterling et al., "Steatohepatitis: Risk factors and impact on disease severity in human immunodeficiency virus/hepatitis c virus coinfection," Hepatology, Apr. 2008, 47(4) 1118-1127.
Stindt et al., "A novel mutation within a transmembrane helix of the bile salt export pump (BSEP, ABCB11) with delayed development of cirrhosis," Liver Int., 2013, 33(10):1527-1735.
Stolz et al., "Severe and protracted cholestasis in 44 young men taking bodybuilding supplements: assessment of genetic, clinical and chemical risk factors," Aliment. Pharmacol. Ther., 2019, 49(9):1195-1204.
Stone et al., "Biochemical characterization of P4-ATPase mutations identified in patients with progressive familial intrahepatic cholestasis," J. Biol. Chem., 2012, 287(49):41139-51.
Strautnieks et al., "Severe bile salt export pump deficiency: 82 different ABCB11 mutations in 109 families," Gastroenterology, 2008, 134(4):1203-1214.
Sturm et al., "The ileal bile acid transport inhibitor A4250 reduced pruritus and serum bile acid levels in children with cholestatic liver disease and pruritus: final results from a multiple-dose, open-label, multinational study," Abstract No. 1200, Presented at Proceedings of the 68th Annual Meeting of the American Association for the Study of Liver Diseases, Washington, DC, Oct. 20-24, 2017, Hepatology, Oct. 2017, 66(S1):646A-647A.
Sugita et al., "Analysis of the serum bile Acid composition for differential diagnosis in patients with liver disease," Gastroenterol. Res. Pract., 2015, 2015:717431.
Sun et al., "Bile acids promote diethylnitrosamine-induced hepatocellular carcinoma via increased inflammatory signaling," American Journal of Physiology-Gastrointestinal and Liver Physiology, May 5, 2016, 311(1):G91-104.
Sundaram et al., "Mechanism of Dyslipidemia in Obesity-Unique Regulation of Ileal Villus Cell Brush Border Membrane Sodium-Bile Acid Cotransport," Cells, Oct. 2019, 8(10):1197.
Suzuki et al., "Mechanisms of regulation of bile acid transport in the small intestine," Falk Symposium, 165:76-81, 2009.
Takahashi et al., "Gradual improvement of liver function after administration of ursodeoxycholic acid in an infant with a novel ABCB11 gene mutation with phenotypic continuum between BRIC2 and PFIC2," Eur. J. Gastroenterol. Hepatol., 2007, 19(11):942-6.
Tanaka et al., "Genetic and Familial considerations of Primary Biliary Cirrhosis," Am. J. Gastroenterology, 2001, 96(1): 8-15.
Thebaut et al., "An update on the physiopathology and therapeutic management of cholestatic pruritus in children," Clin. Res. Hepatol. Gastroenterol., 2018, 42(2):103-109.
Thompson et al., "Interim results from an ongoing, open-label, single-arm trial of odevixibat in progressive familial intrahepatic cholestasis," JHEP Rep., Apr. 2023, 5(8):100782.
Thompson et al., "Odevixibat treatment in progressive familial intrahepatic cholestasis: a randomised, placebo-controlled, phase 3 trial," Lancet Gastroenterol. Hepatol., Sep. 2022, 7(9):830-842.
Thornber, "Isosterism and molecular modification in drug design," Chem. Soc. Rev., 1979, 8(4):563-580.
Tian et al., "Factors affecting crystallization of hydrates," J. Pharm. Pharmacol., 2010, 62:1534-1546.
Tibesar et al., "Two Cases of Progressive Familial Intrahepatic Cholestasis Type 2 Presenting with Severe Coagulopathy without Jaundice," Case Rep. Pediatr., 2014, 2014:185923.
Tinti et al., "Cholemic Nephropathy as Cause of Acute and Chronic Kidney Disease. Update on an Under-Diagnosed Disease," Life, Nov. 2021, 11(11):1200.
Togawa et al., "Diversity of ATP8B1 mutations in Japanese patients with intrahepatic cholestasis associated with low gamma-glutamyl transpeptidase level," Journal of Pediatric Gastroenterology and Nutrition, 2018, 67(1):S363, Abstract No. 615.
Tollefson et al., "A novel class of apical sodium co-dependent bile acid transporter inhibitors: the 1,2-benzothiazepines," Bioorganic and Medicinal Chemistry Letters, 12:3727-3730, 2003.
Trauner et al., "Inflammation-induced cholestasis," J. Gastroenterol. Hepatol., Dec. 2001, 14:10:946-959.
Treepongkaruna et al., "Novel ABCB11 mutations in a Thai infant with progressive familial intrahepatic cholestasis," World J. Gastroenterol. 2009, 15(34):4339-4342.
Tremont et al., "Discovery of Potent, Nonsystemic Apical Sodium-Codependent Bile Acid Transporter Inhibitors (Part 1)," J. Med. Chem, 2005, 48:5837-5852.
Turnpenny et al., "Alagille syndrome: pathogenesis, diagnosis and management," Eur. J. Hum. Genet., Mar. 2012, 20(3):251-257.
Tyas et al., "Recent Advances of Hepatitis B Detection towards Paper-Based Analytical Devices," Scientific World Journal, Feb. 2021, 2021:6643573.
Tyle, "Effect of size, shape and hardness of particles in suspension on oral texture and palatability," Acta Psychologica, 1993, 84(1):111-118.
Uegaki et al., "Successful treatment with colestimide for a bout of cholestasis in a Japanese patient with benign recurrent intrahepatic cholestasis caused by ATP8B1 mutation," Intern. Med., 2008, 47(7):599-602.
Van der Woerd et al., "Analysis of aberrant pre-messenger RNA splicing resulting from mutations in ATP8B1 and efficient in vitro rescue by adapted U1 small nuclear RNA," Hepatology, 2015, 61(4):1382-1391.
Van der Woerd et al., "Mutational analysis of ATP8B1 in patients with chronic pancreatitis," PLoS One, 2013, 8(11):e80553.
Van Heek et al., "In vivo metabolism-based discovery of a potent cholesterol absorptions inhibitor, sch58235, in the rat and rhesus monkey through the identification of the active metabolites of sch48461," J. Pharmacol. Exp. Med, 1997, 283(1):157-163.
Van Mil et al., "Benign recurrent intrahepatic cholestasis type 2 is caused by mutations in ABCB11," Gastroenterology, 2004, 127(2):379-384.
Van Tilberg et al., "Na+-dependent bile acid transport in the ileum: the balance between diarrhea and constipation," Gastroenterology, 98(1):25-32, 1989.
Van Wessel et al., "Factors associated with the natural course of disease in patients with FC1-deficiency: the NAPPED-consortium," J. Pediatr. Nutr., May 2019, 68(suppl. 1):688-689.
Van Wessel et al., "Genotype correlates with the natural history of severe bile salt export pump deficiency," J. Hepatol., Jul. 2020, 73(1):84-93.
Van Wessel et al., "Impact of Genotype, Serum Bile Acids, and Surgical Biliary Diversion on Native Liver Survival in FIC1 Deficiency," Hepatology, Aug. 2021, 74(2):892-906.
Vanderpas et al., "Malabsorption of liposoluble vitamins in a child with bile acid deficiency," J. Pediatr. Gastroenterol. Nutr., Jan.-Feb. 1987, 6(1):33-41.
Vandriel et al., "Natural history of liver disease in a large international cohort of children with Alagille syndrome: Results from the GALA study," Hepatology, Feb. 2023, 77(2):512-529.
Variankaval et al., "From Form to Function: Crystallization of Active Pharmaceutical Ingredients," AIChE Journal, Jul. 2008, 54(7):1682-1688.
Varma et al., "Retargeting of bile salt export pump and favorable outcome in children with progressive familial intrahepatic cholestasis type 2," Hepatology, 2015, 62(1):198-206.
Vasavan et al., "Heart and bile acids—Clinical consequences of altered bile acid metabolism," BBA—Molecular Basis of Disease, 2018, 1864:1345-1355.
Vaz et al., "Sodium taurocholate cotransporting polypeptide (SLC10A1) deficiency: conjugated hypercholanemia without a clear clinical phenotype," Hepatology, 2015, 61(1):260-267.
Venkat et al., "Total serum bilirubin predicts fat-soluble vitamin deficiency better than serum bile acids in infants with biliary atresia," J. Pediatr. Gastroenterol. Nutr., Dec. 2014, 59(6):702-707.
Vertommen et al., "The influence of five selected processing and formulation variables on the particle size, particle size distribution,

(56) References Cited

OTHER PUBLICATIONS and friability of pellets produced in a rotary processor," Drug Dev. Ind. Pharm., 1997, vol. 23, p. 39-46.
Vippagunta et al., "Crystalline solids," Advanced Drug Delivery Reviews, 48:3-26, 2001.
Vitale et al., "Cryptogenic cholestasis in young and adults: ATP8B1, ABCB11, ABCB4, and TJP2 gene variants analysis by high-throughput sequencing," J. Gastroenterol., 2018, 53(8):945-958.
Waisbourd-Zinman et al., "A Rare BSEP Mutation Associated with a Mild Form of Progressive Familial Intrahepatic Cholestasis Type 2," Ann. Hepatol., 2017, 16(3):465-468.
Walkowiak-Tomczak, "Characteristics of plums as a raw material with valuable nutritive and dietary properties—a review," Pol. J. Food Nutr. Sci., 58(4):401-405, 2008.
Walsh et al., "Patient acceptability, safety and access: A balancing act for selecting age-appropriate oral dosage forms for paediatric and geriatric populations," Int. J. Pharm., 2017, 536(2):547-562.
Walsh et al., "Respiratory syncytial and other virus infections in persons with chronic cardiopulmonary disease," American Journal of Respiratory Critical Care Medicine, 1999, 160:791-795.
Wang et al., "Analysis of surgical interruption of the enterohepatic circulation as a treatment for pediatric cholestasis," Hepatology, May 2017, 65(5):1645-1654.
Wang et al., "Bile acid receptors and liver cancer," Curr. Pathobiol. Rep., Mar. 2013, 1(1):29-35.
Wang et al., "Increased hepatocellular carcinoma risk in chronic hepatitis B patients with persistently elevated serum total bile acid: a retrospective cohort study," Sci. Rep., Dec. 2016, 6:38180, 9 pages.
Wang et al., "Splicing analysis of rare/novel synonymous or intronic variants identified in ABCB11 heterozygotes presenting as progressive intrahepatic cholestasis with low γ-glutamyltransferase," Hepatol. Res., 2018, 48(7):574-584.
Wang et al., "The Features of GGT in Patients with ATP8B1 or ABCB11 Deficiency Improve the Diagnostic Efficiency," PLoS One, 2016, 11(4):e0153114.
Watts et al., "Colonic Drug Delivery," Drug Development and Industrial Pharmacy, 1997, 23(9):893-913.
Welberg et al., "Calcium and the prevention of colon cancer," Scandinavian J. Gasteroenterology Suppl., 188:52-59, 1991.
Whitington et al., "Partial external diversion of bile for the treatment of intractable pruritus associated with intrahepatic cholestasis," Gastroenterology, 95(1):130-136, 1988 (Abstract only).
Wikipedia.org [online], "Alagille Syndrome," posted on or about Feb. 11, 2005, retrieved on Feb. 12, 2012, retrieved from URL<http://en.wikipedia.org/wiki/Alagille_syndrome>, 3 pages.
Wikipedia.org [online], "Progressive familial intrahepatic cholestasis," posted on or about Feb. 24, 2006, retrieved from URL<http://en.wikipedia.org/wiki/Progressive_familial_intrahepatic_cholestasis>, 3 pages.

Williams et al., "Foye's Principles of Medicinal Chemistry," 5th Edition, 2002, pp. 59-63.
Wolff, "Burger's Medicinal Chemistry, 5ed, Part I," John Wiley & Sons, 1995, pp. 975-977.
Wong et al., "Utility of oligonucleotide array-based comparative genomic hybridization for detection of target gene deletions," Clin. Chem., 2008, 54(7):1141-1148.
Woolbright et al., "Novel insight into mechanisms of cholestatic liver injury," World J. Gastroenterol., 18(36):4985-4993, 2012.
Wu et al., "Discovery of a highly potent, nonabsorbable apical sodium-dependent bile acid transporter inhibitor (GSK2330672) for treatment of type 2 diabetes," J. Med. Chem., 2013, 56(12):5094-5114.
Xie et al., "Dysregulated hepatic bile acids collaboratively promote liver carcinogenesis," Int. J. Cancer, Oct. 15, 2016, 139(8):1764-1775.
Yan et al., "Sodium taurocholate cotransporting polypeptide is a functional receptor for human hepatitis B and D virus," Elife, Nov. 2012, 1:e00049.
Yang et al., "ASBT(SLC10A2): A promising target for treatment of diseases and drug discovery," Biomed. Pharmacother., Dec. 2020, 132:110835, 16 pages.
Yang et al., "Partial external biliary diversion in children with progressive familial intrahepatic cholestasis and Alagille disease," Journal of Pediatric Gastroenterology and Nutrition, 49:216-221, 2009.
Yerushalmi et al., "Bile acid-induced rat hepatocyte apoptosis is inhibited by antioxidants and blockers of the mitochondrial," Hepatology, 33(3):616-626, 2001.
Zarenezhad et al., "Investigation of Common Variations of ABCB4, ATP8B1 and ABCB11 Genes in Patients with Progressive Familial Intrahepatic Cholestasis," Hepatitis Monthly, 2017, 17(2):e43500.
Zhang et al., "Abcb11 deficiency induces cholestasis coupled to impaired B-fatty acid oxidation in mice," Journal of Biological Chemistry, 287(29):24784-2479, 2012.
Zhang et al., "Effect of bile duct ligation on bile acid composition in mouse serum and liver," Liver Int., 32(1):58-69, 2012.
International Search Report and Written Opinion in International Appln. No. PCT/EP2023/085128, mailed on Feb. 27, 2024, 11 pages.
Karimi-Jafari et al., "Creating cocrystals: A review of pharmaceutical cocrystal preparation routes and applications," Crystal Growth & Design, Aug. 2018, 18(10):6370-6387.
Sugden et al., "Efficient Screening of Coformers for Active Pharmaceutical Ingredient Cocrystallization," Crystal Growth & Design, Jun. 2022, 22(7):4513-4527.
Thakuria et al., "Drug-drug and drug-nutraceutical cocrystal/salt as alternative medicine for combination therapy: a crystal engineering approach," Crystals, Feb. 2018, 8(2):101, 39 pages.

\* cited by examiner

PHARMACEUTICAL FORMULATION OF ODEVIXIBAT

CROSS-REFERENCE TO RELATED APPLICATIONS

This application is a Divisional of U.S. application Ser. No. 16/477,160, filed on Jul. 10, 2019, which is a National Stage Application under 35 U.S.C. § 371 of International Application No. PCT/SE2019/050603, filed Jun. 20, 2019, which claims priority to Swedish Application No. 1850761-6, filed Jun. 20, 2018, and to Swedish Application No. 1850762-4, filed Jun. 20, 2018, the disclosures of which are incorporated by reference herein in their entireties.

SEQUENCE LISTING

This application contains a Sequence Listing that has been submitted electronically as an XML file named "23854-0053003_SL_ST26.XML." The XML file, created on Sep. 26, 2023, is 16,384 bytes in size. The material in the XML file is hereby incorporated by reference in its entirety.

TECHNICAL FIELD

The invention relates to a pharmaceutical formulation, e.g. a paediatric formulation, of odevixibat, which comprises a plurality of small particles. The formulation may be used in the treatment of liver diseases, such as bile acid-dependent liver diseases, and particularly cholestatic liver diseases such as biliary atresia, progressive familial intrahepatic cholestasis (PFIC), Alagille syndrome (ALGS) and paediatric cholestatic pruritus. The invention also relates to a process for the preparation of the pharmaceutical formulation.

BACKGROUND

The compound 1,1-dioxo-3,3-dibutyl-5-phenyl-7-methylthio-8-(N-{(R)-α-[N-((S)-1-carboxypropyl) carbamoyl]-4-hydroxybenzyl}carbamoylmethoxy)-2,3,4,5-tetrahydro-1,2,5-benzothiadiazepine (odevixibat; also known as A4250) is disclosed in WO 03/022286. The structure of odevixibat is shown below.

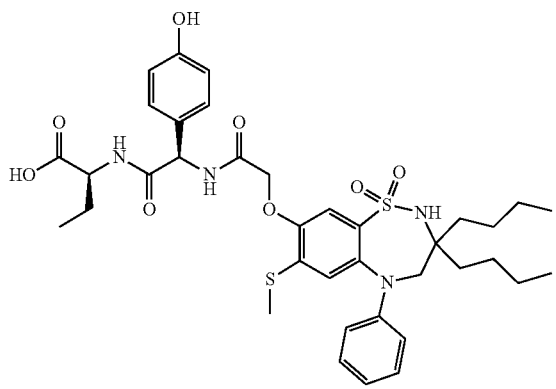 [SMILES: CCCCC1(CCCC)CN(c2ccccc2)c2cc(SC)c(OCC(=O)N[C@@H](C(=O)N[C@@H](CC)C(=O)O)c3ccc(O)cc3)cc2S(=O)(=O)N1]

As an inhibitor of the ileal bile acid transport (IBAT) mechanism, odevixibat inhibits the natural reabsorption of bile acids from the ileum into the hepatic portal circulation. Bile acids that are not reabsorbed from the ileum are instead excreted into the faeces. The overall removal of bile acids from the enterohepatic circulation leads to a decrease in the level of bile acids in serum and the liver. Odevixibat, or a pharmaceutically acceptable salt thereof, is therefore useful in the treatment of liver diseases that are associated with elevated bile acid levels, and particularly in the treatment of rare paediatric cholestatic liver diseases.

Odevixibat exhibits high potency and should be administered in low doses, such as ranging from about 40 to about 120 µg/kg. This corresponds to doses as low as 200 to 800 µg in the treatment of paediatric patients that weigh about 5 to 20 kg (e.g., infants and toddlers). It is desirable that a formulation of odevixibat can be administered to young patients in a dosage form having a small size. It is further desirable that such a formulation has good palatability, is not perceived as gritty, and is well-tolerated by infants and small children.

Multiparticulates can be administered to infants from birth if they are administered with a liquid. For children aged approximately 6 months and older (i.e. after weaning), the multiparticulates can be administered in their solid form either directly into the mouth or mixed with semi-solid food. Particle size, shape, texture, hardness, taste and dose volume (i.e., the number of particles) have been reported to be important for acceptability of multiparticulates by infants and children (Kozarewicz, Int. J. Pharm. 2014, vol. 469, pp 245-248). Various literature reviews have been conducted on the acceptability of different oral dosage forms in paediatric and older adult patients (see e.g. Liu, et al., Drugs 2014, vol. 74, pp. 1871-1889; Drumond et al., Int. J. Pharm. 2017, vol. 521, pp. 294-305; Mistry et al., J. Pharm. Pharmacol. 2017, vol. 69, pp. 361-376; Walsh et al., Int. J. Pharm. 2017, vol. 536, pp. 547-562), but the size and/or dose volume (amount) of multiparticulates investigated have not always been reported in these reviews.

Perception of grittiness may be influenced by a range of factors including particle size, quantity and dosing vehicle (see Mishra et al., Yakugaku Zasshi 2009, vol. 129, pp. 1537-1544; Lopez et al., Eur. J. Pharm. Sci. 2016, vol. 92, pp. 156-162) as well as the hardness and shape of the particles (Tyle, Acta Psychologica 1993, vol. 84, pp. 111-118), with irregular particles being perceived as larger than round (spherical) particles of the same size (Engelen et al., J. Text. Studies 2005, vol. 36, pp. 373-386). Grittiness perception studies have shown that grittiness scores may increase with increasing size and dose of the multiparticulates, whereas grittiness scores may decrease with increasing vehicle viscosity (Lopez et al., Eur. J. Pharm. Sci. 2016, vol. 92, pp. 156-162).

Capsules can be acceptable for children from approximately 6 years of age. The swallowability of the capsules can depend upon the dosage form dimensions (i.e. the size) and the ability of the child. The size, shape, taste and after taste are important capsule attributes that can influence patient acceptability (Kozarewicz, Int. J. Pharm. 2014, vol. 469, pp 245-248). In some embodiments, the size of the capsules is kept as small as possible, and the number of capsules required per dose is kept to a minimum, e.g. not more than 1-3 capsules.

In view of the above, there is a need for a formulation of odevixibat that can be easily administered in small doses adapted to the patients' weight. In some embodiments, the formulation should be suitable for treating very young patients, should be easy to swallow, and should not be perceived as gritty.

DETAILED DESCRIPTION OF THE INVENTION

Figure 1:
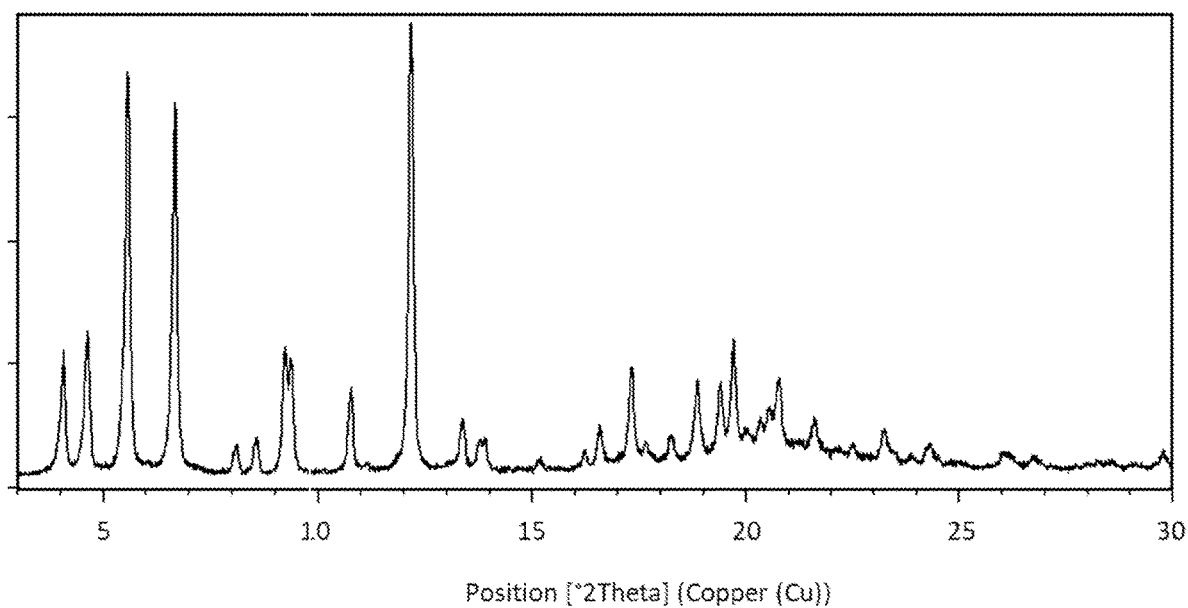
FIG. 1 shows the X-ray powder diffractogram of dried crystal modification 1.

Provided herein is a multiparticulate formulation containing low doses of odevixibat. In some embodiments, the formulation is a paediatric formulation. In some embodiments, the formulation enables weight-based dosing and can be sprinkled onto food. The formulation can be designed to have a good palatability, with an optimal balance between particle size and dose volume.

In a first aspect, the invention relates to a pharmaceutical formulation of odevixibat, comprising a plurality of particles, wherein each particle contains odevixibat, or a pharmaceutically acceptable salt thereof, in an amount of from about 0.1% w/w to about 5.0% w/w based on the total weight of the particle.

Because of the low doses in which odevixibat is to be administered, and further because of the multiparticulate form of the application, each particle of the formulation contains only a very low amount of the active ingredient. For example, the amount of odevixibat, or a pharmaceutically acceptable salt thereof, in each particle can be from about 0.2% w/w to about 3.5% w/w, preferably from about 0.3% w/w to about 3.0% w/w, more preferably from about 0.4% w/w to about 2.5% w/w, and most preferably from about 0.5% w/w to about 2.0% w/w based on the total weight of the particle. In one preferred embodiment, each particle contains odevixibat, or a pharmaceutically acceptable salt thereof, in an amount of about 0.5% w/w based on the total weight of the particle. In another preferred embodiment, each particle contains odevixibat, or a pharmaceutically acceptable salt thereof, in an amount of about 1.0% w/w based on the total weight of the particle. In yet another preferred embodiment, each particle contains odevixibat, or a pharmaceutically acceptable salt thereof, in an amount of about 1.5% w/w based on the total weight of the particle.

As used herein, the term "particles" refers to small particles ranging in size from about 0.1 to about 1.5 mm. Such particles are preferably essentially spherical, although elongated or oblong particles also might be used. The particles may e.g. be pellets, beads, microparticles, microspheres, granules or minitablets, and may optionally be coated with one or more coating layers surrounding every such pellet, bead, microparticle, microsphere, granule or minitablet.

In some embodiments, the particles of the formulation are small enough, that they can be sprinkled onto food and easily swallowed. In some embodiments, the particles can be swallowed without causing a perception of grittiness. In some embodiments, the particles do not give the patient an urge to chew the particles. The particles are, therefore, preferably between about 0.1 and about 1.5 mm in size, more preferably between about 0.1 and about 1.0 mm, and more preferably between about 0.1 and 0.8 mm, such as about 0.2 mm, about 0.3 mm, about 0.4 mm, about 0.5 mm, about 0.6 mm, or about 0.7 mm. In a more preferred embodiment, the particles are between about 0.4 and about 0.8 mm, such as about 0.5 mm, or such as about 0.6 mm, or such as about 0.7 mm. In a particular embodiment of the invention, the particles are about 0.7 mm.

In some embodiments, the invention relates to a formulation of odevixibat, wherein each particle comprises a core and a coating layer surrounding the core. The core of each particle may be a pellet, a granule, a minitablet, a bead, a microparticle or a microsphere.

In some embodiments, the core of each particle comprises the active pharmaceutical ingredient (odevixibat), while the coating layer of each particle does not comprise the active pharmaceutical ingredient. In some embodiments, the core of each particle comprises from about 0.1% to about 5% w/w of the active pharmaceutical ingredient, based on the total weight of the particle, such as from about 0.1% to about 2% w/w, such as from about 0.1% to about 1% w/w, or such as from about 0.1% to about 0.5% w/w of the active pharmaceutical ingredient, based on the total weight of the particle.

In some embodiments, the coating layer of each particle comprises the active pharmaceutical ingredient (odevixibat), while the core of each particle does not comprise the active pharmaceutical ingredient. In some embodiments, the coating layer of each particle comprises from about 0.1% to about 5% w/w of the active pharmaceutical ingredient, based on the total weight of the particle, such as from about 0.1% to about 2% w/w, such as from about 0.1% to about 1% w/w, or such as from about 0.1% to about 0.5% w/w of the active pharmaceutical ingredient, based on the total weight of the particle.

The cores may be orally dispersible and comprise soluble ingredients such as a sugar (e.g., sucrose) or a soluble polymer (e.g. hydroxypropyl methylcellulose) or may be non-orally dispersible and comprise non-soluble ingredients such as a non-soluble polymer (e.g., microcrystalline cellulose). In a preferred embodiment of the invention, the cores comprise microcrystalline cellulose. In a more preferred embodiment, the cores are microcrystalline cellulose spheres.

The coating layer can further comprise a film-forming polymer, such as a cellulose-based polymer, a polysaccharide-based polymer, an N-vinylpyrrolidone-based polymer, an acrylate, an acrylamide, or copolymers thereof. Examples of suitable film-forming polymers include polyvinyl alcohol (PVA), polyvinyl acetate phthalate (PVAP), polyethylene glycol (PEG), polyvinylpyrrolidone (PVP), methacrylic acid copolymers, starch, hydroxypropyl starch, chitosan, shellac, methyl cellulose, hydroxypropyl cellulose (HPC), low-substituted hydroxypropyl cellulose, hydroxypropyl methylcellulose (HPMC; or hypromellose), hydroxypropyl methylcellulose acetate succinate (HPMCAS), hydroxypropyl methylcellulose phthalate (HPMCP), cellulose acetate phthalate (CAP), cellulose acetate trimellitate (CAT), as well as combinations thereof, such as a mixture of methyl cellulose and hydroxypropyl methylcellulose (metolose). In a preferred embodiment, the coating layer comprises a film-forming polymer selected from the group consisting of hydroxypropyl methylcellulose, polyvinyl alcohol (PVA), polyethylene glycol (PEG), starch, hydroxypropyl starch and hydroxypropyl cellulose (HPC). In a most preferred embodiment, the coating layer comprises hydroxypropyl methylcellulose as the film-forming polymer.

The coating layer may optionally comprise one or more additional ingredients, such as a plasticizer (e.g. polyethylene glycol, triacetin or triethyl citrate), an anti-tack agent (e.g. talc or magnesium stearate) or a colouring agent (e.g. titanium dioxide, iron oxides, riboflavin or turmeric).

In some embodiments, the formulation comprises odevixibat in crystalline form. In some embodiments, the formulation comprises a crystalline hydrate of odevixibat. In some embodiments, the formulation comprises crystal modification 1 of odevixibat. This stable crystal modification can be obtained from a slurry of odevixibat in a mixture of water and an organic solvent such as ethanol. Under these conditions, a mixed solvate containing about two moles of water and about one to about three, such as about two to about three, moles of ethanol per mole of odevixibat (e.g., a dihydrate-diethanolate or a dihydrate-triethanolate) is initially formed. This mixed solvate is referred to herein as crystal modification 2. When crystal modification 2 is dried, such as under vacuum (e.g., less than 5 mbar) or under a nitrogen flow, it loses its organic solvent molecules and becomes crystal modification 1. In some embodiments, the transformation of crystal modification 2 to crystal modification 1 proceeds via a crystalline intermediate. It is believed that this crystalline intermediate is a dehydrated form, which quickly takes up water from the air. While not wishing to be bound by theory, it is believed that the solvent molecules can be removed without dissolution and recrystallization of the crystals.

Crystal modification 1 of odevixibat cannot only be obtained from a mixture of water and ethanol, as described above, but also from a slurry of odevixibat in a mixture of water and an organic solvent selected from the group consisting of methanol, 2-propanol, acetone, acetonitrile, 1,4-dioxane, DMF and DMSO. Upon drying of the different mixed solvates obtained under these conditions (crystal modification 2), the same crystalline hydrate of odevixibat is obtained, namely crystal modification 1.

Crystal modification 1 contains void volumes that are capable of containing up to about 2 moles of water associated with the crystal per mole of odevixibat, depending on the relative humidity. This form is therefore formally a channel hydrate. At about 30% relative humidity, however, crystal modification 1 contains a substantially stoichiometric amount of about 1.5 moles of water per mole of organic compound and is thus a sesquihydrate. The substantially stoichiometric amount of water is considered advantageous, as the water content of the crystals remains substantially constant even with humidity changes within the normal relative humidity range of about 30% to about 70% RH. Indeed, at normal humidities, such as between about 30 and about 70% RH, crystal modification 1 exhibits relatively low hygroscopicity.

In one embodiment, the formulation comprises crystal modification 1 of odevixibat having an X-ray powder diffraction (XRPD) pattern, obtained with CuKα1-radiation, with at least specific peaks at °2θ positions 5.6±0.2, 6.7±0.2 and/or 12.1±0.2.

In a specific embodiment, the formulation comprises crystal modification 1 having an XRPD pattern, obtained with CuKα1-radiation, with specific peaks at °2θ positions 5.6±0.2, 6.7±0.2 and 12.1±0.2 and one or more of the characteristic peaks: 4.1±0.2, 4.6±0.2, 9.3±0.2, 9.4±0.2 and 10.7±0.2.

In a more specific embodiment, the formulation comprises crystal modification 1 having an XRPD pattern, obtained with CuKα1-radiation, with specific peaks at °2θ positions 4.6±0.2, 5.6±0.2, 6.7±0.2, 9.3±0.2, 9.4±0.2 and 12.1±0.2.

In a more specific embodiment, the formulation comprises crystal modification 1 having an XRPD pattern, obtained with CuKα1-radiation, with characteristic peaks at °2θ positions 4.1±0.2, 4.6±0.2, 5.6±0.2, 6.7±0.2, 9.3±0.2, 9.4±0.2, 10.7±0.2 and 12.1±0.2, and one or more of 8.1±0.2, 8.6±0.2, 13.4±0.2, 13.8±0.2, 13.9±0.2, 16.6±0.2, 17.3±0.2, 17.7±0.2, 18.3±0.2, 18.9±0.2, 19.4±0.2, 19.7±0.2, 20.5±0.2, 20.8±0.2, 21.6±0.2, 23.2±0.2, 24.3±0.2, 29.8±0.2 and 30.6±0.2.

In an even more specific embodiment, the formulation comprises crystal modification 1 having an XRPD pattern, obtained with CuKα1-radiation, with characteristic peaks at °2θ positions 4.1±0.2, 4.6±0.2, 5.6±0.2, 6.7±0.2, 8.1±0.2, 8.6±0.2, 9.3±0.2, 9.4±0.2, 10.7±0.2, 12.1±0.2, 13.4±0.2, 13.8±0.2, 13.9±0.2, 16.6±0.2, 17.3±0.2, 17.7±0.2, 18.3±0.2, 18.9±0.2, 19.4±0.2, 19.7±0.2, 20.5±0.2, 20.8±0.2, 21.6±0.2, 23.2±0.2, 24.3±0.2, 29.8±0.2 and 30.6±0.2.

In another embodiment, the formulation comprises crystal modification 1 having an XRPD pattern, obtained with CuKα1-radiation, substantially as shown in FIG. 1.

Whereas crystal modification 1 is a sesquihydrate containing about 3.5% (w/w) water at about 30% relative humidity (based on the total crystal weight), it has been observed that the crystal can take up an additional 1.5% (w/w) water when the humidity is increased up to 95% RH. The sorption and desorption of this additional water is fully reversible. The additional water may be adsorbed on the surface or may further fill the channels of the structure. In some embodiments, the term "overhydrated" refers to crystal modification 1 containing from about 1.5 to about 4 moles of water per mole of odevixibat, such as from about 1.5 to about 3.5, or such as from about 1.5 to 3, or such as from about 1.5 to about 2.5, or such as from about 1.5 to about 2 moles of water per mole of odevixibat. In some embodiments, the term "overhydrated" refers to crystal modification 1 containing from about 2 to about 4 moles of water per mole of odevixibat, such as from about 2 to about 3.5, or such as from about 2 to about 3, or such as from about 2 to 2.5 moles of water per mole of odevixibat.

Figure 3:
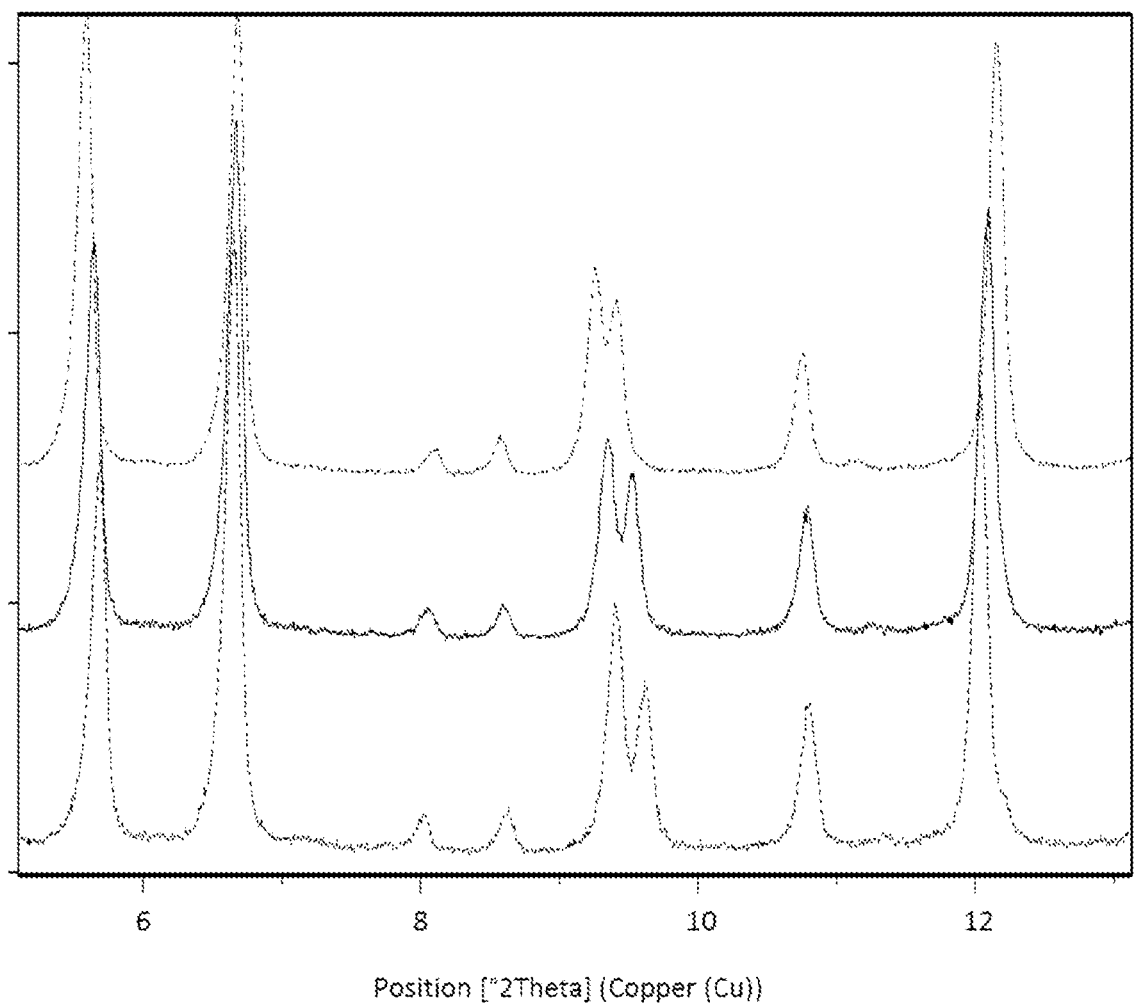
FIG. 3 shows the drying of crystal modification 1, with the X-ray powder diffractogram of an overhydrated sample of crystal modification 1 at the bottom and of a dried sample at the top (2θ range 5-13°).
Figure 4:
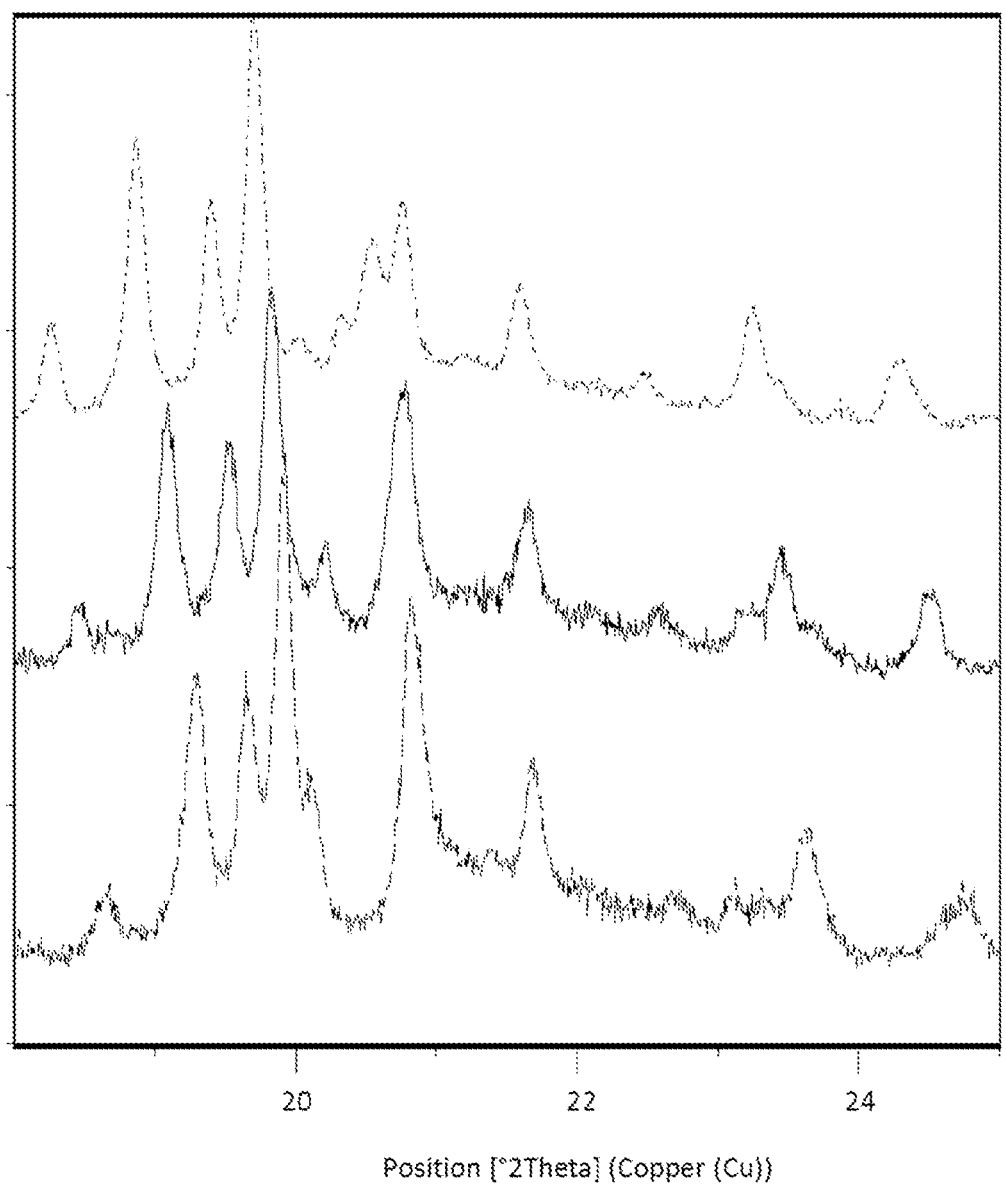
FIG. 4 shows the drying of crystal modification 1, with the X-ray powder diffractogram of an overhydrated sample of crystal modification 1 at the bottom and of a dry sample at the top (2θ range 18-25°).

It has been observed that the XRPD pattern of overhydrated crystal modification 1 slightly changes when it is dried, e.g. at 50° C. in vacuum. A small shift of peaks is most clearly seen in the 2θ ranges 5-13° and 18-25°, as shown in FIGS. 3 and 4, respectively. Exposing the dried modification to elevated relative humidity, such as up to 95% RH, makes the XRPD pattern of the overhydrated modification appear again. The peak shifts are a result of the unit cell volume changes, which occur as water molecules go in and out of the crystal structure.

Therefore, in another embodiment, the formulation comprises overhydrated crystal modification 1 having an X-ray powder diffraction (XRPD) pattern, obtained with CuKα1-radiation, with at least specific peaks at °2θ positions 5.7±0.2, 6.7±0.2 and/or 12.0±0.2.

In a specific embodiment, the formulation comprises overhydrated crystal modification 1 having an XRPD pattern, obtained with CuKα1-radiation, with specific peaks at °2θ positions 5.7±0.2, 6.7±0.2 and 12.0±0.2 and one or more of the characteristic peaks: 4.0±0.2, 9.4±0.2, 9.6±0.2 and 10.8±0.2.

In a more specific embodiment, the formulation comprises overhydrated crystal modification 1 having an XRPD pattern, obtained with CuKα1-radiation, with specific peaks at °2θ positions 4.0±0.2, 5.7±0.2, 6.7±0.2, 9.4±0.2, 9.6±0.2, 10.8±0.2 and 12.1±0.2.

In a more specific embodiment, the formulation comprises overhydrated crystal modification 1 having an XRPD pattern, obtained with CuKα1-radiation, with characteristic peaks at °2θ positions 4.0±0.2, 5.7±0.2, 6.7±0.2, 9.4±0.2, 9.6±0.2, 10.8±0.2 and 12.1±0.2, and one or more of 4.7±0.2, 8.0±0.2, 8.6±0.2, 13.3±0.2, 14.1±0.2, 15.3±0.2, 16.5±0.2, 17.3±0.2, 19.3±0.2, 19.7±0.2, 19.9±0.2, 20.1±0.2, 20.8±0.2, 21.7±0.2, 23.6±0.2, 26.2±0.2, 26.5±0.2, 28.3±0.2 and 30.9±0.2.

In an even more specific embodiment, the formulation comprises overhydrated crystal modification 1 having an XRPD pattern, obtained with CuKα1-radiation, with characteristic peaks at °2θ positions 4.0±0.2, 4.7±0.2, 5.7±0.2, 6.7±0.2, 8.0±0.2, 8.6±0.2, 9.4±0.2, 9.6±0.2, 10.8±0.2, 12.1±0.2, 13.3±0.2, 14.1±0.2, 15.3±0.2, 16.5±0.2, 17.3±0.2, 19.3±0.2, 19.7±0.2, 19.9±0.2, 20.1±0.2, 20.8±0.2, 21.7±0.2, 23.6±0.2, 26.2±0.2, 26.5±0.2, 28.3±0.2 and 30.9±0.2.

Figure 2:
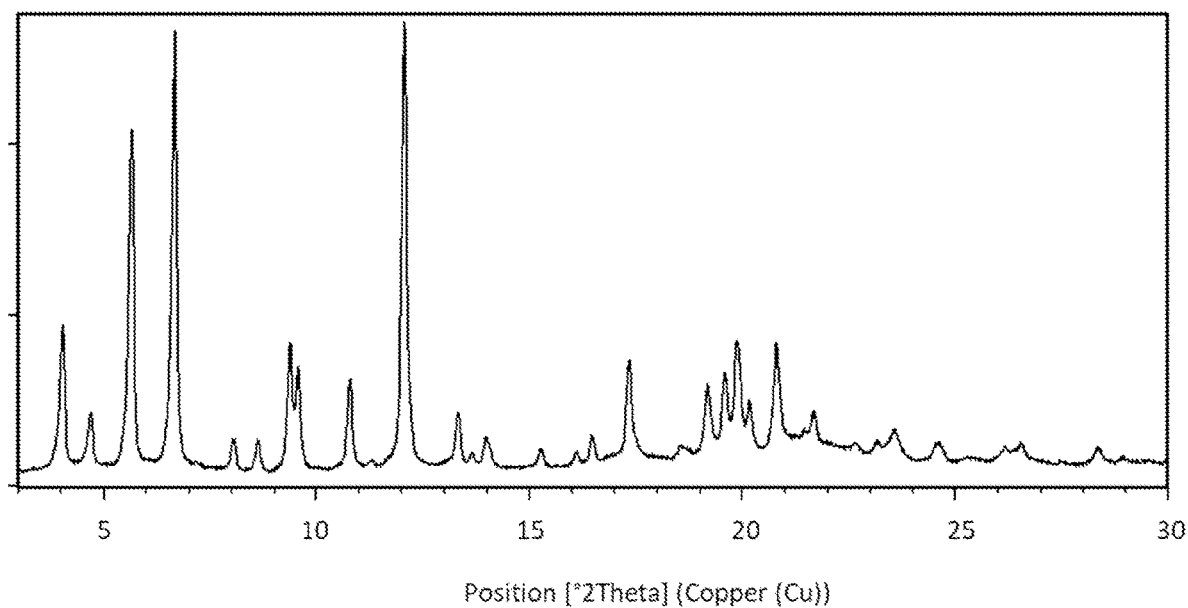
FIG. 2 shows the X-ray powder diffractogram of an overhydrated sample of crystal modification 1.

In another embodiment, the formulation comprises overhydrated crystal modification 1 of odevixibat having an XRPD pattern, obtained with CuKα1-radiation, substantially as shown in FIG. 2.

It is desirable that the use of organic solvents in the preparation of the formulation is avoided. In some embodiments, water is used as the solvent for the preparation of the formulation. Odevixibat dissolves in water only very poorly, and the solubility at pH 7 and at 37° C. has been determined to be as low as about 30 μg/mL. Because of this low solubility in water, aqueous suspensions of odevixibat can contain larger agglomerates of odevixibat, which may lead to an uneven distribution of the active pharmaceutical ingredient on the cores, i.e. the cores may contain different amounts of odevixibat, which in turn impacts dose uniformity. Accordingly, in some embodiments, the aqueous suspension of odevixibat is homogeneous. In some embodiments, a homogeneous aqueous suspension of odevixibat is sprayed onto the cores.

Odevixibat exhibits high potency and it should be administered in low doses, especially in the treatment of pediatric patients that weigh about 5 to 20 kg. In order to reach high dose uniformity for the multiparticulate formulation disclosed herein, it is important that each particle of the formulation substantially contains the same amount of odevixibat, i.e., the deviation in the odevixibat content of the particles of the formulation should be as low as possible.

As used herein, the term "homogeneous" refers to a suspension that does not contain agglomerates of odevixibat that are larger than about 200 μm, and preferably no agglomerates larger than about 100 μm, more preferably no agglomerates larger than about 50 μm. The size of the odevixibat agglomerates in the coating suspension may be determined by optical microscopy, using a method based on European Pharmacopoeia 9.0, monograph 2.9.37, and as described in the experimental section. Alternatively, the size of the odevixibat agglomerates in the coating suspension may be determined by light scattering techniques, such as low-angle laser light scattering (LALLS). In some embodiments, the $d_{90}$ value for the particle size distribution of the coating suspension is smaller than 15 μm, such as smaller than 14 μm, such as smaller than 13 μm, such as smaller than 12 μm, such as smaller than 11 μm, or such as smaller than 10 μm.

In some embodiments, a homogeneous suspension of odevixibat can be prepared by dispersing the compound in water by wet-milling. Wet-milling is a process in which a solid substance is dispersed in a liquid by shearing, by crushing, or by attrition. Examples of wet-milling apparatus include colloid mills, conical mills, ball mills, disc mills and high-shear dispersing machines. A specific example of a wet-milling apparatus for use in the present invention is a colloid mill.

In some embodiments, the crystallinity of odevixibat increases during the wet-milling.

Preferably, odevixibat is first wetted in a small amount of water using a homogenizer and thereafter dispersed in water using a colloid mill. Spraying the homogenized dispersion onto the cores enables an even distribution of the active pharmaceutical ingredient.

It is desirable that the formulation is free of any ingredients that are not strictly necessary for the formulation, such as surfactants. In a preferred embodiment, therefore, the coating suspension does not contain surfactants. Similarly, in some embodiments, the coating layer of the formulation does not contain surfactants.

In one embodiment, the particles are contained within a sachet. In another embodiment, the particles are contained within a capsule. Such capsules may be made from gelatine, from a cellulose-based polymer such as a hydroxypropyl methylcellulose (hypromellose), or from a polysaccharide-based polymer such as a pullulan. Capsules may be swallowed intact, or may be designed to be opened, so that, for example, the contents (i.e. the particles) can be sprinkled onto a food vehicle for administration. In the latter case, the number of particles in one capsule should preferably fit onto a single tablespoon of food. In some embodiments, a capsule contains from about 20 to about 100 mg of particles, such as about 30, about 40, about 50, about 60, about 70, about 80 or about 90 mg.

For younger paediatric patients, such as infants, toddlers and children up to about 6 years old, the particles are preferably sprinkled onto food that can be easily swallowed and which does not require chewing, such as yoghurt, apple sauce, fruit purée or oatmeal. For older paediatric patients, such as children older than about 6 years old, adolescents and younger adults, capsules containing the particles may be swallowed intact, i.e. without opening. For newborn patients up to about 6 months old, who have not yet been weaned or are unable to take semi-solid food, the formulation can be administered by dispersing the particles in a suitable liquid vehicle, such as breast milk, baby formula or water. When the particles have been dispersed in a liquid vehicle, they can be administered to the patient within 30 minutes after dispersion, without loss of the active ingredient or indications of degradation. In some embodiments, the volume of liquid vehicle used for administering the odevixibat particles, including rinsing, can be smaller than about 20 mL, such as smaller than about 15 mL, such as smaller than about 10 mL, or such as smaller than about 5 mL. In some embodiments, the dispersed particles are administered directly into the mouth using an oral syringe.

The formulation disclosed herein may be used in the treatment or prevention of liver diseases, such as bile acid-dependent liver diseases. In some embodiments, a liver disease involves elevated levels of bile acids in the serum and/or in the liver. The formulation disclosed herein may in particular be used in the treatment or prevention of cholestatic liver diseases, including rare paediatric cholestatic liver diseases, such as biliary atresia; post-Kasai biliary atresia; post-liver transplantation biliary atresia; progressive familial intrahepatic cholestasis (PFIC), including PFIC-1, PFIC-2, PFIC-3 and non-specified PFIC, post-biliary diversion PFIC and post-liver transplant PFIC; Alagille syndrome (ALGS); and primary biliary cirrhosis (PBC); as well as paediatric cholestatic pruritus. In one aspect, therefore, the invention relates to the formulation disclosed herein for use in the treatment or prevention of a cholestatic liver disease. In another aspect, the invention relates to a method of treating or preventing a cholestatic liver disease in a subject, such as a human, comprising administering to the subject in need of such treatment or prevention a therapeutically effective amount of the formulation disclosed herein.

Biliary atresia is a rare pediatric liver disease that involves a partial or total blockage (or even absence) of large bile ducts. This blockage or absence causes cholestasis that leads to the accumulation of bile acids that damages the liver. In some embodiments, the accumulation of bile acids occurs in the extrahepatic biliary tree. In some embodiments, the accumulation of bile acids occurs in the intrahepatic biliary tree. The current standard of care is the Kasai procedure, which is a surgery that removes the blocked bile ducts and directly connects a portion of the small intestine to the liver. There are currently no approved drug therapies for this disorder.

Provided herein are methods for treating biliary atresia in a subject in need thereof, the methods comprising administration of a therapeutically effective amount of the formulation disclosed herein. In some embodiments, the subject has undergone the Kasai procedure prior to administration of the formulation disclosed herein. In some embodiments, the subject is administered the formulation disclosed herein prior to undergoing the Kasai procedure. In some embodiments, the treatment of biliary atresia decreases the level of serum bile acids in the subject. In some embodiments, the level of serum bile acids is determined by, for example, an ELISA enzymatic assay or the assays for the measurement of total bile acids as described in Danese et al., PLoS One. 2017, vol. 12(6): e0179200, which is incorporated by reference herein in its entirety. In some embodiments, the level of serum bile acids can decrease by, for example, 10% to 40%, 20% to 50%, 30% to 60%, 40% to 70%, 50% to 80%, or by more than 90% of the level of serum bile acids prior to administration of the formulation disclosed herein. In some embodiments, the treatment of biliary atresia includes treatment of pruritus.

PFIC is a rare genetic disorder that is estimated to affect between one in every 50,000 to 100,000 children born worldwide and causes progressive, life-threatening liver disease.

One manifestation of PFIC is pruritus, which often results in a severely diminished quality of life. In some cases, PFIC leads to cirrhosis and liver failure. Current therapies include Partial External Biliary Diversion (PEBD) and liver transplantation, however, these options can carry substantial risk of post-surgical complications, as well as psychological and social issues.

Three alternative gene defects have been identified that correlate to three separate PFIC subtypes known as types 1, 2 and 3.

PFIC, type 1, which is sometimes referred to as "Byler disease," is caused by impaired bile secretion due to mutations in the ATP8B1 gene, which codes for a protein that helps to maintain an appropriate balance of fats known as phospholipids in cell membranes in the bile ducts. An imbalance in these phospholipids is associated with cholestasis and elevated bile acids in the liver. Subjects affected by PFIC, type 1 usually develop cholestasis in the first months of life and, in the absence of surgical treatment, progress to cirrhosis and end-stage liver disease before the end of the first decade of life.

PFIC, type 2, which is sometimes referred to as "Byler syndrome," is caused by impaired bile salt secretion due to mutations in the ABCB11 gene, which codes for a protein, known as the bile salt export pump, that moves bile acids out of the liver. Subjects with PFIC, type 2 often develop liver failure within the first few years of life and are at increased risk of developing a type of liver cancer known as hepatocellular carcinoma.

PFIC, type 3, which typically presents in the first years of childhood with progressive cholestasis, is caused by mutations in the ABCB4 gene, which codes for a transporter that moves phospholipids across cell membranes.

In addition, TJP2 gene, NR1H4 gene or Myo5b gene mutations have been proposed to be causes of PFIC. In addition, some subjects with PFIC do not have a mutation in any of the ATP8B1, ABCB11, ABCB4, TJP2, NR1H4 or Myo5b genes. In these cases, the cause of the condition is unknown.

Exemplary mutations of the ATP8B1 gene or the resulting protein are listed in Tables 1 and 2, with numbering based on the human wild type ATP8B1 protein (e.g., SEQ ID NO: 1) or gene (e.g., SEQ ID NO: 2). Exemplary mutations of the ABCB11 gene or the resulting protein are listed in Tables 4 and 5, with numbering based on the human wild type ABCB11 protein (e.g., SEQ ID NO: 3) or gene (e.g., SEQ ID NO: 4).

As can be appreciated by those skilled in the art, an amino acid position in a reference protein sequence that corresponds to a specific amino acid position in SEQ ID NO: 1 or 3 can be determined by aligning the reference protein sequence with SEQ ID NO: 1 or 3 (e.g., using a software program, such as ClustalW2). Changes to these residues (referred to herein as "mutations") may include single or multiple amino acid substitutions, insertions within or flanking the sequences, and deletions within or flanking the sequences. As can be appreciated by those skilled in the art, an nucleotide position in a reference gene sequence that corresponds to a specific nucleotide position in SEQ ID NO: 2 or 4 can be determined by aligning the reference gene sequence with SEQ ID NO: 2 or 4 (e.g., using a software program, such as ClustalW2). Changes to these residues (referred to herein as "mutations") may include single or multiple nucleotide substitutions, insertions within or flanking the sequences, and deletions within or flanking the sequences. See also Kooistra, et al., "KLIFS: A structural kinase-ligand interaction database," Nucleic Acids Res. 2016, vol. 44, no. D1, pp. D365-D371, which is incorporated by reference in its entirety herein.

TABLE 1

Exemplary ATP8B1 Mutations

Amino acid position 3 (e.g., T3K)[27]
Amino acid position 23 (e.g., P23L)[5]
Amino acid position 45 (e.g., N45T)[5,8,9]
Amino acid position 46 (e.g., R46X)[4,25]
Amino acid position 62 (e.g., C62R)[28]
Amino acid position 63 (e.g., T63T)[41]
Amino acid position 70 (e.g., D70N)[1,6]
Amino acid position 71 (e.g., R71H)[43]
Amino acid position 78 (e.g., H78Q)[19]
Amino acid position 82 (e.g., T82T)[41]
Amino acid position 92 (e.g., Y92Y)[41]
Amino acid position 93 (e.g., A93A)[6]
Amino acid position 96 (e.g., A96G)[27]
Amino acid position 114 (e.g., E114Q)[8]

TABLE 1-continued

Exemplary ATP8B1 Mutations

Amino acid position 127 (e.g., L127P[6], L127V[36])
Amino acid position 177 (e.g., T177T)[6]
Amino acid position 179 (e.g., E179X)[29]
Δ Amino acid positions 185-282[44]
Amino acid position 197 (e.g., G197Lfs*10)[22]
Amino acid position 201 (e.g., R201S[27], R201H[35])
Amino acid position 203 (e.g., K203E[5,8], K203R[9], K203fs[25])
Amino acid position 205 (e.g., N205fs[6], N205Kfs*2[35])
Amino acid position 209 (e.g., P209T)[4]
Amino acid position 217 (e.g., S217N)[43]
Amino acid position 232 (e.g., D232D)[30]
Amino acid position 233 (e.g., G233R)[38]
Amino acid position 243 (e.g., L243fs*28)[33]
Amino acid position 265 (e.g., C265R)[25]
Amino acid position 271 (e.g., R271X[13], R271R[30])
Amino acid position 288 (e.g., L288S)[6]
Amino acid position 294 (e.g., L294S)[43]
Amino acid position 296 (e.g., R296C)[11]
Amino acid position 305 (e.g., F305I)[28]
Amino acid position 306 (e.g., C306R)[23]
Amino acid position 307 (e.g., H307L)[35]
Amino acid position 308 (e.g., G308V[1], G308D[6], G308S[35])
Amino acid position 314 (e.g., G314S)[13]
Amino acid position 320 (e.g., M320Vfs*13)[11]
Amino acid position 337 (e.g., M337R)[18]
Amino acid position 338 (e.g., N338K)[18]
Amino acid position 340 (e.g., M340V)[18]
Amino acid position 344 (e.g., I344F)[6,20]
Amino acid position 349 (e.g., I349T)[41]
Amino acid position 358 (e.g., G358R)[28]
Amino acid position 367 (e.g., G367G)[41]
Amino acid position 368 (e.g., N368D)[41]
Amino acid position 393 (e.g., I393V)[27]
Amino acid position 403 (e.g., S403Y)[6]
Amino acid position 407 (e.g., S407N)[40]
Amino acid position 412 (e.g., R412P)[6]
Amino acid position 415 (e.g., Q415R)[27]
Amino acid position 422 (e.g., D422H)[35]
Amino acid position 429 (e.g., E429A)[6]
Amino acid position 446 (e.g., G446R)[4,11]
Amino acid position 453 (e.g., S453Y)[6]
Amino acid position 454 (e.g., D454G)[6]
Amino acid position 455 (e.g., K455N)[43]
Amino acid position 456 (e.g., T456M[3,6], T456K[35])
Amino acid position 457 (e.g., G457G[6], G457fs*6[33])
Amino acid position 469 (e.g., C469G)[41]
Amino acid position 478 (e.g., H478H)[41]
Amino acid position 500 (e.g., Y500H)[6]
Amino acid position 525 (e.g., R525X)[4]
Δ Amino acid position 529[6]
Amino acid position 535 (e.g., H535L[6], H535N[41])
Amino acid position 553 (e.g., P553P)[43]
Amino acid position 554 (e.g., D554N[1,6], D554A[35])
Δ Amino acid positions 556-628[44]
Δ Amino acid positions 559-563[35]
Amino acid position 570 (e.g., L570L)[41]
Amino acid position 577 (e.g., I577V)[19]
Amino acid position 581 (e.g., E581K)[35]
Amino acid positions 554 and 581 (e.g., D554A+E581K)[35]
Amino acid position 585 (e.g., E585X)[21]
Amino acid position 600 (e.g., R600W[2,4], R600Q)[6]
Amino acid position 602 (e.g., R602X)[3,6]
Amino acid position 628 (e.g., R628W)[6]
Amino acid position 631 (e.g., R631Q)[28]
Δ Amino acid positions 645-699[4]
Amino acid position 661 (e.g., I661T)[1,4,6]
Amino acid position 665 (e.g., E665X)[4,6]
Amino acid position 672 (e.g., K672fs[6], K672Vfs*1[35])
Amino acid position 674 (e.g., M674T)[19]
Amino acid positions 78 and 674 (e.g., H78Q/M674T)[19]
Amino acid position 684 (e.g., D684D)[41]
Amino acid position 688 (e.g., D688G)[6]
Amino acid position 694 (e.g., I694T[6], I694N[17])
Amino acid position 695 (e.g., E695K)[27]
Amino acid position 709 (e.g., K709fs[6], K709Qfs*41[13])
Amino acid position 717 (e.g., T717N)[4]
Amino acid position 733 (e.g., G733R)[6]
Amino acid position 757 (e.g., Y757X)[4]
Amino acid position 749 (e.g., L749P)[21]
Amino acid position 792 (e.g., P792fs)[6]
Δ Amino acid position 795-797[6]
Amino acid position 809 (e.g., I809L)[27]
Amino acid position 814 (e.g., K814N)[28]
Amino acid position 833 (e.g., R833Q[27], R833W[41])
Amino acid position 835 (e.g., K835Rfs*36)[35]
Amino acid position 845 (e.g., K845fs)[25]
Amino acid position 849 (e.g., R849Q)[24]
Amino acid position 853 (e.g., F853S, F853fs)[6]
Amino acid position 867 (e.g., R867C[1], R867fs[6], R867H[23])
Amino acid position 885 (e.g., K885T)[41]
Amino acid position 888 (e.g., T888T)[41]
Amino acid position 892 (e.g., G892R)[6]
Amino acid position 912 (e.g., G912R)[35]
Amino acid position 921 (e.g., S921S)[41]
Amino acid position 924 (e.g., Y924C)[28]
Amino acid position 930 (e.g., R930X[6], R930Q[28])
Amino acid position 941 (e.g., R941X)[35]
Amino acid position 946 (e.g., R946T)[41]
Amino acid position 952 (e.g., R952Q[5,9,15], R952X[6])
Amino acid position 958 (e.g., N958fs)[6]
Amino acid position 960 (e.g., A960A)[41]
Δ Amino acid position 971[43]
Amino acid position 976 (e.g., A976E[41], A976A[43])
Amino acid position 981 (e.g., E981K)[20]
Amino acid position 994 (e.g., S994R)[4]
Amino acid position 1011 (e.g., L1011fs*18)[33]
Amino acid position 1012 (e.g., S1012I)[10]
Amino acid position 1014 (e.g., R1014X)[6,11]
Amino acid position 1015 (e.g., F1015L)[27]
Amino acid position 1023 (e.g., Q1023fs)[6]
Amino acid position 1040 (e.g., G1040R)[1,6]
Amino acid position 1044 (e.g., S0144L)[34]
Amino acid position 1047 (e.g., L1047fs)[6]
Amino acid position 1050 (e.g., I1050K)[31]
Amino acid position 1052 (e.g., L1052R)[28]
Amino acid position 1095 (e.g., W1095X)[11]
Amino acid position 1098 (e.g., V1098X)[35]
Amino acid position 1131 (e.g., Q1131X)[44]
Amino acid position 1142 (e.g., A1142Tfs*35)[43]
Amino acid position 1144 (e.g., Y1144Y)[43]
Amino acid position 1150 (e.g., I1150T)[41]
Amino acid position 1152 (e.g., A1152T)[30]
Amino acid position 1159 (e.g., P1159P)[25,43]
Amino acid position 1164 (e.g., R1164X)[6]
Amino acid position 1193 (e.g., R1193fs*39)[33]
Amino acid position 1197 (e.g., V1197L)[41]
Amino acid position 1208 (e.g., A1208fs)[6]
Amino acid position 1209 (e.g., Y1209Lfs*28)[4]
Amino acid position 1211 (e.g., F1211L)[27]
Amino acid position 1219 (e.g., D1219H[5], D1219G[27])
Amino acid position 1223 (e.g., S1223S)[41]
Amino acid position 1233 (e.g., P1233P)[41]
Amino acid position 1241 (e.g., G1241fs)[6]
Amino acid position 1248 (e.g., T1248T)[43]
Splice site mutation IVS3+1_+3delGTG[6]
Splice site mutation IVS3-2A>G[6]
IVS6+5T>G[17,25]
Splice site mutation IVS8+1G>T[6]
IVS9-G>A[26]
IVS12+1G>A[25]
Splice site mutation IVS17-1G>A[6]
Splice site mutation IVS18+2T>C[6]
Splice site mutation IVS20-4CT>AA
Splice site mutation IVS21+5G>A[6]
Splice site mutation IVS23-3C>A[6]
Splice site mutation IVS26+2T>A[6]
g.24774-42062del[4]
c.-4C>G[41]
c.145C>T[12]
c.181-72G>A[9]

TABLE 1-continued

Exemplary ATP8B1 Mutations c.182-5T>A[41]
c.182-72G>A[41]
c.246A>G[9]
c.239G>A[39]
c.279+1_279+3delGTG[46]
c.280-2A>G[46]
c.625_62715delinsACAGTAAT[46]
c.554+122C>T[9]
c.555-3T>C[27]
c.625+5 G>T[4]
Amino acid position 209
(e.g., P209T) and c.625+5 G>T[4]
c.628-30G>A[41]
c.628-31C>T[41]
c.698+1G>T[46]
c.698+20C>T[41]
c.782-1G>A[46]
c.782-34G>A[41]
Δ795-797[14]
c.782-1G>A[4]
c.852A>C[27]
c.941-1G>A[46]
c.1014C>T[9]
c.1029+35G>A[9]
c.1221-8C.G[41]
1226delA[16]
c.1429+1G>A[46]
c.1429+2T>G[13]
c.1429+49G>A[41]
c.1430-42A>G[41]
c.1493T>C[12]
c.1587_1589delCTT[46]
c.1630+2T>G[27]
c.1631-10T>A[41]
c.1637-37T>C[41]
1660 G>A[14]
1798 C>T[14]
1799 G>A[14]
c.1819-39_41delAA[9]
c.1819+1G>A[31]
c.1820-27G>A[41]
c.1918+8C>T[27]
c.1933-1G>AK[46]
c.2097+2T>C[32]
c.2097+60T>G[41]
c.2097+89T>C[41]
c.2097+97T>G[41]
c.2210-114T>C[9]
2210delA[16]
c.2210-45_50dupATAAAA[9]
c.2285+29C.T[41]
c.2285+32A>G[41]
c.2286-4_2286-3delinsAA[46]
c.2418+5G>A[46]
c.2707+3G>C[27]
c.2707+9T>G[41]
c.2707+43A>G[41]
c.2709-59T>C[41]
c.2931+9A>G[41]
c.2931+59T>A[41]
c.2932-3C>A[46]
c.2932+59T>A[9]
c.2937A>C[27]
c.3016-9C>A[31]
c.3033-3034del[19]
3122delTCCTA/insACATCGATGTTGATGTTAGG[45]
3318 G>A[14]
c.3400+2T>A[46]
c.3401-175C>T[9]
c.3401-167C>T[9]
c.3401-108C>T[9]
c.3531+8G>T[9,15]
c.3532-15C>T[9]
Δ Phe ex 15[4]
Ex1_Ex13del[6]
Ex2_Ex6del[33]
Ex12_Ex14del[27]
Skipped Exon 24[45]

TABLE 1-continued

Exemplary ATP8B1 Mutations del5'UTR-ex18[11]
c.*11C>T[41]
c.*1101+366G>A[7]
g.92918del565[31]
GC preceding exon 16 (e.g., resulting in a 4 bp deletion)[42]
Frameshift from the 5' end of exon 16[42]
5' 1.4 kb deletion[46]

TABLE 2

Selected ATP8B1 Mutations Associated with PFIC-1

Amino acid position 23 (e.g., P23L)[5]
Amino acid position 78 (e.g., H78Q)[19]
Amino acid position 93 (e.g., A93A)[6]
Amino acid position 96 (e.g., A96G)[27]
Amino acid position 127 (e.g., L127P)[6]
Amino acid position 197 (e.g., G197Lfs*10)[22]
Amino acid position 205 (e.g., N205fs)[6]
Amino acid position 209 (e.g., P209T)[4]
Amino acid position 233 (e.g., G233R)[38]
Amino acid position 243 (e.g., L243fs*28)[33]
Amino acid position 288 (e.g., L288S)[6]
Amino acid position 296 (e.g., R296C)[11]
Amino acid position 308 (e.g., G308V[1,6])
Amino acid position 320 (e.g., M320Vfs*13)[11]
Amino acid position 403 (e.g., S403Y)[6]
Amino acid position 407 (e.g., S407N)[40]
Amino acid position 412 (e.g., R412P)[6]
Amino acid position 415 (e.g., Q415R)[27]
Amino acid position 429 (e.g., E429A)[6]
Amino acid position 446 (e.g., G446R)[4]
Amino acid position 456 (e.g., T456M)[3,6]
Amino acid position 457 (e.g., G457G[6], G457fs*6[33])
Amino acid position 500 (e.g., Y500H)[6]
Amino acid position 525 (e.g., R525X)[4]
Δ Amino acid position 529[6]
Amino acid position 535 (e.g., H535L)[6]
Amino acid position 554 (e.g., D554N)[1,6]
Amino acid position 577 (e.g., I577V)[19]
Amino acid position 585 (e.g., E585X)[21]
Amino acid position 600 (e.g., R600W)[4]
Amino acid position 602 (e.g., R602X)[3,6]
Amino acid position 661 (e.g., I661T)[4,6]
Amino acid position 665 (e.g., E665X)[4,6]
Δ Amino acid positions 645-699[4]
Amino acid position 672 (e.g., K672fs)[6]
Amino acid position 674 (e.g., M674T)[19]
Amino acid positions 78 and 674 (e.g., H78Q/M674T)[19]
Amino acid position 688 (e.g., D688G)[6]
Amino acid position 694 (e.g., I694N)[17]
Amino acid position 695 (e.g., E695K)[27]
Amino acid position 709 (e.g., K709fs)[6]
Amino acid position 717 (e.g., T717N)[4]
Amino acid position 733 (e.g., G733R)[6]
Amino acid position 749 (e.g., L749P)[21]
Amino acid position 757 (e.g., Y757X)[4]
Amino acid position 792 (e.g., P792fs)[6]
Amino acid position 809 (e.g., I809L)[27]
Amino acid position 853 (e.g., F853S, F853fs)[6]
Amino acid position 867 (e.g., R867fs)[6]
Amino acid position 892 (e.g., R892R)[6]
Amino acid position 930 (e.g., R930X[6], R952Q[15])
Amino acid position 952 (e.g., R952X)[6]
Amino acid position 958 (e.g., N958fs)[6]
Amino acid position 981 (e.g., E981K)[20]
Amino acid position 994 (e.g., S994R)[4]
Amino acid position 1014 (e.g., R1014X)[6,11]
Amino acid position 1015 (e.g., F1015L)[27]
Amino acid position 1023 (e.g., Q1023fs)[6]
Amino acid position 1040 (e.g., G1040R)[1,6]
Amino acid position 1047 (e.g., L1047fs)[6]
Amino acid position 1095 (e.g., W1095X)[11]
Amino acid position 1208 (e.g., A1208fs)[6]
Amino acid position 1209 (e.g., Y1209Lfs*28)[4]

TABLE 2-continued

Selected ATP8B1 Mutations Associated with PFIC-1

Amino acid position 1211 (e.g., F1211L)[27]
Amino acid position 1219 (e.g., D1219H[5], D1219G[27])
Splice site mutation IVS3+1_+3delGTG[6]
Splice site mutation IVS3−2A>G[6]
IVS6+5T>G[17]
Splice site mutation IVS8+1G>T[6]
IVS9−G>A[26]
Splice site mutation IVS17−1G>A[6]
Splice site mutation IVS18+2T>C[6]
Splice site mutation IVS21+5G>A[6]
g.24774-42062del[4]
c.145C>T[12]
c.239G>A[39]
c.625+5 G>T[4]
Amino acid position 209 (e.g., P209T) and c.625+5 G>T[4]
c.782−1G>A[4]
c.1493T>C[12]
c.1630+2T>G[27]
1660 G>A[14]
c.2707+3G>C[27]
c.2097+2T>C[32]
c.3033-3034del[19]
3318 G>A[14]
c.3158+8G>T[15]
Δ Phe ex 15[4]
Ex1_Ex13del[6]
Ex2_Ex6del[33]
Ex12_Ex14del[27]
del5'UTR-ex18[11]
c.*1101+366G>A[7]
GC preceding exon 16 (e.g., resulting in a 4 bp deletion)[42]
Frameshift from the 5' end of exon 16[42]

[A] A mutation to 'X' denotes an early stop codon

References for Tables 1 and 2

1. Folmer et al., Hepatology. 2009, vol. 50(5), p. 1597-1605.
2. Hsu et al., Hepatol Res. 2009, vol. 39(6), p. 625-631.
3. Alvarez et al., Hum Mol Genet. 2004, vol. 13(20), p. 2451-2460.
4. Davit-Spraul et al., Hepatology 2010, vol. 51(5), p. 1645-1655.
5. Vitale et al., J Gastroenterol. 2018, vol. 53(8), p. 945-958.
6. Klomp et al., Hepatology 2004, vol. 40(1), p. 27-38.
7. Zarenezhad et al., Hepatitis Monthly: 2017, vol. 17(2); e43500.
8. Dixon et al., Scientific Reports 2017, vol. 7, 11823.
9. Painter et al., Eur J Hum Genet. 2005, vol. 13(4), p. 435-439.
10. Deng et al., World J Gastroenterol. 2012, vol. 18(44), p. 6504-6509.
11. Giovannoni et al., PLoS One. 2015, vol. 10(12): e0145021.
12. Li et al., Hepatology International 2017, vol. 11, No. 1, Supp. Supplement 1, pp. S180. Abstract Number: OP284.
13. Togawa et al., Journal of Pediatric Gastroenterology and Nutrition 2018, vol. 67, Supp. Supplement 1, pp. S363. Abstract Number: 615.
14. Miloh et al., Gastroenterology 2006, vol. 130, No. 4, Suppl. 2, pp. A759-A760. Meeting Info.: Digestive Disease Week Meeting/107th Annual Meeting of the American-Gastroenterological-Association. Los Angeles, CA, USA. May 19.
15. Dröge et al., Zeitschrift fur Gastroenterologie 2015, vol. 53, No. 12. Abstract Number: A3-27. Meeting Info: 32. Jahrestagung der Deutschen Arbeitsgemeinschaft zum Studium der Leber. Dusseldorf, Germany. 22 Jan 2016-23 Jan 2016
16. Mizuochi et al., Clin Chim Acta. 2012, vol. 413(15-16), p. 1301-1304.
17. Liu et al., Hepatology International 2009, vol. 3, No. 1, p. 184-185. Abstract Number: PE405. Meeting Info: 19th Conference of the Asian Pacific Association for the Study of the Liver. Hong Kong, China. 13 Feb. 2009-16 Feb. 2009
18. McKay et al., Version 2. F1000Res. 2013; 2: 32. DOI: 10.12688/f1000research.2-32.v2
19. Hasegawa et al., Orphanet J Rare Dis. 2014, vol. 9:89.
20. Stone et al., J Biol Chem. 2012, vol. 287(49), p. 41139-51.
21. Kang et al., J Pathol Transl Med. 2019 May 16. doi: 10.4132/jptm.2019.05.03. [Epub ahead of print]
22. Sharma et al., BMC Gastroenterol. 2018, vol. 18(1), p. 107.
23. Uegaki et al., Intern Med. 2008, vol. 47(7), p. 599-602.
24. Goldschmidt et al., Hepatol Res. 2016, vol. 46(4), p. 306-311.
25. Liu et al., J Pediatr Gastroenterol Nutr. 2010, vol. 50(2), p. 179-183.
26. Jung et al., J Pediatr Gastroenterol Nutr. 2007, vol. 44(4), p. 453-458.
27. Bounford. University of Birmingham. Dissertation Abstracts International, (2016) Vol. 75, No. 1C. Order No.: AA110588329. ProQuest Dissertations & Theses.
28. Stolz et al., Aliment Pharmacol Ther. 2019, vol. 49(9), p. 1195-1204.
29. Ivashkin et al., Hepatology International 2016, vol. 10, No. 1, Supp. SUPPL. 1, pp. S461. Abstract Number: LBO-38. Meeting Info: 25th Annual Conference of the Asian Pacific Association for the Study of the Liver, APASL 2016. Tokyo, Japan. 20 Feb. 2016-24 Feb. 2016
30. Blackmore et al., J Clin Exp Hepatol. 2013, vol. 3(2), p. 159-161.
31. Matte et al., J Pediatr Gastroenterol Nutr. 2010, vol. 51(4), p. 488-493.
32. Squires et al., J Pediatr Gastroenterol Nutr. 2017, vol. 64(3), p. 425-430.
33. Hayshi et al., EBioMedicine. 2018, vol. 27, p. 187-199.
34. Nagasaka et al., J Pediatr Gastroenterol Nutr. 2007, vol. 45(1), p. 96-105.
35. Wang et al., PLoS One. 2016; vol. 11(4): e0153114.
36. Narchi et al., Saudi J Gastroenterol. 2017, vol. 23(5), p. 303-305.
37. Alashkar et al., Blood 2015, vol. 126, No. 23. Meeting Info.: 57th Annual Meeting of the American-Society-of-Hematology. Orlando, FL, USA. Dec. 5-8, 2015. Amer Soc Hematol.
38. Ferreira et al., Pediatric Transplantation 2013, vol. 17, Supp. SUPPL. 1, pp. 99. Abstract Number: 239. Meeting Info: IPTA 7th Congress on Pediatric Transplantation. Warsaw, Poland. 13 Jul. 2013-16 Jul. 2013.
39. Pauli-Magnus et al., J Hepatol. 2005, vol. 43(2), p. 342-357.
40. Jericho et al., Journal of Pediatric Gastroenterology and Nutrition 2015, vol. 60(3), p. 368-374.
41. van der Woerd et al., PLoS One. 2013, vol. 8(11): e80553.
42. Copeland et al., J Gastroenterol Hepatol. 2013, vol. 28(3), p. 560-564.
43. Dröge et al., J Hepatol. 2017, vol. 67(6), p. 1253-1264.

[44] Chen et al., Journal of Pediatrics 2002, vol. 140(1), p. 119-124.
[45] Jirsa et al., Hepatol Res. 2004, vol. 30(1), p. 1-3.
[46] van der Woerd et al., Hepatology 2015, vol. 61(4), p. 1382-1391.

In some embodiments, the mutation in ATP8B1 is selected from L127P, G308V, T456M, D554N, F529del, I661T, E665X, R930X, R952X, R1014X, and G1040R.

TABLE 3

Exemplary ABCB11 Mutations

Amino acid position 1 (e.g., M1V)[9]
Amino acid position 4 (e.g., S4X)[4,64]
Amino acid position 8 (e.g., R8X)[88]
Amino acid position 19 (e.g., G19R)[56]
Amino acid position 24 (e.g., K24X)[35]
Amino acid position 25 (e.g., S25X)[5,14]
Amino acid position 26 (e.g., Y26Ifs*7)[38]
Amino acid position 36 (e.g., D36D)[27]
Amino acid position 38 (e.g., K38Rfs*24)[73]
Amino acid position 43 (e.g., V43I)[57]
Amino acid position 49 (e.g., Q49X)[73]
Amino acid position 50 (e.g., L50S, L50W)[57]
Amino acid position 52 (e.g., R52W[26], R52R[28])
Amino acid position 56 (e.g., S56L)[58]
Amino acid position 58 (e.g., D58N)[62]
Amino acid position 62 (e.g., M62K)[9]
Amino acid position 66 (e.g., S66N)[17]
Amino acid position 68 (e.g., C68Y)[41]
Amino acid position 50 (e.g., L50S)[5,7]
Amino acid position 71 (e.g., L71H)[73]
Amino acid position 74 (e.g., I74R)[71]
Amino acid position 77 (e.g., P77A)[73]
Amino acid position 87 (e.g., T87R)[67]
Amino acid position 90 (e.g., F90F)[7,27]
Amino acid position 93 (e.g., Y93S[13], Y93X[88])
Amino acid position 96 (e.g., E96X)[88]
Amino acid position 97 (e.g., L97X)[39]
Amino acid position 101 (e.g., Q101Dfs*8)[9]
Amino acid position 107 (e.g., C107R)[36]
Amino acid position 112 (e.g., I112T)[9]
Amino acid position 114 (e.g., W114R)[2,9]
Amino acid position 123 (e.g. M123T)[67]
Amino acid position 127 (e.g., T127Hfs*6)[5]
Amino acid position 129 (e.g., C129Y)[25]
Amino acid position 130 (e.g., G130G)[77]
Amino acid position 134 (e.g., I134I)[28]
Amino acid position 135 (e.g., E135K[7,13], E135L[17])
Amino acid position 137 (e.g., E137K)[7]
Amino acid position 157 (e.g., Y157C)[5]
Amino acid position 161 (e.g., C161X)[39]
Amino acid position 164 (e.g., V164Gfs*7[30], V164I[85])
Amino acid position 167 (e.g., A167S[4], A167V[7], A167T[9,17])
Amino acid position 181 (e.g., R181I)[35]
Amino acid position 182 (e.g., I182K)[9]
Amino acid position 183 (e.g., M183V[8], M183T[9])
Amino acid position 185 (e.g., M185I)[73]
Amino acid position 186 (e.g., E186G)[2,7,22]
Amino acid position 188 (e.g., G188W)[73]
Amino acid position 194 (e.g., S194P)[7]
Amino acid position 198 (e.g., L198P)[7]
Amino acid position 199 (e.g., N199Ifs*15X)[88]
Amino acid position 206 (e.g., I206V)[28]
Amino acid position 212 (e.g., A212T)[73]
Amino acid position 217 (e.g., M217R)[88]
Amino acid position 225 (e.g., T225P)[57]
Amino acid position 226 (e.g., S226L)[9]
Amino acid position 232 (e.g., L232Cfs*9)[9]
Amino acid position 233 (e.g., L233S)[86]
Amino acid position 238 (e.g., G238V)[2,7]
Amino acid position 242 (e.g., T242I)[5,7]
Amino acid position 245 (e.g., I245Tfs*26)[57]
Amino acid position 256 (e.g., A256G)[9]
Amino acid position 260 (e.g., G260D)[7]
Amino acid position 269 (e.g., Y269Y)[27]
Amino acid position 277 (e.g., A277E)[77]
Amino acid position 283 (e.g., E283D)[73]
Amino acid positions 212 and 283 (e.g., A212T+E283D)[73]

TABLE 3-continued

Exemplary ABCB11 Mutations

Amino acid position 284 (e.g., V284L[7,39], V284A[7], V284D[23])
Amino acid position 297 (e.g., E297G[1,2,5,7], E297K[7])
Amino acid position 299 (e.g., R299K)[28]
Amino acid position 303 (e.g., R303K[8], R303M[63] R303fsX321[83])
Amino acid position 304 (e.g., Y304X)[26]
Amino acid position 312 (e.g., Q312H)[7]
Amino acid position 313 (e.g., R313S)[5,7]
Amino acid position 314 (e.g., W314X)[57]
Amino acid position 318 (e.g., K318Rfs*26)[29]
Amino acid position 319 (e.g., G319G)[7]
Amino acid position 327 (e.g., G327E)[5,7]
Amino acid position 330 (e.g., W330X)[24]
Amino acid position 336 (e.g., C336S)[2,7]
Amino acid position 337 (e.g., Y337H)[21,27]
Amino acid position 342 (e.g., W342G)[50]
Amino acid position 354 (e.g., R354X)[9]
Amino acid position 361 (e.g., Q361X[57], Q361R[74])
Amino acid position 366 (e.g., V366V[28], V366D[57])
Amino acid position 368 (e.g., V368Rfs*27)[5]
Amino acid position 374 (e.g., G374S)[3]
Amino acid position 380 (e.g., L380Wfs*18)[5]
Amino acid position 382 (e.g., A382G)[88]
Δ Amino acid positions 382-388[5]
Δ Amino acid positions 383-389[57]
Amino acid position 387 (e.g., R387H)[9]
Amino acid position 390 (e.g., A390P)[5,7]
Amino acid position 395 (e.g., E395E)[28]
Amino acid position 404 (e.g., D404G)[9]
Amino acid position 410 (e.g., G410D)[5,7]
Amino acid position 413 (e.g., L413W)[5,7]
Amino acid position 415 (e.g., R415X)[42]
Amino acid position 416 (e.g., I416I)[27]
Amino acid position 420 (e.g., I420T)[9]
Amino acid position 423 (e.g., H423R)[13]
Amino acid position 432 (e.g., R432T)[1,2,7]
Amino acid position 436 (e.g., K436N)[40]
Amino acid position 440 (e.g., D440E)[88]
Amino acid position 444 (e.g., V444A)[2]
Amino acid position 454 (e.g., V454X)[49]
Amino acid position 455 (e.g., G455E)[9]
Amino acid position 457 (e.g., S457Vfs*23)[88]
Amino acid position 461 (e.g., K461E)[2,7]
Amino acid position 462 (e.g., S462R)[88]
Amino acid position 463 (e.g., T463I)[5,7]
Amino acid position 466 (e.g., Q466K)[5,7]
Amino acid position 470 (e.g., R470Q[5,7], R470X[9])
Amino acid position 471 (e.g., Y472X)[5]
Amino acid position 472 (e.g., Y472C[5,27], Y472X[14])
Amino acid position 473 (e.g., D473Q[35], D473V[88])
Amino acid position 475 (e.g., C475X)[29]
Amino acid position 481 (e.g., V481E)[5,7]
Amino acid position 482 (e.g., D482G)[2,5,7]
Amino acid position 484 (e.g., H484Rfs*5)[9]
Amino acid position 487 (e.g., R487H[2], R487P[5])
Amino acid position 490 (e.g., N490D)[5,7]
Amino acid position 493 (e.g., W493X)[8]
Amino acid positon 496 (e.g., D496V)[88]
Amino acid position 498 (e.g., I498T)[2,7]
Amino acid position 499 (e.g., G499E)[73]
Amino acid position 501 (e.g., V501G)[68]
Amino acid position 504 (e.g., E504K)[79]
Amino acid position 510 (e.g., T510T)[7]
Amino acid position 512 (e.g., I512T)[5,7]
Amino acid position 515 (e.g., N515T[5,7], N515D[64])
Amino acid position 516 (e.g., I516M)[17]
Amino acid position 517 (e.g., R517H)[5,7]
Amino acid position 520 (e.g., R520X)[5]
Amino acid position 523 (e.g., A523G)[13]
Amino acid position 528 (e.g., I528Sfs*21[5], I528X[9], I528T[73])
Amino acid position 535 (e.g., A535A[7], A535X[89])
Amino acid position 540 (e.g., F540L)[46]
Amino acid position 541 (e.g., I541L[5,7], I541T[5,17])
Amino acid position 546 (e.g., Q546K[39], Q546H[73])
Amino acid position 548 (e.g., F548Y)[5,7]
Amino acid position 549 (e.g., D549V)[9]
Amino acid position 554 (e.g., E554K)[21]
Amino acid position 556 (e.g., G556R)[67]
Amino acid position 558 (e.g., Q558H)[23]

TABLE 3-continued

Exemplary ABCB11 Mutations

Amino acid position 559 (e.g., M559T)[57]
Amino acid position 562 (e.g., G562D[5,7], G562S[73])
Amino acid position 570 (e.g., A570T[2,5,7], A570V[26])
Amino acid position 575 (e.g., R575X[2,5], R575Q[21])
Amino acid position 580 (e.g., L580P)[57]
Amino acid position 586 (e.g., T586I)[7]
Amino acid position 587 (e.g., S587X)[73]
Amino acid position 588 (e.g., A588V[5,7], A588P[73])
Amino acid position 591 (e.g., N591S)[2,7]
Amino acid position 593 (e.g., S593R)[2,7]
Amino acid position 597 (e.g., V597V[9], V597L[13])
Amino acid position 603 (e.g., K603K)[55]
Amino acid position 609 (e.g., H609Hfs*46)[26]
Amino acid position 610 (e.g., I610Gfs*45[9], I610T[57])[9]
Amino acid position 615 (e.g., H615R)[26]
Amino acid position 616 (e.g., R616G[28], R616H[73])
Amino acid position 619 (e.g., T619A)[28]
Amino acid position 623 (e.g., A623A)[28]
Amino acid position 625 (e.g., T625Nfs*5)[26]
Amino acid position 627 (e.g., I627T)[7]
Amino acid position 628 (e.g., G628Wfs*3)[70]
Amino acid position 636 (e.g., E636G)[2]
Amino acid position 648 (e.g., G648Vfs*6[5], G648V[50])
Amino acid position 655 (e.g., T655I)[7]
Amino acid position 669 (e.g., I669V)[26]
Amino acid position 676 (e.g., D676Y)[11]
Amino acid position 677 (e.g., M677V)[7,13]
Amino acid position 679 (e.g., A679V)[58]
Amino acid position 685 (e.g., G685W)[60]
Amino acid position 696 (e.g., R696W[27], R696Q[58])
Amino acid position 698 (e.g., R698H[7,9], R698K[61], R698C[88])
Amino acid position 699 (e.g., S699P)[9]
Amino acid position 701 (e.g., S701P)[58]
Amino acid position 702 (e.g., Q702X)[89]
Amino acid position 709 (e.g., E709K)[7]
Amino acid position 710 (e.g., P710P)[7]
Amino acid position 712 (e.g., L712L)[28]
Amino acid position 721 (e.g., Y721C)[88]
Amino acid position 729 (e.g., D724N)[39]
Amino acid position 731 (e.g., P731S)[23]
Amino acid position 740 (e.g., P740Qfs*6)[73]
Amino acid position 758 (e.g., G758R)[5]
Amino acid position 766 (e.g., G766R)[5,24]
Amino acid position 772 (e.g., Y772X)[5]
Amino acid position 804 (e.g., A804A)[7]
Amino acid position 806 (e.g., G806D[44], G806G[55])
Amino acid position 809 (e.g., S809F)[81]
Amino acid position 817 (e.g., G817G)[88]
Amino acid position 818 (e.g., Y818F)[7]
Amino acid position 824 (e.g., G824E)[42]
Amino acid position 825 (e.g., G825G)[73]
Amino acid position 830 (e.g., R830Gfs*28)[73]
Amino acid position 832 (e.g., R832C[7,26], R832H[41])
Amino acid position 842 (e.g., D842G)[2]
Amino acid position 848 (e.g., D848N)[73]
Amino acid position 855 (e.g., G855R)[11]
Amino acid position 859 (e.g., T859R)[5,7]
Amino acid position 865 (e.g., A865V)[27]
Amino acid position 866 (e.g., S866A)[57]
Amino acid position 868 (e.g., V868D)[73]
Amino acid position 869 (e.g., Q869P)[73]
Amino acid position 875 (e.g., Q875X)[73]
Amino acid position 877 (e.g., G877R)[56]
Amino acid position 879 (e.g., I879R)[88]
Amino acid position 893 (e.g., A893V)[57]
Amino acid position 901 (e.g., S901R[17], S901I[73])
Amino acid position 903 (e.g., V903G)[57]
Δ Amino acid position 919[12]
Amino acid position 923 (e.g., T923P)[2,7]
Amino acid position 926 (e.g., A926P)[2,7]
Amino acid position 928 (e.g., R928X[15], R928Q[40])
Amino acid position 930 (e.g., K930X[5], K930Efs*79[5,10], K930Efs*49[26])
Amino acid position 931 (e.g., Q931P)[27]
Amino acid position 945 (e.g., S945N)[57]
Amino acid position 948 (e.g., R948C)[5,7,26]
Amino acid position 958 (e.g., R958Q)[28]
Amino acid position 969 (e.g., K969K)[88]
Δ Amino acid positions 969-972[5]
Amino acid position 973 (e.g., T973I)[57]
Amino acid position 976 (e.g., Q976R[58], Q976X[88])
Amino acid position 979 (e.g., N979D)[5,7]
Amino acid position 981 (e.g., Y981Y)[28]
Amino acid position 982 (e.g., G982R)[2,5,7]
Amino acid positions 444 and 982 (e.g., V444A+G982R)[38]
Amino acid position 995 (e.g., A995A)[28]
Amino acid position 1001 (e.g., R1001R)[9]
Amino acid position 1003 (e.g., G1003R)[24]
Amino acid position 1004 (e.g., G1004D)[2,7]
Amino acid position 1027 (e.g., S1027R)[26]
Amino acid position 1028 (e.g., A1028A[7,10,88], A1028E[88])
Amino acid position 1029 (e.g., T1029K)[5]
Amino acid position 1032 (e.g., G1032R)[12]
Amino acid position 1041 (e.g., Y1041X)[9]
Amino acid position 1044 (e.g., A1044P)[88]
Amino acid position 1050 (e.g., R1050C)[2,7,57]
Amino acid position 1053 (e.g., Q1053X)[57]
Amino acid position 1055 (e.g., L1055P)[36]
Amino acid position 1057 (e.g., R1057X[2], R1057Q[58])
Amino acid position 1058 (e.g., Q1058Hfs*38[9], Q1058fs*38[17], Q1058X[73])
Amino acid position 1061 (e.g., I1061Vfs*34)[9]
Amino acid position 1083 (e.g., C1083Y)[47]
Amino acid position 1086 (e.g., T1086T)[28]
Amino acid position 1090 (e.g., R1090X)[2,5]
Amino acid position 1099 (e.g., L1099Lfs*38)[26]
Amino acid position 1100 (e.g., S1100Qfs*38)[13]
Amino acid position 1110 (e.g., A1110E)[5,7]
Amino acid position 1112 (e.g., V1112F)[70]
Amino acid position 1116 (e.g., G1116R[7], G1116F[9,17], G1116E[36])
Amino acid position 1120 (e.g., S1120N)[88]
Amino acid position 1128 (e.g., R1128H[2,7], R1128C[5,7,13])
Amino acid position 1131 (e.g., D1131V)[27]
Amino acid position 1144 (e.g., S1144R)[7]
Amino acid position 1147 (e.g., V1147X)[5]
Amino acid position 1153 (e.g., R1153C[2,5,7], R1153H[5])
Amino acid position 1154 (e.g., S1154P)[5,7]
Amino acid position 1162 (e.g., E1162X)[39]
Δ Amino acid position 1165[88]
Amino acid position 1164 (e.g., V1164Gfs*7)
Amino acid position 1173 (e.g., N1173D)[57]
Amino acid position 1175 (e.g., K1175T)[58]
Amino acid position 1186 (e.g., E1186K)[7]
Amino acid position 1192 (e.g., A1192Efs*50)[9]
Amino acid position 1196 (e.g., Q1196X)[88]
Amino acid position 1197 (e.g., L1197G)[7]
Amino acid position 1198 (e.g., H1198R)[27]
Amino acid position 1204 (e.g., L1204P)[88]
Amino acid position 1208 (e.g. Y1208C)[73]
Amino acid position 1210 (e.g., T1210P[5,7], T1210F[57])
Amino acid position 1211 (e.g., N1211D)[7]
Amino acid position 1212 (e.g., V1212F)[36]
Amino acid position 1215 (e.g., Q1215X)[5]
Amino acid position 1221 (e.g., R1221K)[53]
Amino acid position 1223 (e.g., E1223D)[7]
Amino acid position 1226 (e.g., R1226P)[73]
Amino acid position 1228 (e.g., A1228V)[7]
Amino acid position 1231 (e.g., R1231W[5,7], R1231Q[5,7])
Amino acid position 1232 (e.g., A1232D)[17]
Amino acid position 1235 (e.g., R1235X)[5,12]
Amino acid position 1242 (e.g., L1242I)[5,7]
Amino acid position 1243 (e.g., D1243G)[67]
Amino acid position 1249 (e.g., L1249X)[73]
Amino acid position 1256 (e.g., T1256fs*1296)[83]
Amino acid position 1268 (e.g., R1268Q)[2,7]
Amino acid position 1276 (e.g., R1276H)[30]
Amino acid position 1283 (e.g., A1283A[28], A1283V[88])
Amino acid position 1292 (e.g., G1292V)[73]
Amino acid position 1298 (e.g., G1298R)[5]
Amino acid position 1302 (e.g., E1302X)[5]
Amino acid position 1311 (e.g., Y1311X)[57]
Amino acid position 1316 (e.g., T1316Lfs*64)[15]
Amino acid position 1321 (e.g., S1321N)[57]
Intron 4 ((+3)A>C)[1]
IVS4−74A>T[89]
Splice site mutation 3' Intron 5 c.3901G>A[5]
Splice site mutation 5; Intron 7 c.6111G>A[5]

TABLE 3-continued

Exemplary ABCB11 Mutations

Splice site mutation IVS7+1G>A[14]
IVS7+5G>A[40]
IVS8+1G>C[76]
Splice site mutation 5' Intron 9 c.9081delG[5]
Splice site mutation 5' Intron 9 c.9081G>T[5]
Splice site mutation 5' Intron 9 c.9081G>A[5]
Splice site mutation IVS9+1G>T[14]
Splice site mutation 3' Intron 13 c.143513_1435-8del[5]
Splice site mutation IVS13del-13^-8[14]
Splice site mutation 3' Intron 16 c.20128T>G[5]
Splice site mutation IVS16-8T>G[14]
Splice site mutation 5' Intron 18 c.21781G>T[5]
Splice site mutation 5' Intron 18 c.21781G>A[5]
Splice site mutation 5' Intron 18 c.21781G>C[5]
Splice site mutation 3' Intron 18 c.21792A>G[5]
Splice site mutation IVS18+1G>A[14]
Splice site mutation 5' Intron 19 c.2343+1G>T[5]
Splice site mutation 5' Intron 19 c.2343+2T>C[5]
Splice site mutation IVS19+2T>C[14]
Splice site mutation IVS19+1G>A[22]
Splice site mutation 3' Intron 21 c.26112A>T[5]
IVS22+3A>G[89]
IVS 23-8 G-A[36]
IVS24+5G>A[51]
Splice site mutation 5' Intron 24 c.32131delG[5]
IVS35-6C>G[89]
Putative splice mutation 1198-1G>C[17]
Putative splice mutation 1810-3C>G[17]
Putative splice mutation 2178+1G>A[17]
Putative splice mutation 2344-1G>T[17]
Putative splice mutation c.2611-2A>T[39]
Putative splice mutation 3213+1_3213+2delinsA[17]
c.-24C>A[44,78]
c.76 13 G>T[9]
c.77-19T>A[52]
c.90_93delGAAA[18]
c.124G>A[69]
c.150+3 A>C[10]
174C>T[54]
c.245T>C[87]
c.249_250insT[18]
270T>C[54]
402C>T[54]
585G>C[54]
c.611+1G>A[70]
c.611+4A>G[36]
c.612-15_-6del10bp[55]
c.625A>C[31]
c.627+5G>T[31]
c.625A>C/c.627+5G>T[31]
696G>T[54]
c. 784+1G>C[49]
807T>C[54]
c.886C>T[31]
c.890A>G[59]
c.908+1G>A[57]
c.908+5G>A[55]
c.908delG[59]
c.909-15A>G[66]
957A>G[54]
c.1084-2A>G[57]
1145 1 bp deletion[90]
1281C>T[54,57]
c.1309-165C>T[19]
c.1434+174G>A[19]
c.1434+70C>T[19]
c.1530C>A[57]
c.1587-1589delCTT[31]
c.1621A>C[33,59]
c.1638+32T>C[66]
c.1638+80C>T[66]
1671C>T[54]
1791G>T[54]
1939delA[14]
c.2075+3A>G[53]
c.2081T>A[31]
c.2093G>A[65]
2098delA[16]

c.2138-8T>G[67]
2142A>G[54]
c.2178+1G>T[36,39]
c.2179-17C>A[66]
c.2344-157T>G[66]
c.2344-17T>C[66]
c.2417G>A[78]
c.2541delG[87]
c.2620C>T[32,33]
c.2815-8A>G[55]
c.3003A>G[37]
c.3084A>G[48,54]
c.3213+4 A>G[9,37]
c.3213+5 G>A[9]
c.3268C>T[75]
3285A>G[54]
c.3382C>T[75]
3435A>G[54]
c.3491delT[72]
c.3589C>T[57]
c.3765(+1+5)del5[42]
c.3766-34A>G[66]
c.3767-3768insC[6]
c.3770delA[67]
c.3826C>T[72]
c.3846C>T[57]
c.3929delG[67]
c.*236A>G[66]
1145delC[8]
Ex13_Ex17del[82]

TABLE 4

Selected ABCB11 Mutations Associated with PFIC-2

Amino acid position 1 (e.g., M1V)[9]
Amino acid position 4 (e.g., S4X)[64]
Amino acid position 19 (e.g., G19R)[56]
Amino acid position 25 (e.g., S25X)[14]
Amino acid position 26 (e.g., Y26Ifs*7)[38]
Amino acid position 50 (e.g., L50S)[7,57]
Amino acid position 52 (e.g., R52W)[26]
Amino acid position 58 (e.g., D58N)[62]
Amino acid position 62 (e.g., M62K)[9]
Amino acid position 66 (e.g., S66N)[17]
Amino acid position 68 (e.g., C68Y)[41]
Amino acid position 93 (e.g., Y93S)[13]
Amino acid position 101 (e.g., Q101Dfs*8)[9]
Amino acid position 107 (e.g., C107R)[36]
Amino acid position 112 (e.g., I112T)[9]
Amino acid position 114 (e.g., W114R)[2,9]
Amino acid position 129 (e.g., C129Y)[25]
Amino acid position 135 (e.g., E135K[13], E135L[17])
Amino acid position 167 (e.g., A167V[7], A167T[9,17])
Amino acid position 182 (e.g., I182K)[9]
Amino acid position 183 (e.g., M183V[8], M183T[9])
Amino acid position 225 (e.g., T225P)[57]
Amino acid position 226 (e.g., S226L)[9]
Amino acid position 232 (e.g., L232Cfs*9)[9]
Amino acid position 233 (e.g., L233S)[86]
Amino acid position 238 (e.g., G238V)[2,7]
Amino acid position 242 (e.g., T242I)[7]
Amino acid position 245 (e.g., I245Tfs*26)[57]
Amino acid position 256 (e.g., A256G)[9]
Amino acid position 260 (e.g., G260D)[57]
Amino acid position 284 (e.g., V284L)[7]
Amino acid position 297 (e.g., E297G)[2,7]
Amino acid position 303 (e.g., R303K[8], R303M[63], R303fsX321[83])
Amino acid position 304 (e.g., Y304X)[26]
Amino acid position 312 (e.g., Q312H)[7]
Amino acid position 313 (e.g., R313S)[7]
Amino acid position 314 (e.g., W314X)[57]
Amino acid position 318 (e.g., K318Rfs*26)[29]
Amino acid position 327 (e.g., G327E)[7]
Amino acid position 330 (e.g., V330X)[24]

TABLE 4-continued

Selected ABCB11 Mutations Associated with PFIC-2

Amino acid position 336 (e.g., C336S)[2,7]
Amino acid position 337 (e.g., Y337H)[21]
Amino acid position 342 (e.g., W342G)[50]
Amino acid position 354 (e.g., R354X)[9]
Amino acid position 361 (e.g., Q361X)[57]
Amino acid position 366 (e.g., V366D)[57]
Amino acid position 386 (e.g., G386X)[34]
Δ Amino acid positions 383-389[57]
Amino acid position 387 (e.g., R387H)[9]
Amino acid position 390 (e.g., A390P)[7]
Amino acid position 410 (e.g., G410D)[7]
Amino acid position 413 (e.g., L413W)[7]
Amino acid position 415 (e.g., R415X)[42]
Amino acid position 420 (e.g., I420T)[9]
Amino acid position 454 (e.g., V454X)[49]
Amino acid position 455 (e.g., G455E)[9]
Amino acid position 461 (e.g., K461E)[2,7]
Amino acid position 463 (e.g., T463I)[7]
Amino acid position 466 (e.g., Q466K)[7]
Amino acid position 470 (e.g., R470Q[7], R470X[9])
Amino acid position 472 (e.g., Y472X[14], Y472C[27])
Amino acid position 475 (e.g., C475X)[29]
Amino acid position 481 (e.g., V481E)[7]
Amino acid position 482 (e.g., D482G)[2,7]
Amino acid position 484 (e.g., H484Rfs*5)[9]
Amino acid position 487 (e.g., R487H[2], R487P[84])
Amino acid position 490 (e.g., N490D)[7]
Amino acid position 493 (e.g., W493X)[8]
Amino acid position 498 (e.g., I498T)[7]
Amino acid position 501 (e.g., V501G)[68]
Amino acid position 512 (e.g., I512T)[7]
Amino acid position 515 (e.g., N515T[7], N515D[64])
Amino acid position 516 (e.g., I516M)[17]
Amino acid position 517 (e.g., R517H)[7]
Amino acid position 520 (e.g., R520X)[57]
Amino acid position 523 (e.g., A523G)[13]
Amino acid position 528 (e.g., I528X)[9]
Amino acid position 540 (e.g., F540L)[46]
Amino acid position 541 (e.g., I541L[7], I541T[17])
Amino acid position 548 (e.g., F548Y)[7]
Amino acid position 549 (e.g., D549V)[9]
Amino acid position 554 (e.g., E554K)[21]
Amino acid position 559 (e.g., M559T)[57]
Amino acid position 562 (e.g., G562D)[7]
Amino acid position 570 (e.g., A570T[7], A570V[26])
Amino acid position 575 (e.g., R575X[2], R575Q[21])
Amino acid position 588 (e.g., A588V)[7]
Amino acid position 591 (e.g., N591S)[9,17]
Amino acid position 593 (e.g., S593R)[2,7]
Amino acid position 597 (e.g., V597V[9], V597L[13])
Amino acid positions 591 and 597 (e.g., N591S + V597V)[9]
Amino acid position 603 (e.g., K603K)[55]
Amino acid position 609 (e.g., H609Hfs*46)[26]
Amino acid position 610 (e.g., I610Gfs*45)[9]
Amino acid position 615 (e.g., H615R)[26]
Amino acid position 625 (e.g., T625Nfs*5)[26]
Amino acid position 627 (e.g., I627T)[7]
Amino acid position 636 (e.g., E636G)[2]
Amino acid position 669 (e.g., I669V)[26]
Amino acid position 698 (e.g., R609H)[9]
Amino acid positions 112 and 698 (e.g., I112T + R698H)[9]
Amino acid position 699 (e.g., S699P)[9]
Amino acid position 766 (e.g., G766R)[24]
Amino acid position 806 (e.g., G806G)[55]
Amino acid position 824 (e.g., G824E)[42]
Amino acid position 832 (e.g., R832C[7,26], R832H[41])
Amino acid position 842 (e.g., D842G)[2]
Amino acid position 859 (e.g., T859R)[7]
Amino acid position 865 (e.g., A865V)[45]
Amino acid position 877 (e.g., G877R)[56]
Amino acid position 893 (e.g., A893V)[57]
Amino acid position 901 (e.g., S901R)[17]
Amino acid position 903 (e.g., V903G)[57]
Δ Amino acid position 919[12]
Amino acid position 928 (e.g., R928X)[15,21]
Amino acid position 930 (e.g., K930Efs*79[10], K930Efs*49[26])
Amino acid position 948 (e.g., R948C)[7,26]
Amino acid position 979 (e.g., N979D)[7]

TABLE 4-continued

Selected ABCB11 Mutations Associated with PFIC-2

Amino acid position 982 (e.g., G982R)[2,7]
Amino acid positions 444 and 982 (e.g., V444A + G982R)[38]
Amino acid position 1001 (e.g., R1001R)[9]
Amino acid position 1003 (e.g., G1003R)[24]
Amino acid position 1004 (e.g., G1004D)[2,7]
Amino acid position 1027 (e.g., S1027R)[26]
Amino acid position 1028 (e.g., A1028A)[10]
Amino acid position 1032 (e.g., G1032R)[12]
Amino acid position 1041 (e.g., Y1041X)[9]
Amino acid position 1050 (e.g., R1050C)[57]
Amino acid position 1053 (e.g., Q1053X)[57]
Amino acid position 1055 (e.g., L1055P)[36]
Amino acid position 1057 (e.g., R1057X)[2]
Amino acid position 1058 (e.g., Q1058Hfs*38[9], Q1058fs*38[17])
Amino acid position 1061 (e.g., I1061Vfs*34)[9]
Amino acid position 1083 (e.g., C1083Y)[47]
Amino acid position 1090 (e.g., R1090X)[2]
Amino acid position 1099 (e.g., L1099Lfs*38)[26]
Amino acid position 1100 (e.g., S1100Qfs*38)[13]
Amino acid position 1110 (e.g., A1110E)[7]
Amino acid position 1116 (e.g., G1116R[7], G1116F[9,17], G1116E[36])
Amino acid position 1128 (e.g., R1128C)[7,13]
Amino acid position 1131 (e.g., D1131V)[27]
Amino acid position 1144 (e.g., S1144R)[7]
Amino acid position 1153 (e.g., R1153C[2,7], R1153H[7,26])
Amino acid position 1154 (e.g., S1154P)[7]
Amino acid position 1173 (e.g., N1173D)[57]
Amino acid position 1192 (e.g., A1192Efs*50)[9]
Amino acid position 1198 (e.g., H1198R)[27]
Amino acid position 1210 (e.g., T1210P[7], T1210F[57])
Amino acid position 1211 (e.g., N1211D)[7]
Amino acid position 1212 (e.g., V1212F)[36]
Amino acid position 1231 (e.g., R1231W[7], R1223Q[7])
Amino acid position 1232 (e.g., A1232D)[17]
Amino acid positions 1235 (e.g., R1235X)[12]
Amino acid position 1242 (e.g., L1242I)[7]
Amino acid position 1256 (e.g., T1256fs*1296)[83]
Amino acid position 1268 (e.g., R1268Q)[2,7]
Amino acid position 1302 (e.g. E1302X)[57]
Amino acid position 1311 (e.g., Y1311X)[57]
Amino acid position 1316 (e.g., T1316Lfs*64)[15]
Intron 4 ((+3)A > C)[1]
Splice site mutation IVS7 + 1G > A[14]
IVS8 + 1G > C[76]
Splice site mutation IVS9 + 1G > T[14]
Splice site mutation IVS13del-13´-8[14]
Splice site mutation IVS16 − 8T > G[14]
Splice site mutation IVS18 + 1G > A[14]
Splice site mutation IVS19 + 2T > C[14]
IVS 23 − 8 G − A[36]
IVS24 + 5G > A[51]
Putative splice mutation 1198 − 1G > C[17]
Putative splice mutation 1810 − 3C > G[17]
Putative splice mutation 2178 + 1G > A[17]
Putative splice mutation 2344 − 1G > T[17]
Putative splice mutation 3213 + 1_3213 + 2delinsA[17]
c.-24C > A[78]
c.76 13 G > T[9]
c.77 − 19T > A[52]
c.90_93delGAAA[18]
c.124G > A[69]
c.150 + 3 A > C[10]
c.249_250insT[18]
c.611 + 1G > A[84]
c.611 + 4A > G[36]
c.612 − 15_-6del10bp[55]
c.625A > C[31]
c.627 + 5G > T[31]
c.625A > C/c.627 + 5G > T[31]
c.886C > T[31]
c.890A > G[59]
c.908 + 1G > A[57]
c.908 + 5G > A[55]
c.908delG[59]
1273 1 bp deletion[91]
c.1084 − 2A > G[57]
c.1445A > G[59]
c.1587-1589delCTT[31]

TABLE 4-continued

Selected ABCB11 Mutations Associated with PFIC-2 c.1621A > C[59]
1939delA[14]
c.2081T > A[31]
2098delA[16]
c.2343 + 1 G > T[80]
c.2178 + 1G > T[36]
c.2417G > A[78]
c.2620C > T[32]
c.2815 − 8A > G[55]
c.3003A > G[37]
c.3213 + 4 A > G[9,37]
c.3213 + 5 G > A[9]
c.3268C > T[75]
c.3382C > T[75]
c.3765(+1 + 5)del5[42]
c.3767-3768insC[6]
1145delC[8]
Ex13_Ex17del[82]

[A] A mutation to 'X' denotes an early stop codon

References for Tables 3 and 4

[1] Noe et al., J Hepatol. 2005, vol. 43(3), p. 536-543.
[2] Lam et al., Am J Physiol Cell Physiol. 2007, vol. 293(5), p. C1709-16.
[3] Stindt et al., Liver Int. 2013, vol. 33(10), p. 1527-1735.
[4] Gao et al., Shandong Yiyao 2012, vol. 52(10), p. 14-16.
[8] Strautnieks et al., Gastroenterology. 2008, vol. 134(4), p. 1203-1214.
[6] Kagawa et al., Am J Physiol Gastrointest Liver Physiol. 2008, vol. 294(1), p. G58-67.
[7] Byrne et al., Hepatology. 2009, vol. 49(2), p. 553-567.
[8] Chen et al., J Pediatr. 2008, vol. 153(6), p. 825-832.
[9] Davit-Spraul et al., Hepatology 2010, vol. 51(5), p. 1645-1655.
[10] Dröge et al., Sci Rep. 2016, vol. 6: 24827.
[11] Lang et al., Pharmacogenet Genomics. 2007, vol. 17(1), p. 47-60.
[12] Ellinger et al., World J Gastroenterol. 2017, vol. 23(29), p. :5295-5303.
[13] Vitale et al., J Gastroenterol. 2018, vol. 53(8), p. 945-958.
[14] Knisely et al., Hepatology. 2006, vol. 44(2), p. 478-86.
[15] Ellis et al., Hepatology. 2018, vol. 67(4), p. 1531-1545.
[16] Lam et al., J Hepatol. 2006, vol. 44(1), p. 240-242.
[17] Varma et al., Hepatology 2015, vol. 62(1), p. 198-206.
[18] Treepongkaruna et al., World J Gastroenterol. 2009, vol. 15(34), p. 4339-4342.
[19] Zarenezhad et al., Hepatitis Monthly: 2017, vol. 17(2); e43500.
[20] Hayashi et al., Hepatol Res. 2016, vol. 46(2), p. 192-200.
[21] Guorui et al., Linchuang Erke Zazhi 2013, vol. 31(10), 905-909.
[22] van Mil et al., Gastroenterology. 2004, vol. 127(2), p. 379-384.
[23] Anzivino et al., Dig Liver Dis. 2013, vol. 45(3), p. 226-232.
[24] Park et al., World J Gastroenterol. 2016, vol. 22(20), p. 4901-4907.
[25] Imagawa et al., J Hum Genet. 2018, vol. 63(5), p. 569-577.
[26] Giovannoni et al., PLoS One. 2015, vol. 10(12): e0145021.
[27] Hu et al., Mol Med Rep. 2014, vol. 10(3), p. 1264-1274.
[28] Lang et al,. Drug Metab Dispos. 2006, vol. 34(9), p. 1582-1599.
[29] Masahata et al., Transplant Proc. 2016, vol. 48(9), p. 3156-3162.
[30] Holz et al., Hepatol Commun. 2018, vol. 2(2), p. 152-154.
[31] Li et al., Hepatology International 2017, vol. 11, No. 1, Supp. Supplement 1, pp. S180. Abstract Number: OP284.
[32] Francalanci et al., Laboratory Investigation 2011, vol. 91, Supp. SUPPL. 1, pp. 360A. Abstract Number: 1526.
[33] Francalanci et al., Digestive and Liver Disease 2010, vol. 42, Supp. SUPPL. 1, pp. S16. Abstract Number: T.N.S.
[34] Shah et al., J Pediatr Genet. 2017, vol. 6(2), p. 126-127.
[35] Gao et al., Hepatitis Monthly 2017, vol. 17(10), e55087/1-e55087/6.
[36] Evason et al., Am J Surg Pathol. 2011, vol. 35(5), p. 687-696.
[37] Davit-Spraul et al., Mol Genet Metab. 2014, vol. 113(3), p. 225-229.
[38] Maggiore et al., J Hepatol. 2010, vol. 53(5), p. 981-6.
[39] McKay et al., Version 2. F1000Res. 2013; 2: 32. DOI: 10.12688/f1000research.2-32.v2
[40] Liu et al., Pediatr Int. 2013, vol. 55(2), p. 138-144.
[41] Waisbourd-Zinman et al., Ann Hepatol. 2017, vol. 16(3), p. 465-468.
[42] Griffin, et al., Canadian Journal of Gastroenterology and Hepatology 2016, vol. 2016. Abstract Number: A200. Meeting Info: 2016 Canadian Digestive Diseases Week, CDDW 2016. Montreal, QC, United States. 26 Feb. 2016-29 Feb. 2016
[43] Qiu et al., Hepatology 2017, vol. 65(5), p. 1655-1669.
[44] Imagawa et al., Sci Rep. 2017, 7:41806.
[45] Kang et al., J Pathol Transl Med. 2019 May 16. doi: 10.4132/jptm.2019.05.03. [Epub ahead of print]
[46] Takahashi et al., Eur J Gastroenterol Hepatol. 2007, vol. 19(11), p. 942-6.
[42] Shimizu et al., Am J Transplant. 2011, vol. 11(2), p. 394-398.
[48] Krawczyk et al., Ann Hepatol. 2012, vol. 11(5), p. 710-744.
[49] Sharma et al., BMC Gastroenterol. 2018, vol. 18(1), p. 107.
[50] Sattler et al., Journal of Hepatology 2017, vol. 66, No. 1, Suppl. S, pp. S177. Meeting Info.: International Liver Congress/52nd Annual Meeting of the European-Association-for-the-Study-of-the-Liver. Amsterdam, NETHERLANDS. Apr. 19-23, 2017. European Assoc Study Liver.
[51] Jung et al., J Pediatr Gastroenterol Nutr. 2007, vol. 44(4), p. 453-458.
[52] Sciveres. Digestive and Liver Disease 2010, vol. 42, Supp. SUPPL. 5, pp. S329. Abstract Number: CO18. Meeting Info: 17th National Congress SIGENP. Pescara, Italy. 7 Oct. 2010-9 Oct. 2010
[53] Sohn et al., Pediatr Gastroenterol Hepatol Nutr. 2019, vol. 22(2), p. 201-206.
[54] Ho et al., Pharmacogenet Genomics. 2010, vol. 20(1), p. 45-57.
[55] Wang et al., Hepatol Res. 2018, vol. 48(7), p. 574-584.
[56] Shaprio et al., J Hum Genet. 2010, vol. 55(5), p. 308-313.
[57] Bounford. University of Birmingham. Dissertation Abstracts International, (2016) Vol. 75, No. 1C. Order No.: AA110588329. ProQuest Dissertations & Theses.

58 Stolz et al., Aliment Pharmacol Ther. 2019, vol. 49(9), p. 1195-1204.

[59] Jankowska et al., J Pediatr Gastroenterol Nutr. 2014, vol. 58(1), p. 92-95.

[60] Kim. Journal of Pediatric Gastroenterology and Nutrition 2016, vol. 62, Supp. SUPPL. 1, pp. 620. Abstract Number: H-P-045. Meeting Info: 49th Annual Meeting of the European Society for Paediatric Gastroenterology, Hepatology and Nutrition, ESPGHAN 2016. Athens, Greece. 25 May 2016-28 May 2016.

[61] Pauli-Magnus et al., Hepatology 2003, vol. 38, No. 4 Suppl. 1, pp. 518A. print. Meeting Info.: 54th Annual Meeting of the American Association for the Study of Liver Diseases. Boston, MA, USA. Oct. 24-28, 2003. American Association for the Study of Liver Diseases.

62 Li et al., Hepatology International 2017, vol. 11, No. 1, Supp. Supplement 1, pp. S362. Abstract Number: PP0347. Meeting Info: 26th Annual Conference of the Asian Pacific Association for the Study of the Liver, APASL 2017. Shanghai, China. 15 Feb. 2017-19 Feb. 2017.

[63] Rumbo et al., Transplantation 2018, vol. 102, No. 7, Supp. Supplement 1, pp. S848. Abstract Number: P.752. Meeting Info: 27th International Congress of The Transplantation Society, TTS 2018. Madrid, Spain. 30 Jun. 2018-5 Jul. 2018.

[64] Lee et al., Pediatr Gastroenterol Hepatol Nutr. 2017, vol. 20(2), p. 114-123.

[65] Sherrif et al., Liver international: official journal of the International Association for the Study of the Liver 2013, vol. 33, No. 8, pp. 1266-1270.

[66] Blackmore et al., J Clin Exp Hepatol. 2013, vol. 3(2), p. 159-161.

[67] Matte et al., J Pediatr Gastroenterol Nutr. 2010, vol. 51(4), p. 488-493.

[68] Lin et al., Zhongguo Dang Dai Er Ke Za Zhi. 2018, vol. 20(9), p. 758-764.

[69] Harmanci et al., Experimental and Clinical Transplantation 2015, vol. 13, Supp. SUPPL. 2, pp. 76. Abstract Number: P62. Meeting Info: 1st Congress of the Turkic World Transplantation Society. Astana, Kazakhstan. 20 May 2015-22 May 2015.

[70] Herbst et al., Mol Cell Probes. 2015, vol. 29(5), p. 291-298.

[71] Moghadamrad et al., Hepatology. 2013, vol. 57(6), p. 2539-2541.

[72] Holz et al., Zeitschrift fur Gastroenterologie 2016, vol. 54, No. 8. Abstract Number: KV275. Meeting Info: Viszeralmedizin 2016, 71. Jahrestagung der Deutschen Gesellschaft fur Gastroenterologie, Verdauungs-und Stoffwechselkrankheiten mit Sektion Endoskopie-10. Herbsttagung der Deutschen Gesellschaft fur Allgemein-und Viszeralchirurgie. Hamburg, Germany. 21 Sep. 2016-24 Sep. 2016.

[73] Wang et al., PLoS One. 2016; vol. 11(4): e0153114.

[74] Hao et al., International Journal of Clinical and Experimental Pathology 2017, vol. 10(3), p. 3480-3487.

[75] Arnell et al., J Pediatr Gastroenterol Nutr. 2010, vol. 51(4), p. 494-499.

[76] Sharma et al., Indian Journal of Gastroenterology 2017, vol. 36, No. 1, Supp. Supplement 1, pp. A99. Abstract Number: M-20. Meeting Info: 58th Annual Conference of the Indian Society of Gastroenterology, ISGCON 2017. Bhubaneswar, India. 14 Dec. 2017-17 Dec. 2017.

[77] Beauséjour et al., Can J Gastroenterol. 2011, vol. 25(6), p. 311-314.

[78] Imagawa et al., Journal of Pediatric Gastroenterology and Nutrition 2016, vol. 63, Supp. Supplement 2, pp. S51. Abstract Number: 166. Meeting Info: World Congress of Pediatric Gastroenterology, Hepatology and Nutrition 2016. Montreal, QC, Canada. 5 Oct. 2016-8 Oct. 2016.

[79] Peng et al., Zhonghua er ke za zhi (Chinese journal of pediatrics) 2018, vol. 56, No. 6, pp. 440-444.

[80] Tibesar et al., Case Rep Pediatr. 2014, vol. 2014: 185923.

[81] Ng et al., Journal of Pediatric Gastroenterology and Nutrition 2018, vol. 66, Supp. Supplement 2, pp. 860. Abstract Number: H-P-127. Meeting Info: 51st Annual Meeting European Society for Paediatric Gastroenterology, Hepatology and Nutrition, ESPGHAN 2018. Geneva, Switzerland. 9 May 2018-12 May 2018.

[82] Wong et al., Clin Chem. 2008, vol. 54(7), p. 1141-1148.

[83] Pauli-Magnus et al., J Hepatol. 2005, vol. 43(2), p. 342-357.

[84] Jericho et al., Journal of Pediatric Gastroenterology and Nutrition. 60, vol. 3, p. 368-374.

[85] Scheimann et al., Gastroenterology 2007, vol. 132, No. 4, Suppl. 2, pp. A452. Meeting Info.: Digestive Disease Week Meeting/108th Annual Meeting of the American-Gastroenterological-Association. Washington, DC, USA. May 19-24, 2007. Amer Gastroenterol Assoc; Amer Assoc Study Liver Dis; Amer Soc Gastrointestinal Endoscopy; Soc Surg Alimentary Tract.

[86] Jaquotot-Haerranz et al., Rev Esp Enferm Dig. 2013, vol. 105(1), p. 52-54.

[87] Khosla et al., American Journal of Gastroenterology 2015, vol. 110, No. Suppl. 1, pp. S397. Meeting Info.: 80th Annual Scientific Meeting of the American-College-of-Gastroenterology. Honolulu, HI, USA. Oct. 16-21, 2015.

[88] Dröge et al., J Hepatol. 2017, vol. 67(6), p. 1253-1264.

[89] Liu et al., Liver International 2010, vol. 30(6), p. 809-815.

[90] Chen et al., Journal of Pediatrics 2002, vol. 140(1), p. 119-124.

[91] U.S. Pat. No. 9,295,677

In some embodiments, the mutation in ABCB11 is selected from A167T, G238V, V284L, E297G, R470Q, R470X, D482G, R487H, A570T, N591S, A865V, G982R, R1153C, and R1268Q.

Provided are methods of treating PFIC (e.g., PFIC-1 and PFIC-2) in a subject that includes performing an assay on a sample obtained from the subject to determine whether the subject has a mutation associated with PFIC (e.g., a ATP8B1, ABCB11, ABCB4, TJP2, NR1H4 or Myo5b mutation), and administering (e.g., specifically or selectively administering) a therapeutically effective amount of a compound of formula (I), or a pharmaceutically acceptable salt thereof, to the subject determined to have a mutation associated with PFIC. In some embodiments, the mutation is an ATP8B1 or ABCB11 mutation. For example, a mutation as provided in any one of Tables 1-4. In some embodiments, the mutation in ATP8B1 is selected from L127P, G308V, T456M, D554N, F529del, I661T, E665X, R930X, R952X, R1014X, and G1040R. In some embodiments, the mutation in ABCB11 is selected from A167T, G238V, V284L, E297G, R470Q, R470X, D482G, R487H, A570T, N591S, A865V, G982R, R1153C, and R1268Q.

Also provided are methods for treating PFIC (e.g., PFIC-1 and PFIC-2) in a subject in need thereof, the method comprising: (a) detecting a mutation associated with PFIC (e.g., a ATP8B1, ABCB11, ABCB4, TJP2, NR1H4 or Myo5b mutation) in the subject; and (b) administering to the subject a therapeutically effective amount of the formulation disclosed herein. In some embodiments, methods for treating PFIC can include administering a therapeutically effective amount of a compound of formula (I), or a pharmaceutically acceptable salt thereof, to a subject having a mutation associated with PFIC (e.g., an ATP8B1, ABCB11, ABCB4, TJP2, NR1H4 or Myo5b mutation). In some embodiments, the mutation is an ATP8B1 or ABCB11 mutation. For example, a mutation as provided in any one of Tables 1-4. In some embodiments, the mutation in ATP8B1 is selected from L127P, G308V, T456M, D554N, F529del, I661T, E665X, R930X, R952X, R1014X, and G1040R. In some embodiments, the mutation in ABCB11 is selected from A167T, G238V, V284L, E297G, R470Q, R470X, D482G, R487H, A570T, N591S, A865V, G982R, R1153C, and R1268Q.

In some embodiments, the subject is determined to have a mutation associated with PFIC in a subject or a biopsy sample from the subject through the use of any art recognized tests, including next generation sequencing (NGS). In some embodiments, the subject is determined to have a mutation associated with PFIC using a regulatory agency-approved, e.g., FDA-approved test or assay for identifying a mutation associated with PFIC in a subject or a biopsy sample from the subject or by performing any of the non-limiting examples of assays described herein. Additional methods of diagnosing PFIC are described in Gunaydin, M. et al., Hepat Med. 2018, vol. 10, p. 95-104, incorporated by reference in its entirety herein.

In some embodiments, the treatment of PFIC (e.g., PFIC-1 or PFIC-2) decreases the level of serum bile acids in the subject. In some embodiments, the level of serum bile acids is determined by, for example, an ELISA enzymatic assay or the assays for the measurement of total bile acids as described in Danese et al., PLoS One. 2017, vol. 12(6): e0179200, which is incorporated by reference herein in its entirety. In some embodiments, the level of serum bile acids can decrease by, for example, 10% to 40%, 20% to 50%, 30% to 60%, 40% to 70%, 50% to 80%, or by more than 90% of the level of serum bile acids prior to administration of the formulation disclosed herein. In some embodiments, the treatment of PFIC includes treatment of pruritus.

In another aspect, the invention relates to a process for the preparation of the pharmaceutical formulation as disclosed herein, comprising the step of preparing a homogeneous aqueous suspension of odevixibat. In a preferred embodiment, the coating suspension is prepared by dispersing odevixibat in water by wet milling.

In a more specific embodiment, the process comprises the steps of:
a) wetting odevixibat in water using a homogenizer; and
b) dispersing the wetted odevixibat in water by wet milling, thereby obtaining a homogeneous aqueous suspension of odevixibat.

In some embodiments, odevixibat is sieved prior to the wetting of step a).

In some embodiments, the process further comprises the step of adding a film-forming polymer to the suspension. A film-forming polymer can facilitate a uniform dispersion of odevixibat in the suspension. The film-forming polymer may be added either before or after the wet milling step. In some embodiments, the wet milling is more effective in the absence of the film-forming polymer. In a preferred embodiment, therefore, the film-forming polymer is added to the homogeneous aqueous suspension of odevixibat obtained in step (b).

The homogeneity of the coating suspension may be checked either before or after addition of the film-forming polymer. When the size of the odevixibat agglomerates can be determined by optical microscopy, such as described in the experimental section, the coating suspension should not contain agglomerates larger than 200 µm. The suspension preferably does not contain agglomerates larger than 100 µm, and more preferably does not contain agglomerates larger than 50 µm. When the size of the agglomerates is determined by light scattering techniques, such as LALLS, the $d_{90}$ value for the particle size distribution of the coating suspension is preferably smaller than 15 µm, such as smaller than 14 µm, such as smaller than 13 µm, such as smaller than 12 µm, such as smaller than 11 µm, or such as smaller than 10 µm.

In another preferred embodiment, the coating suspension does not contain surfactants.

In another aspect, the invention relates to the formulation obtained by any of the processes disclosed herein.

Definitions

As used herein, the terms "treatment," "treat," and "treating" refer to reversing, alleviating, delaying the onset of, or inhibiting the progress of a disease or disorder, or one or more symptoms thereof, as described herein. In some embodiments, treatment may be administered after one or more symptoms have developed. In other embodiments, treatment may be administered in the absence of symptoms. For example, treatment may be administered to a susceptible individual prior to the onset of symptoms (e.g., in light of a history of symptoms and/or in light of genetic or other susceptibility factors). Treatment may also be continued after symptoms have resolved, for example to prevent or delay their recurrence.

As used herein, the term "pharmaceutically acceptable" refers to those compounds, materials, compositions and/or dosage forms that are suitable for human pharmaceutical use and that are generally safe, non-toxic and neither biologically nor otherwise undesirable.

As used herein, the term "about" refers to a value or parameter herein that includes (and describes) embodiments that are directed to that value or parameter per se. For example, description referring to "about 20" includes description of "20." Numeric ranges are inclusive of the numbers defining the range. Generally speaking, the term "about" refers to the indicated value of the variable and to all values of the variable that are within the experimental error of the indicated value (e.g., within the 95% confidence interval for the mean) or within 10 percent of the indicated value, whichever is greater.

The term "crystal modification" refers to a crystalline solid phase of an organic compound. A crystal modification can be either a solvate or an ansolvate.

The term "solvate" refers to a crystalline solid phase of an organic compound, which has solvent (i.e., solvent molecules) incorporated into its crystal structure. A "hydrate" is a solvate wherein the solvent is water.

The term "sesquihydrate" refers to a hydrate containing about 1.5 moles of water associated with the crystal per mole of organic compound (i.e., a 1.5 hydrate). As used herein, a sesquihydrate includes from about 1.2 to about 1.8, more preferably from about 1.3 to about 1.7, more preferably from about 1.4 to about 1.6 and even more preferably from about 1.45 to about 1.55 moles of water associated with each mole of odevixibat in a crystal. The amount of water calculated herein excludes water adsorbed to the surface of the crystal.

The term "mixed solvate" refers to a crystalline solid phase of an organic compound, which has two or more different solvent molecules incorporated into its crystal structure. One of the at least two solvent molecules may be water.

The term "slurry" refers to a saturated solution to which an excess of solid is added, thereby forming a mixture of solid and saturated solution.

As used herein, the term "void volumes" refers to channels, layers or other more or less isolated voids in the crystal structure.

The crystallinity of a crystalline sample of odevixibat may be measured e.g. by X-Ray Powder Diffraction (XRPD) methods or by Differential Scanning Calorimetry (DSC) methods, such as the method disclosed in the experimental section. When reference is made herein to a crystalline compound, preferably the crystallinity as measured by DSC methods is greater than about 70%, such as greater than about 80%, particularly greater than about 90%, more particularly greater than about 95%. In some embodiments, the degree of crystallinity as measured by DSC methods is greater than about 98%. In some embodiments, the degree of crystallinity as measured by DSC methods is greater than about 99%. The % crystallinity refers to the percentage by weight of the total sample mass which is crystalline.

The invention will now be described by the following examples which do not limit the invention in any respect. All cited documents and references mentioned herein are incorporated by reference in their entireties.

Abbreviations

DMF dimethylformamide
DMSO dimethyl sulfoxide
EtOH ethanol
MeOH methanol
RH relative humidity
2-PrOH 2-propanol

EXPERIMENTAL METHODS

X-Ray Powder Diffraction (XRPD) Analysis

Analyses were performed at 22° C. on a PANalytical X'Pert Pro diffractometer equipped with a Cu long fine focus X-ray tube and a PIXcel detector. Automatic divergence and anti-scatter slits were used together with 0.02 rad Soller slits and a Ni-filter. Dry samples were smeared onto cut Silicon Zero Background Holders (ZBH) and analysed between 2-40° in 2-theta with an analysis time of 17 minutes. All slurry samples were dripped on tempered porous Alumina filter substrates and analysed twice as they dried, first with a one minute 16-second scan (2-30° in 2-theta) and then a 7-minute scan (2-30° in 2-theta). A final 17-minute scan was performed when the sample had dried for several hours.

The samples were spun during analysis in order to increase the randomness of the samples. The following experimental settings were used:
 Tube tension and current: 40 kV, 50 mA
 Wavelength alpha1 (CuKα1): 1.5406 Å
 Wavelength alpha2 (CuKα2): 1.5444 Å
 Wavelength alpha1 and alpha2 mean (CuKα): 1.5418 Å

It is known in the art that an X-ray powder diffraction pattern may be obtained having one or more measurement errors depending on measurement conditions (such as equipment, sample preparation or machine used). In particular, it is generally known that intensities in an XRPD pattern may fluctuate depending on measurement conditions and sample preparation. For example, persons skilled in the art of XRPD will realise that the relative intensities of peaks may vary according to the orientation of the sample under the test and on the type and setting of the instrument used. The skilled person will also realise that the position of reflections can be affected by the precise height at which the sample sits in the diffractometer and the zero calibration of the diffractometer. The surface planarity of the sample may also have a small effect. Hence a person skilled in the art will appreciate that the diffraction pattern presented herein is not to be construed as absolute and any crystalline form that provides a powder diffraction pattern substantially identical to those disclosed herein fall within the scope of the present disclosure (for further information, see R. Jenkins and R. L. Snyder, "Introduction to X-ray powder diffractometry", John Wiley & Sons, 1996).

Differential Scanning Calorimetry (DSC)

Experiments were performed using a TA Instruments Q2000 Differential Scanning Calorimeter. The DCS crucible used was a TZero aluminum pan with pinhole (diameter≥0.2 mm) in the lid. A dry nitrogen purge at a constant flow rate of 50 mL/min was maintained in the DSC cell throughout the measurement.

EXAMPLES

Example 1

Preparation of the Formulation (Small Scale)

Microcrystalline cellulose spheres were coated with one of two different coating suspensions of odevixibat, as indicated in Table 5 below, to obtain particles containing either 0.5% w/w or 1.5% w/w odevixibat.

TABLE 5

| Ingredient | Amount (g/batch) | Amount (g/batch) |
| --- | --- | --- |
| Core: | | |
| Microcrystalline cellulose spheres 700 (Vivapur ® MCC sphere 700) | 1500 | 1500 |
| Coating: | | |
| Odevixibat | 7.5 | 22.5 |
| Hypromellose 3 mPa · s (Methocel ® E3 premium) | 30.0 | 90.0 |
| Purified water[a] | 337.5 | 1012.5 |
| Total (coated particles) | 1537.5 | 1612.5 |

[a]Purified water is removed during the coating and drying process.

Crystalline odevixibat was used. Typical values for the particle size distribution of the crystalline material were $d_{10}=0.9$ μm, $d_{50}=4$ μm and $d_{90}=20$ μm, wherein $d_{10}$, $d_{50}$ and $d_{90}$ are defined as the diameters where 10%, 50% and 90%, respectively, of the particle population lies below these values.

Coating Suspension

The coating suspension containing odevixibat drug substance was prepared in three steps:
 a) Odevixibat suspension: odevixibat drug substance was sieved through a 0.5 mm sieve, followed by wetting in a small amount of the water using a homogenizer (Ultra Turrax T25; 15 minutes at approximately 6600-7000 rpm). The resulting wetted odevixibat drug substance was then dispersed in water by means of a colloid mill (IKA Magic Lab MKO or MK modules, 14600 rpm for 20 minutes, gap size 1.5 rotation) until the level of agglomerates met the in-process control acceptance limits.

b) Hypromellose dispersion: Hypromellose (3 mPa·s) was dispersed in hot water with mixing, and the resultant dispersion was cooled to room temperature.

c) Odevixibat coating suspension: The hypromellose dispersion was added to the odevixibat suspension in the colloid mill and the suspension was mixed for 4 minutes at 10000 rpm. Final mixing was continued at low speed using a magnetic stirrer. The odevixibat coating suspension was filtered through a 0.5 mm sieve before use in the coating process.

The dispersion of odevixibat in the coating suspension was monitored by optical microscopy, using a method based on European Pharmacopoeia 9.0, monograph 2.9.37, which was adjusted to be applicable for the odevixibat coating suspension. A Leica DMLB microscope equipped with a Leica DMC 2900 digital camera was used, and an objective with 10×magnification.

Samples were prepared by placing a small droplet of the coating suspension (using a Pasteur pipette) on a blank objective glass on top of a grid counting chamber of 4×4 test fields. A cover glass (about 18×18 mm, the same size as the grid) was placed on the droplet and slightly pressed on the centre to get a thin, even sample. The diameter of the sample was comparable with the size of the cover glass.

The objective was set with magnification x10 and the scale bar was adjusted to 100 µm. Five replicates were scanned. The size of any agglomerates was checked by comparing them against the scale bar in four predetermined test fields for each replicate. The total number of agglomerates was calculated from 5 replicates×4 test fields, i.e. in total 20 test fields. The coating suspension was accepted if the 20 test fields did not contain more than 5 agglomerates≥50 µm, and no agglomerates 200 µm.

Coating Process

Microcrystalline cellulose (MCC) spheres were coated using the odevixibat coating suspension in a fluid bed coater with Wurster insert. The amount of coating suspension on the MCC spheres is determined by weighing. The coated particles were sieved through a 0.5 mm and 1.25 mm sieve, respectively, in order to remove fine particles as well as twins. The particles were then transferred to bulk containers and handled as a drug product intermediate.

Capsule Filling

The calculated amount of particles required for each unit dose were filled into hard hydroxypropyl methylcellulose (HPMC) capsules (Size 0 or Size 3) using an automatic capsule filler, to provide four different strengths: 200, 400, 600 and 1200 µg.

The 200 and 600 µg strengths are Size 0 white capsules containing 40 mg of particles having an odevixibat concentration of 0.5% w/w and 1.5% w/w, respectively. These strengths will be used for patients with a weight range of 5.0 kg to <19.5 kg in the low-(40 µg/kg) and high-(120 µg/kg) dose groups of the Phase 3 clinical studies. The Size 0 capsules are designed to be opened so that the contents can be sprinkled onto a food vehicle for administration. They are not intended to be swallowed intact.

The 400 µg and 1200 µg strengths are Size 3 white capsules containing 80 mg of particles having an odevixibat concentration of 0.5% w/w and 1.5% w/w, respectively. These strengths will be used for patients with a weight range of 19.5 kg to >55.5 kg in the low-(40 µg/kg) and high-(120 µg/kg) dose groups of the Phase 3 clinical studies. The Size 3 capsules are intended to be swallowed intact.

The fill weight, the amounts of odevixibat and other ingredients and the capsule size for the different capsule strengths are shown in Table 6 below.

TABLE 6

| COMPONENT | Strength | | | |
|---|---|---|---|---|
| | 200 µg | 400 µg | 600 µg | 1200 µg |
| odevixibat concentration of particles | 0.5% w/w | | 1.5% w/w | |
| Fill weight (mg) (theoretical) Particles | 40 | 80 | 40 | 80 |
| Microcrystalline cellulose spheres 700 (Vivapur ® MCC sphere 700) | 39 | 78 | 37 | 74 |
| Odevixibat | 0.200 | 0.400 | 0.600 | 1.200 |
| Hypromellose 3 mPa · s (Methocel ® E3 Premium) | 0.8 | 1.6 | 2.4 | 4.8 |
| Capsule | | | | |
| Hypromellose capsule, white (Vcaps ® Plus) | Size 0 | Size 3 | Size 0 | Size 3 |

Example 2

Preparation of the Formulation (Larger Scale)

Microcrystalline cellulose spheres were coated with one of two different coating suspensions of odevixibat, as indicated in Table 7 below, to obtain particles containing either 0.5% w/w or 1.5% w/w odevixibat.

TABLE 7

| Ingredient | Amount (kg/batch) | Amount (kg/batch) |
|---|---|---|
| Core: | | |
| Microcrystalline cellulose spheres 700 (Vivapur ® MCC sphere 700) | 14.625 | 13.875 |
| Coating: | | |
| Odevixibat | 0.075 | 0.225 |
| Hypromellose 3 mPa · s (Methocel ® E3 premium) | 0.300 | 0.900 |
| Purified water$^a$ | 3.375 | 10.125 |
| Total (coated particles) | 15.000 | 15.000 |

$^a$Purified water is removed during the coating and drying process.

Crystalline odevixibat was used. Typical values for the particle size distribution of the crystalline material were $d_{10}$=0.9 µm, $d_{50}$=4 µm and $d_{90}$=20 µm, wherein $d_{10}$, $d_{50}$ and $d_{90}$ are defined as the diameters where 10%, 50% and 90%, respectively, of the particle population lies below these values.

Coating Suspension

The coating suspension containing odevixibat drug substance was prepared in three steps:

a) odevixibat suspension: odevixibat drug substance was wetted in a small amount of the water using a homogenizer (Ultra Turrax T25; 15 minutes at approximately 6600-7000 rpm). The resulting wetted odevixibat drug substance was then dispersed in water by means of a colloid mill (IKA Magic Lab MKO or MK modules, 14600 rpm for 20 minutes, gap size 1.5 rotation) until the level of agglomerates met the in-process control acceptance limits, i.e. $d_{90}<12$ µm (as determined by low-angle laser light scattering (LALLS)).

b) hypromellose dispersion: Hypromellose (3 mPa·s) was dispersed in hot water with mixing, and the resultant dispersion was cooled to room temperature.

c) odevixibat coating suspension: The hypromellose dispersion was added to the odevixibat suspension and the suspension was mixed. Final mixing was continued at low speed using a stirrer. The odevixibat coating suspension was filtered through a 0.5 mm sieve before use in the coating process.

Coating Process

The obtained odevixibat coating suspension was used for coating microcrystalline cellulose (MCC) spheres in accordance with the coating process described in Example 1.

Capsule Filling

Capsules were prepared in accordance with Example 1. The fill weight, the amounts of odevixibat and other ingredients and the capsule size for the different capsule strengths were as presented in Table 5 above.

Example 3

Preparation of Crystal Modification 1

Absolute alcohol (100.42 kg) and crude odevixibat (18.16 kg) were charged to a 250-L GLR with stirring under nitrogen atmosphere. Purified water (12.71 kg) was added and the reaction mass was stirred under nitrogen atmosphere at 25±5° C. for 15 minutes. Stirring was continued at 25±5° C. for 3 to 60 minutes, until a clear solution had formed. The solution was filtered through a 5.0 µ SS cartridge filter, followed by a 0.2 µPP cartridge filter and then transferred to a clean reactor. Purified water (63.56 kg) was added slowly over a period of 2 to 3 hours at 25±5° C., and the solution was seeded with crystal modification 1 of odevixibat. The solution was stirred at 25±5° C. for 12 hours. During this time, the solution turned turbid. The precipitated solids were filtered through centrifuge and the material was spin dried for 30 minutes. The material was thereafter vacuum dried in a Nutsche filter for 12 hours. The material was then dried in a vacuum tray drier at 25±5° C. under vacuum (550 mm Hg) for 10 hours and then at 30±5° C. under vacuum (550 mm Hg) for 16 hours. The material was isolated as an off-white crystalline solid. The isolated crystalline material was milled and stored in LDPE bags.

An overhydrated sample was analyzed with XRPD and the diffractogram is shown in FIG. 2. Another sample was dried at 50° C. in vacuum and thereafter analysed with XRPD. The diffractogram of the dried sample is shown in FIG. 1.

The diffractograms for the drying of the sample are shown in FIGS. 3 and 4 for 2θ ranges 5-13° and 18-25°, respectively (overhydrated sample at the bottom and dry sample at the top).

Example 4

Preparation of Crystal Modification 2 from Ethanol and Water 105.9 mg of odevixibat were weighed into a 1 mL Chromacol vessel. A magnetic stir bar and 1.0 mL of an ethanol:water 70:30% v/v mixture were added and the vessel was closed with a crimped cap. The resulting slurry was then left stirred at 25° C. for 1 week.

Figure 5:
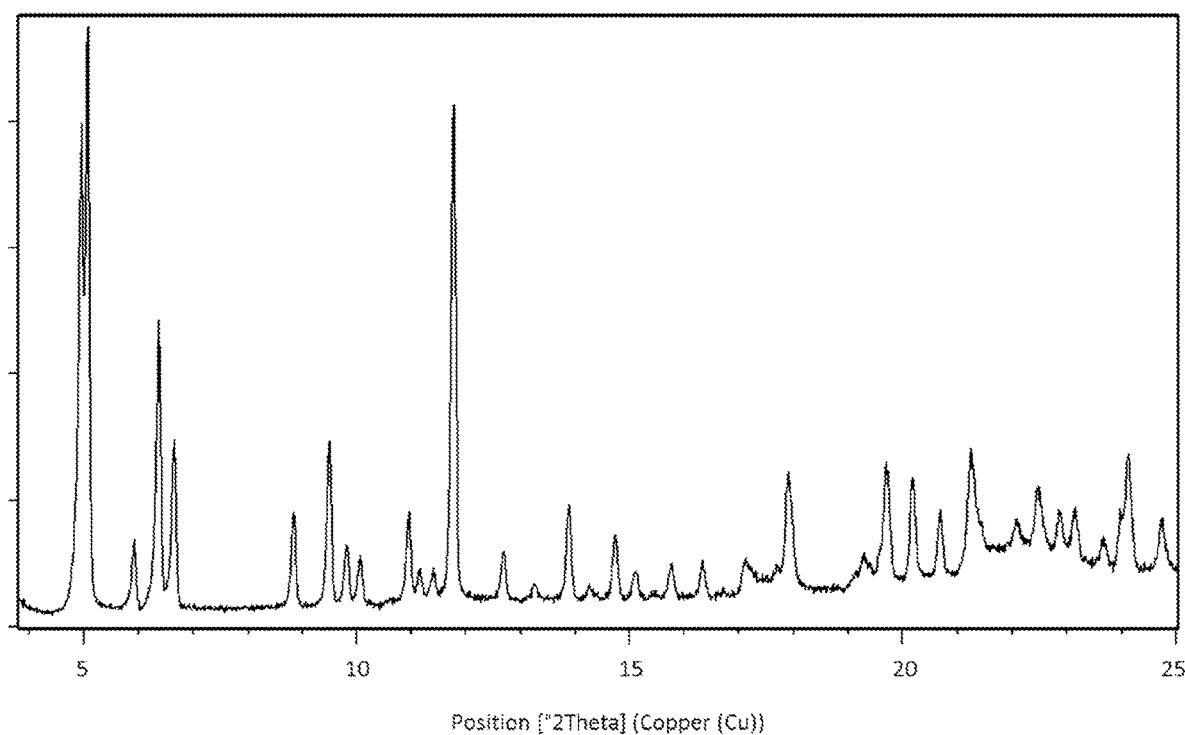
FIG. 5 shows the X-ray powder diffractogram of crystal modification 2A, as obtained from a mixture of ethanol and water (70:30% v/v).

The wet sample was analyzed with XRPD and the diffractogram is shown in FIG. 5. Upon drying of the sample, it transformed into crystal modification 1.

Example 5

Determination of Crystalline Fraction by Differential Scanning Calorimetry

This method quantifies the crystalline fraction of odevixibat drug substance in partially crystalline samples. The quantification is based on the assumption that partially crystalline samples are binary mixtures of the crystalline hydrate and the amorphous phase of odevixibat. The crystalline fraction is quantified based on the melting enthalpy of an anhydrous form. This anhydrous form is the dehydrated hydrate which spontaneously and reproducibly forms by drying the hydrate at elevated temperature.

5-6 mg of a sample of a crystalline or partially crystalline sample of odevixibat was accurately weighed into a DSC crucible which was then closed with a perforated lid using a suitable press. The total weight of the DSC crucible (pan+lid+sample) was noted and the total weight of the crucible was again determined after the DSC test. The weight loss during the DSC test must not be more than 5%.

The DSC test consists of three cycles:
Cycle 1: an increase in temperature from 20° C. to 120° C. at a scanning rate of 5° C./min;
Cycle 2: a decrease in temperature from 120° C. to 80° C. at a scanning rate of 10° C./min; and
Cycle 3: an increase in temperature from 80° C. to 200° C. at a scanning rate of 10° C./min.

The first scan cycle dries the sample and thereby converts the hydrate form into a dehydrated hydrate (an anhydrous form). In the second scan cycle, the sample is cooled down to obtain a stable baseline in the subsequent heat-up for signal integration. The melting enthalpy is determined in the third scan cycle, where the sample is heated through the melting of the anhydrous form.

Figure 6:
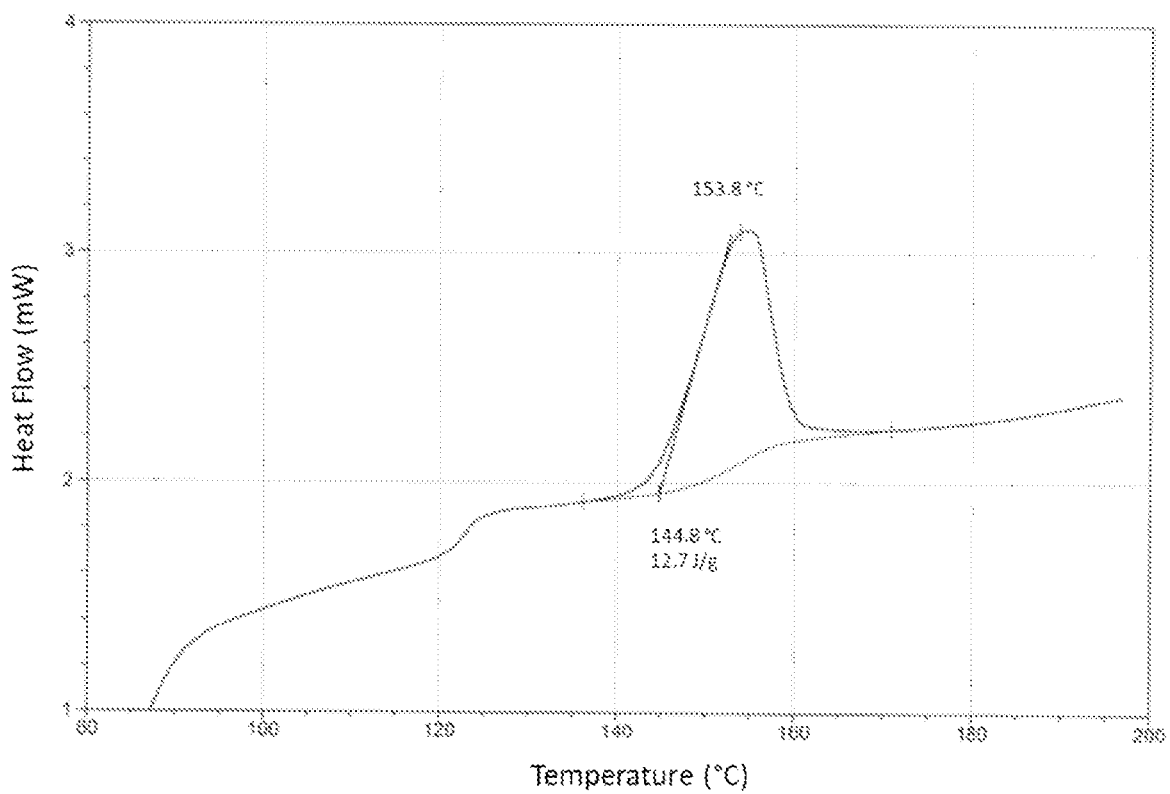
FIG. 6 shows the DSC trace of a sample of odevixibat with about 50% crystalline fraction (after pre-heating and cooling).

The endothermic event due to melting appears in the temperature range of 140-165° C. The peak must be integrated over a sigmoidal tangent baseline using the Sig Tangent integration function of the TA Universal Analysis software. The integration should start at a temperature between 130° C. and 140° C., and end at a temperature between 165° C. and 175° C., depending on the actual baseline. The glass transition of the amorphous part may appear in the temperature range of 120-130° C., depending on the actual amorphous fraction (see FIG. 6 for an example). If an irregular baseline does not allow the integration, it should be assessed whether the drying of the sample was incomplete.

The evaluation of the melting enthalpy is done by using the dry weight of the sample, which is obtained by subtracting the total weight of the DSC crucible (pan+lid+sample) after the DSC test from the total weight of the crucible before the test. The percent weight loss during the DSC scan, which is the difference between the initial weight and the dry weight divided by the initial weight, must not be more than 5%; otherwise the crystalline content of the sample cannot be calculated. The crystalline fraction expressed in weight percent is to be calculated from the melting enthalpy ($\Delta H_{sample}$) based on the following formula. The value shall be given on an integer number.

$$\% \text{ crystalline content} = \frac{\Delta H_{sample} + 1.1626}{0.2815}$$

Example 6

Homogeneity Monitored by LALLS

The homogeneity of odevixibat coating suspensions was studied using low-angle laser light scattering (LALLS). Three odevixibat coating suspensions intended for particles containing 0.5% w/w odevixibat were produced by dispersing odevixibat drug substance (16 g) in water (200 g) with an Ultra Turrax homogenizer for 7 minutes. When the drug substance was dispersed, the homogenizer was run for an additional 8 minutes. The homogenizer was then rinsed with water (216 g), which was added to the suspension.

The odevixibat suspensions were then dispersed using a wet mill (IKA Magic Lab and MK module), using the settings presented in Table 8. Methocel E3 was dispersed in hot water (85-90° C.) while mixing with an overhead stirrer and then cooled to room temperature. The concentration was adjusted to 17.4% w/w by the addition of water.

368 g of the Methocel gel was charged to the odevixibat suspension and mixed using the wet mill for another 4 minutes at 10000 rpm. The temperature of the suspension was checked during the process. The homogeneity of the odevixibat suspension was monitored with LALLS after 0, 5, 10, 15 and 20 minutes recirculation time. The data are presented in Table 9.

TABLE 8

| Suspension No. | 1 | 2 | 3 |
|---|---|---|---|
| Dispersion (Ultra Turrax) | | | |
| Time (min) | 15 | 15 | 15 |
| Speed (rpm) | 6800-8000 | 7600-8000 | 6600-8000 |
| Dispersion (Wet mill) | | | |
| Gap (rotations) | 1.5 | 1.5 | 1.0 |
| Time (min) | 20 | 20 | 20 |
| Speed (rpm) | 14600 | 14600 | 14600 |
| Cooling (MK module) | | | |
| Set point (° C.) | N/A | 25 | 10 |
| Temperature (° C.) of coating suspension after 20 min wet milling | 72 | 50 | 55 |

TABLE 9

| Suspension No. | Recirculation time (min) | LALLS (μm) $d_{10}$ | $d_{50}$ | $d_{90}$ | Comments |
|---|---|---|---|---|---|
| 1 | 0 | 1.5 | 5.5 | 17.9 | |
| | 5 | 1.1 | 3.9 | 10.5 | |
| | 10 | 1.2 | 3.9 | 9.3 | |
| | 15 | 2.4 | 5.2 | 11.3 | |
| | 20 | 1.8 | 4.1 | 8.8 | Sample taken after addition of Methocel |
| | 20 | 1.6 | 3.9 | 8.7 | Sample taken after 5 days storage at room temperature with magnetic stirring |
| 2 | 0 | 1.5 | 6.5 | 29.1 | |
| | 5 | 1.2 | 4.3 | 11.4 | |
| | 10 | 1.1 | 3.8 | 9.3 | |
| | 15 | 1.1 | 3.6 | 8.5 | |
| | 20 | 1.0 | 3.5 | 8.2 | Sample taken when wet milling was finished |
| | 20 | 1.1 | 3.7 | 8.6 | Sample taken after addition of Methocel |
| 3 | 0 | n.d. | n.d. | n.d. | |
| | 5 | 0.9 | 3.4 | 8.8 | |
| | 10 | 0.9 | 3.2 | 7.7 | |
| | 15 | 1.1 | 3.7 | 8.5 | |
| | 20 | 1.1 | 3.8 | 8.9 | Sample taken when wet milling was finished |
| | 20 | 1.0 | 3.4 | 8.0 | Sample taken after addition of Methocel |

Example 7

Content Uniformity

Pellets of two different strengths, 0.5% w/w and 1.5% w/w, were prepared as described in Example 1. The amount of odevixibat in a capsule was determined for 30 capsules, using reversed-phase high-performance liquid chromatography (RP-HPLC). Mobile phase: 40:60 acetonitrile:acetate buffer pH 5.5; flow rate 1.5 mL/min; column: Zorbax SB-CN (50×4.6 mm, 3.5 μm). The assayed amount of odevixibat and the content uniformity are presented in Table 10.

TABLE 10

| Odevixibat concentration in particles | 0.5% w/w | 1.5% w/w | 0.5% w/w |
|---|---|---|---|
| Assay (mg/g) | 4.98 | 14.2 | 4.88 |
| Content Uniformity: RSD % (n = 30) | 1.6 | 0.8 | 1.4 |

Example 8

Stability Testing at Low pH

The compatibility between particles coated with odevixibat and yoghurt, apple sauce, or fruit purée was evaluated by sprinkling about 40 mg of coated particles containing 0.5% w/w odevixibat (corresponding to the contents one 200 μg capsule) onto 1 tablespoon of the food and determining recovery over a period of 120 minutes. The recovery of odevixibat was determined using a reversed-phase high-performance liquid chromatography (RP-HPLC) method. Mobile phase: 40:60 acetonitrile:acetate buffer pH 5.5; flow rate 1.5 mL/min; column: Zorbax SB-CN (50×4.6 mm, 3.5 μm).

The recovery for all food samples ranged between 95% to 101% with no change over time. Visual inspection concluded that the particles were intact for up to 6 hours for all samples; no colour differences and no dissolved particles were observed. The results verify that patients who sprinkle the particles onto food will receive the intended dose. A summary of the foods tested is presented in Table 11, and the results of the recovery testing are presented in Table 12 (apple sauce), Table 13 (yoghurt smoothie), and Table 14 (fruit purée).

TABLE 11

| Food | Brand | pH | Ingredients |
|---|---|---|---|
| Apple sauce | Eldorado | 3.7 | Apple 92%, sugar 7%, antioxidant (ascorbic acid), preservatives (E202) |
| Yoghurt smoothie | Semper | 3.9 | Banana 42%, strawberry 30%, yoghurt (heat treated) 20%, water, corn starch, chokeberry juice concentrate, lemon juice concentrate, antioxidant (ascorbic acid) |
| Fruit purée | Semper | 3.9 | Water, orange juice (from concentrate) 23%, apple 20%, banana 15%, rice starch, vitamin C, iron |

TABLE 12

| Time (min) | Added particle weight (mg) | Nominal amount of odevixibat (µg) | Assay for odevixibat (µg) | Recovery (%) | Mean (%) |
|---|---|---|---|---|---|
| 0 | 39.58 | 201.07 | 199.35 | 99.1 | 99 |
|   | 42.35 | 215.14 | 212.28 | 98.7 |    |
| 15 | 40.37 | 205.08 | 187.29 | 91.3 | 96 |
|   | 40.37 | 205.08 | 205.37 | 100.1 |   |
| 30 | 41.21 | 209.35 | 206.45 | 98.6 | 98 |
|   | 39.97 | 203.05 | 197.70 | 97.4 |    |
| 60 | 40.50 | 205.74 | 198.14 | 96.3 | 97 |
|   | 40.20 | 204.22 | 199.99 | 97.9 |    |
| 120 | 39.61 | 201.22 | 199.22 | 99.0 | 98 |
|   | 40.12 | 203.81 | 199.65 | 98.0 |    |

TABLE 13

| Time (min) | Added particle weight (mg) | Nominal amount of odevixibat (µg) | Assay for odevixibat (µg) | Recovery (%) | Mean (%) |
|---|---|---|---|---|---|
| 0 | 42.07 | 213.72 | 213.60 | 99.9 | 99 |
|   | 42.38 | 215.29 | 209.17 | 97.2 |    |
| 15 | 41.24 | 209.50 | 206.01 | 98.3 | 97 |
|   | 40.42 | 205.33 | 195.58 | 95.2 |    |
| 30 | 40.70 | 206.76 | 199.48 | 96.5 | 96 |
|   | 41.96 | 213.16 | 203.30 | 95.4 |    |
| 60 | 40.39 | 205.18 | 197.33 | 96.2 | 96 |
|   | 39.38 | 200.05 | 192.06 | 96.0 |    |
| 120 | 40.99 | 208.23 | 199.05 | 95.6 | 96 |
|   | 39.42 | 200.25 | 192.38 | 96.1 |    |

TABLE 14

| Time (min) | Added particle weight (mg) | Nominal amount of odevixibat (µg) | Assay for odevixibat (µg) | Recovery (%) | Mean (%) |
|---|---|---|---|---|---|
| 0 | 43.57 | 221.34 | 188.05 | 85.0 | 95 |
|   | 37.79 | 191.97 | 200.25 | 104.3 |    |
| 15 | 39.74 | 201.88 | 194.86 | 96.5 | 101 |
|   | 39.34 | 199.85 | 209.63 | 104.9 |    |
| 30 | 41.72 | 211.94 | 203.61 | 96.1 | 101 |
|   | 41.77 | 212.19 | 226.27 | 106.6 |    |
| 60 | 42.25 | 214.63 | 208.02 | 96.9 | 96 |
|   | 43.39 | 220.42 | 210.74 | 95.6 |    |
| 120 | 39.05 | 198.37 | 196.18 | 98.9 | 97 |
|   | 40.33 | 204.88 | 196.19 | 95.8 |    |

The primary degradation pathway expected for odevixibat particles, when mixed with the specified food vehicles for administration, is acidic hydrolysis of the dipeptide moiety. To evaluate the chemical stability of the odevixibat particles, 1 mL of phosphate buffer pH 3.0 was added to about 200 mg of particles containing 0.5% w/w odevixibat (i.e., the content of five 200 µg capsules) and left at room temperature for 2 hours. No degradation was observed.

Example 9

Long-Term Stability Testing

Odevixibat capsules of size 0 and size 3, prepared in accordance with Example 1, were stored in a HDPE bottle with an HDPE cap and kept at 25° C. and 60% relative humidity as the long-term storage condition, and at 40° C. and 75% relative humidity as the accelerated condition. The amounts of odevixibat, related substances and water were determined after 1, 3, 6, 9 and 12 months for samples stored at 25° C./60% RH, and after 1, 3, and 6 months for samples stored at 40° C./75% RH. The results for capsules of strength 200 µg (Size 0) are presented in Table 15; for capsules of strength 600 µg (Size 0) in Table 16; for capsules of strength 400 µg (Size 3) in Table 17; and for capsules of strength 1200 µg (Size 3) in Table 18.

TABLE 15

Stability data for capsules of strength 200 µg.

| Test | Acceptance Criteria | Storage Conditions | Storage period (months) | | | | | |
|---|---|---|---|---|---|---|---|---|
|  |  |  | 0 | 1 | 3 | 6 | 9 | 12 |
| Description | White oblong hard capsule containing white to off-white pellets | 25° C./60% RH | Conforms | Conforms | Conforms | Conforms | Conforms | Conforms |
|  |  | 40° C./75% RH |  | Conforms | Conforms | Conforms |  |  |
| Assay | 180-220 µg/capsule | 25° C./60% RH | 207 | 205 | 206 | 204 | 209 | 207 |
|  |  | 40° C./75% RH |  | 206 | 206 | 205 |  |  |
| Related Substances, Total | ≤4.0% | 25° C./60% RH | 0.53 | 0.51 | 0.48 | 0.47 | 0.55 | 0.57 |
|  |  | 40° C./75% RH |  | 0.44 | 0.63 | 0.90 |  |  |
| Dissolution | Q = 75% at 45 mins | 25° C./60% RH | 104 | 101 | 102 | 102 | 106 | 106 |
|  |  | 40° C./75% RH |  | 99 | 102 | 101 |  |  |

TABLE 15-continued

Stability data for capsules of strength 200 µg.

| Test | Acceptance Criteria | Storage Conditions | \multicolumn{6}{c}{Storage period (months)} |
|---|---|---|---|---|---|---|---|---|

| Test | Acceptance Criteria | Storage Conditions | 0 | 1 | 3 | 6 | 9 | 12 |
|---|---|---|---|---|---|---|---|---|
| Water Content | Report (%) | 25° C./60% RH | 3.3 | NT | NT | 3.5 | NT | 4.3 |
|  |  | 40° C./75% RH |  | NT | NT | 4.5 |  |  |

TABLE 16

Stability data for capsules of strength 600 µg.

| Test | Acceptance Criteria | Storage Conditions | 0 | 1 | 3 | 6 | 9 | 12 |
|---|---|---|---|---|---|---|---|---|
| Description | White oblong hard capsule containing white to off-white pellets | 25° C./60% RH | Conforms | Conforms | Conforms | Conforms | Conforms | Conforms |
|  |  | 40° C./75% RH |  | Conforms | Conforms | Conforms |  |  |
| Assay | 540-660 µg/capsule | 25° C./60% RH | 576 | 600 | 596 | 597 | 603 | 599 |
|  |  | 40° C./75% RH |  | 599 | 612 | 601 |  |  |
| Related Substances, Total | ≤4.0% | 25° C./60% RH | 0.53 | 0.52 | 0.47 | 0.44 | 0.43 | 0.41 |
|  |  | 40° C./75% RH |  | 0.45 | 0.48 | 0.73 |  |  |
| Dissolution | Q = 75% at 45 mins | 25° C./60% RH | 99 | 99 | 100 | 97 | 102 | 106 |
|  |  | 40° C./75% RH |  | 100 | 99 | 96 |  |  |
| Water Content | Report (%) | 25° C./60% RH | 3.4 | NT | NT | 3.3 | NT | 4.4 |
|  |  | 40° C./75% RH |  | NT | NT | 4.4 |  |  |

TABLE 17

Stability data for capsules of strength 400 µg.

| Test | Acceptance Criteria | Storage Conditions | 0 | 1 | 3 | 6 | 9 | 12 |
|---|---|---|---|---|---|---|---|---|
| Description | White oblong hard capsule containing white to off-white pellets | 25° C./60% RH | Conforms | Conforms | Conforms | Conforms | Conforms | Conforms |
|  |  | 40° C./75% RH |  | Conforms | Conforms | Conforms |  |  |
| Assay | 360-440 µg/capsule | 25° C./60% RH | 397 | 395 | 397 | 400 | 396 | 399 |
|  |  | 40° C./75% RH |  | 394 | 392 | 398 |  |  |
| Related Substances, Total | ≤4.0% | 25° C./60% RH | 0.63 | 0.51 | 0.47 | 0.57 | 0.57 | 0.59 |
|  |  | 40° C./75% RH |  | 0.42 | 0.55 | 0.83 |  |  |
| Dissolution | Q = 75% at 45 mins | 25° C./60% RH | 100 | 99 | 99 | 99 | 102 | 99 |
|  |  | 40° C./75% RH |  | 100 | 101 | 99 |  |  |
| Water Content | Report (%) | 25° C./60% RH | 3.7 | NT | NT | 3.1 | NT | 4.2 |
|  |  | 40° C./75% RH |  | NT | NT | 4.3 |  |  |

TABLE 18

Stability data for capsules of strength 1200 µg.

| Test | Acceptance Criteria | Storage Conditions | 0 | 1 | 3 | 6 | 9 | 12 |
|---|---|---|---|---|---|---|---|---|
| Description | White oblong hard capsule containing white to off-white pellets | 25° C./60% RH | Conforms | Conforms | Conforms | Conforms | Conforms | Conforms |
|  |  | 40° C./75% RH |  | Conforms | Conforms | Conforms |  |  |

TABLE 18-continued

Stability data for capsules of strength 1200 µg.

| Test | Acceptance Criteria | Storage Conditions | Storage period (months) | | | | | |
|---|---|---|---|---|---|---|---|---|
| | | | 0 | 1 | 3 | 6 | 9 | 12 |
| Assay | 1080-1320 µg/capsule | 25° C./60% RH | 1191 | 1194 | 1174 | 1169 | 1196 | 1175 |
| | | 40° C./75% RH | | 1200 | 1192 | 1191 | | |
| Related Substances, Total | ≤4.0% | 25° C./60% RH | 0.53 | 0.51 | 0.48 | 0.46 | 0.44 | 0.51 |
| | | 40° C./75% RH | | 0.55 | 0.51 | 0.63 | | |
| Dissolution | Q = 75% at 45 mins | 25° C./60% RH | 99 | 97 | 99 | 99 | 98 | 98 |
| | | 40° C./75% RH | | 101 | 100 | 98 | | |
| Water Content | Report (%) | 25° C./60% RH | 3.5 | NT | NT | 3.0 | NT | 4.1 |
| | | 40° C./75% RH | | NT | NT | 4.3 | | |

Example 10

Blend Uniformity of Pellets

Particles of two different strengths, 0.5% w/w and 1.5% w/w, were prepared as described in Example 2. The sieved pellets were collected in a 55 L drum, lined with a PE bag. The pellets were sampled from 10 different locations of the drum with a sampling thief tip of 0.25 mL. The average sample from each location was 80 mg, corresponding to the content of two Size 0 capsules of 200 µg or 600 µg, or one Size 3 capsule of 400 µg or 1200 µg. The content of odevixibat was determined by RP-UPLC: Mobile phase A: 80:20 ammonium acetate buffer pH 5.7/acetonitrile; Mobile phase B: 20:80 ammonium acetate buffer pH 5.7/acetonitrile; flow rate 0.40 mL/min; column: Waters Acquity BEH C8 100×2.1 mm, 1.7 mm; Gradient: 0 min: 60% A: 40% B, 12 min: 20% A: 80% B, 13.5 min: 20% A: 80% B, 13.6 min: 60% A: 40% B, 15 min: 60% A: 40% B. The assayed amount of odevixibat and the content uniformity are presented in Table 19.

TABLE 19

| | Assay for odevixibat (% of Label Claim) | |
|---|---|---|
| Sample | 0.5% w/w | 1.5% w/w |
| 1 | 101.7 | 99.5 |
| 2 | 97.6 | 101.7 |
| 3 | 98.8 | 101.1 |
| 4 | 100.8 | 101.5 |
| 5 | 100.4 | 97.7 |
| 6 | 99.7 | 98.5 |
| 7 | 100.4 | 102.7 |
| 8 | 99.5 | 103.5 |
| 9 | 98.4 | 102.5 |
| 10 | 99.5 | 100.6 |
| Mean | 99.7 | 100.9 |
| Min | 97.6 | 97.7 |
| Max | 101.7 | 103.5 |
| RSD (%) | 1.2 | 1.9 |

The invention claimed is:

1. A method for treating a liver disease comprising administering to a subject in need of such treatment a therapeutically effective amount of a pharmaceutical formulation of odevixibat,
wherein the pharmaceutical formulation of odevixibat comprises a plurality of particles,
wherein each particle is between about 0.1 and about 1.5 mm in size and contains odevixibat, or a pharmaceutically acceptable salt thereof, in an amount of from about 0.1% w/w to about 5.0% w/w based on the total weight of the particle, and
wherein each particle comprises odevixibat agglomerates having a $d_{90}$ particle size distribution of less than 15 µm.

2. The method according to claim 1, wherein the liver disease is a cholestatic liver disease.

3. The method according to claim 2, wherein the cholestatic liver disease is selected from the group consisting of: biliary atresia; progressive familial intrahepatic cholestasis (PFIC); Alagille syndrome (ALGS); and primary biliary cirrhosis (PBC).

4. The method according to claim 2, wherein the cholestatic liver disease is cholestatic pruritus.

5. The method according to claim 2, wherein the cholestatic liver disease is biliary atresia.

6. The method according to claim 5, wherein the biliary atresia is post-Kasai biliary atresia or post-liver transplantation biliary atresia.

7. The method according to claim 2, wherein the cholestatic liver disease is PFIC.

8. The method according to claim 7, wherein the PFIC is PFIC-1, PFIC-2, PFIC-3, non-specified PFIC, post-biliary diversion PFIC, or post-liver transplant PFIC.

9. The method according to claim 2, wherein the cholestatic liver disease is ALGS.

10. The method according to claim 1, wherein each particle contains odevixibat, or a pharmaceutically acceptable salt thereof, in an amount of from about 0.5% w/w to about 2.0% w/w based on the total weight of the particle.

11. The method according to claim 1, wherein each particle comprises a core and a coating layer surrounding the core.

12. The method according to claim 11, wherein the coating layer comprises odevixibat, or a pharmaceutically acceptable salt thereof.

13. The method according to claim 11, wherein the core does not contain odevixibat, or a pharmaceutically acceptable salt thereof.

14. The method according to claim 1, wherein odevixibat is present as a crystalline hydrate of odevixibat.

15. The method according to claim 1, wherein odevixibat is present as crystal modification 1 of odevixibat.

16. The method according to claim 15, wherein crystal modification 1 of odevixibat has an X-ray powder diffraction (XRPD) pattern, obtained with CuKα1-radiation, with at least specific peaks at °2θ positions 5.6±0.2, 6.7±0.2 and/or 12.1±0.2.

17. The method according to claim 1, wherein the subject is a pediatric subject.

18. A process for the preparation of a pharmaceutical formulation of odevixibat, the process comprising the step of preparing a homogeneous aqueous suspension of odevixibat.

19. The process according to claim 18, wherein the homogenous aqueous suspension is prepared by dispersing odevixibat in water by wet milling.

20. A process for the preparation of a pharmaceutical formulation of odevixibat, or a pharmaceutically acceptable salt thereof, the process comprising the steps of:
 a) wetting odevixibat in water using a homogenizer;
 b) dispersing the wetted odevixibat in water by wet milling, thereby obtaining a homogeneous aqueous suspension of odevixibat; and
 c) spraying the homogeneous aqueous suspension of odevixibat onto a plurality of cores, thereby forming a plurality of particles;
wherein each particle is between about 0.1 and about 1.5 mm in size and contains odevixibat, or pharmaceutically acceptable salt thereof, in an amount of from about 0.1% w/w to about 5.0% w/w based on the total weight of the particle, and
wherein each particle comprises odevixibat agglomerates having a $d_{90}$ particle size distribution of less than 15 µm.

* * * * *

SEQUENCE LISTING

```
Sequence total quantity: 4
SEQ ID NO: 1            moltype = AA   length = 1251
FEATURE                 Location/Qualifiers
source                  1..1251
                        mol_type = protein
                        organism = Homo sapiens
SEQUENCE: 1
MSTERDSETT FDEDSQPNDE VVPYSDDETE DELDDQGSAV EPEQNRVNRE AEENREPFRK    60
ECTWQVKAND RKYHEQPHFM NTKFLCIKES KYANNAIKTY KYNAFTFIPM NLFEQFKRAA   120
NLYFLALLIL QAVPQISTLA WYTTLVPLLV VLGVTAIKDL VDDVARHKMD KEINNRTCEV   180
IKDGRFKVAK WKEIQVGDVI RLKKNDFVPA DILLLSSSEP NSLCYVETAE LDGETNLKFK   240
MSLEITDQYL QREDTLATFD GFIECEEPNN RLDKFTGTLF WRNTSFPLDA DKILLRGCVI   300
RNTDFCHGLV IFAGADTKIM KNSGKTRFKR TKIDYLMNYM VYTIFVVLIL LSAGLAIGHA   360
YWEAQVGNSS WYLYDGEDDT PSYRGFLIFW GYIIVLNTMV PISLYVSVEV IRLGQSHFIN   420
WDLQMYYAEK DTPAKARTTT LNEQLGQIHY IFSDKTGTLT QNIMTFKKCC INGQIYGDHR   480
DASQHNHNKI EQVDFSWNTY ADGKLAFYDH YLIEQIQSGK EPEVRQFFFL LAVCHTVMVD   540
RTDGQLNYQA ASPDEGALVN AARNFGFAFL ARTQNTITIS ELGTERTYNV LAILDFNSDR   600
KRMSIIVRTP EGNIKLYCKG ADTVIYERLH RMNPTKQETQ DALDIFANET LRTLCLCYKE   660
IEEKEFTEWN KKFMAASVAS TNRDEALDKV YEEIEKDLIL LGATAIEDKL QDGVPETISK   720
LAKADIKIWV LTGDKKETAE NIGFACELLT EDTTICYGED INSLLHARME NQRNRGGVYA   780
KFAPPVQESF FPPGGNRALI ITGSWLNEIL LEKKTKRNKI LKLKFPRTEE ERRMRTQSKR   840
RLEAKKEQRQ KNFVDLACEC SAVICCRVTP KQKAMVVDLV KRYKKAITLA IGDGANDVNM   900
IKTAHIGVGI SGQEGMQAVM SSDYSFAQFR YLQRLLLVHG RWSYIRMCKF LRYFFYKNFA   960
FTLVHFWYSF FNGYSAQTAY EDWFITLYNV LYTSLPVLLM GLLDQDVSDK LSLRFPGLYI  1020
VGQRDLLFNY KRFFVSLLHG VLTSMILFFI PLGAYLQTVG QDGEAPSDYQ SFAVTIASAL  1080
VITVNFQIGL DTSYWTFVNA FSIFGSIALY FGIMFDFHSA GIHVLFPSAF QFTGTASNAL  1140
RQPYIWLTII LAVAVCLLPV VAIRFLSMTI WPSESDKIQK HRKRLKAEEQ WQRRQQVFRR  1200
GVSTRRSAYA FSHQRGYADL ISSGRSIRKK RSPLDAIVAD GTAEYRRTGD S           1251

SEQ ID NO: 2            moltype = DNA  length = 3756
FEATURE                 Location/Qualifiers
```

```
source                  1..3756
                        mol_type = genomic DNA
                        organism = Homo sapiens
SEQUENCE: 2
atgagtacag aaagagactc agaaacgaca tttgacgagg attctcagcc taatgacgaa    60
gtggttccct acagtgatga tgaaacagaa gatgaacttg atgaccaggg gtctgctgtt   120
gaaccagaac aaaaccgagt caacagggaa gcagaggaga accgggagcc attcagaaaa   180
gaatgtacat ggcaagtcaa agcaaacgat cgcaagtacc acgaacaacc tcactttatg   240
aacacaaaat tcttgtgtat taaggagagt aaatatgcga ataatgcaat taaaacatac   300
aagtacaacg catttacctt tataccaatg aatctctttg agcagtttaa gagagcagcc   360
aatttatatt tcctggctct tcttatctta caggcagttc ctcaaatctc taccctggct   420
tggtacacca cactagtgcc cctgcttgtg gtgctgggcg tcactgcaat caaagacctg   480
gtggacgatg tggctcgcca taaaatggat aaggaaatca acataggac gtgtgaagtc    540
attaaggatg gcaggttcaa agttgctaag tggaaagaaa ttcaagttgg agacgtcatt   600
cgtctgaaaa aaaatgattt tgttccagct gacattctcc tgctgtctag ctctgagcct   660
aacagcctct gctatgtgga acagcagaaa ctggatggaa aaccaatttt aaaatttaag   720
atgtcacttg aaatcacaga ccagtacctc caaagagaag atacattggc tacatttgat   780
ggtttattg aatgtgaaga acccaataac agactagata agttacagg aacactattc    840
tggagaaaca caagttttcc tttggatgct gataaaattt tgttacgtgg ctgtgtaatt   900
aggaacaccg atttctgcca cggcttagtc attttgcag gtgctgacac taaaataatg    960
aagaatagtg ggaaaccag atttaaaga actaaaattg attacttgat gaactacatg    1020
gtttacacga tctttgttgt tcttattctg ctttctgctg tgcttgccat cggccatgct   1080
tattgggaag cacaggtggg caattcctct tggtaccttt atgatggaga agacgataca   1140
ccctcctacc gtggattcct cattttctgg ggctatatca ttgttctcaa caccatggta   1200
cccatctctc tctatgtcag cgtggaagtg attcgtcttg acagagtca cttcatcaac    1260
tgggacctgc aaatgtacta tgctgagaag gacacacccg caaagctag aaccaccaca   1320
ctcaatgaac agctcgggca gatccattat atcttctctg ataagacggg gacactcaca   1380
caaaatatca tgaccttta aaaagtgctgt atcaacgggc agatatatgg ggaccatcgg   1440
gatgcctctc aacacaacca caacaaaata gagcaagtta attttagctg gaatacatat   1500
gctgatggga agcttgcatt ttatgaccac tatcttattg agcaaatcca gtcagggaaa   1560
gagccagaag tacgacagtt cttcttcttg ctcgcagttt gccacacagt catggtggat   1620
aggactgatg tcagctcaa ctaccaggca gcctctcccg atgaaggtgc cctggtaaac    1680
gctgccagga actttggctt tgccttcctc gccaggaccc agaacaccat caccatcagt   1740
gaactgggca ctgaaaggac ttacaatgtt cttgccattt tggacttcaa cagtgaccgg   1800
aagcgaatgt ctatcattgt aagaacccca gaaggcaata tcaagcttta ctgtaaaggt   1860
gctgacactg ttatttatga acggttacat cgaatgaatc ctactaagca agaaacacag   1920
gatgccctgg atatctttgc aaatgaaact cttagaaccc tatgcctttg ctacaaggaa   1980
attgaagaaa agaatttac agaatggaat aaaaagttta tggctgccag tgtggcctcc   2040
accaaccggc acgaagctct ggataaagta tatgaggaga ttgaaaaaga cttaattctc    2100
ctgggagcta cagctattga agacaagcta caggatggaa ttccagaaac catttcaaaa   2160
cttgcaaaag ctgacattaa gatctgggtg cttactggag acaaaaagga aactgctgaa   2220
aatataggat ttgcttgtga acttctgact gaagacacca ccatctgcta tggggaggat   2280
attaattctc ttcttcatgc aaggatgaaa aaccagagga atagaggtgg cgtctacgca   2340
aagtttgcac ctcctgtgca ggaatctttt tttccacccg gtggaaaccg tgccttaatc   2400
atcactggtt cttggttgaa tgaaattctt ctcgagaaaa agaccaagag aaataagatt   2460
ctgaagctga agttcccaag aacagaagaa gaaagacgga tgcggaccca agtaaaaggc   2520
aggctagaag ctaagaaaga gcagcggcag aaaaactttg tggacctgac ctgcgagtgc   2580
agcgcagtca tctgctgccg cgtcaccccc aagcagaagg ccatggtggt ggacctggtg   2640
aagaggtaca agaaagccat cacgctggcc atcggagatg ggccaatga cgtgaacatg    2700
atcaaaactg cccacattgg cgttggaata agtggacaag aaggaatgca agctgtcatg   2760
tcgagtgact attcctttgc tcagttccga tatctgcaga ggctactgct ggtcatggc    2820
cgatggtctt acataaggat gtgcaagttc ctacgatact tcttttacaa aaactttgcc   2880
tttactttgg ttcattttct gtactccttc tcaatggct actctgcgca gactgcatac   2940
gaggattggt tcatcaccct ctacaacgtg ctgtacacca gctgccgt gctcctcatg   3000
gggctgctcg accaggatgt gagtgacaaa ctgagcctcc gattccctgg gttatacata   3060
gtgggacaaa gagacttact attcaactat aagagattcc ttgtaagctt gttgcatggg   3120
gtcctaacat cgatgatcct cttcttcata cctcttggag cttatctgca aaccgtaggg   3180
caggatggaa aggcacctcc gactaccag tctttgccg tcaccattgc ctctgctctt    3240
gtaataacag tcaatttcca gattggcttg gatacttctt attggaattt tgtgaatgct   3300
ttttcaattt ttgaagcat tgcactttat ttttggcatca tgtttgactt tcatagtgct   3360
ggaatacatg ttctctttcc atctgcattt caatttacag gcacagcttc aaacgctctg   3420
agacagccat acatttggtt aactatcatc ctggctgttg ctgtgtgctt actcccgtc    3480
gttgccattc gattcctgtc aatgaccatc tggccatcag aaagtgataa gatccagaag   3540
catcgcaagc ggttgaaggc ggaggagcag tggcagcgac gttcagccgg   3600
ggcgtgtcaa cgcggcgctc ggcctacgcc ttctcgcacc agcggggcta cgcggacctc   3660
atctcctccg ggcgcagcat ccgcaagaag cgctcgccgc ttgatgccat cgtggcggat   3720
ggcaccgcgg agtacaggcg caccggggac agctga                             3756

SEQ ID NO: 3           moltype = AA   length = 1321
FEATURE                Location/Qualifiers
source                 1..1321
                       mol_type = protein
                       organism = Homo sapiens
SEQUENCE: 3
MSDSVILRSI KKFGEENDGF ESDKSYNNDK KSRLQDEKKG DGVRVGFFQL FRFSSSTDIW    60
LMFVGSLCAF LHGIAQPGVL LIFGTMTDVF IDYDVELQEL QIPGKACVNN TIVWTNSSLN   120
QNMTNGTRCG LLNIESEMIK FASYYAGIAV AVLITGYIQI CFWVIAAARQ IQKMRKFYFR   180
RIMRMEIGWF DCNSVGELNT RFSDDINKIN DAIADQMALF IQRMTSTICG FLLGFFRGWK   240
LTLVIISVSP LIGIGAATIG LSVSKFTDYE LKAYAKAGVV ADEVISSMRT VAAFGGEKRE   300
```

```
VERYEKNLVF AQRWGIRKGI VMGFFTGFVW CLIFLCYALA FWYGSTLVLD EGEYTPGTLV  360
QIFLSVIVGA LNLGNASPCL EAFATGRAAA TSIFETIDRK PIIDCMSEDG YKLDRIKGEI  420
EFHNVTFHYP SRPEVKILND LNMVIKPGEM TALVGPSGAG KSTALQLIQR FYDPCEGMVT  480
VDGHDIRSLN IQWLRDQIGI VEQEPVLFST TIAENIRYGR EDATMEDIVQ AAKEANAYNF  540
IMDLPQQFDT LVGEGGGQMS GGQKQRVAIA RALIRNPKIL LLDDMATSALD NESEAMVQEV  600
LSKIQHGHTI ISVAHRLSTV RAADTIIGFE HGTAVERGTH EELLERKGVY FTLVTLQSQG  660
NQALNEEDIK DATEDDMLAR TFSRGSYQDS LRASIRQRSK SQLSYLVHEP PLAVVDHKST  720
YEEDRKDKDI PVQEEVEPAP VRRILKFSAP EWPYMLVGSV GAAVNGTVTP LYAFLFSQIL  780
GTFSIPDKEE QRSQINGVCL LFVAMGCVSL FTQFLQGYAF AKSGELLTKR LRKFGFRAML  840
GQDIAWFDDL RNSPGALTTR LATDASQVQG AAGSQIGMIV NSFTNVTVAM IIAFSFSWKL  900
SLVILCFFPF LALSGATQTR MLTGFASRDK QALEMVGQIT NEALSNIRTV AGIGKERRFI  960
EALETELEKP FKTAIQKANI YGFCFAFAQC IMFIANSASY RYGGYLISNE GLHFSYVFRV 1020
ISAVVLSATA LGRAFSYTPS YAKAKISAAR FFQLLDRQPP ISVYNTAGEK WDNFQGKIDF 1080
VDCKFTYPSR PDSQVLNGLS VSISPGQTLA FVGSSGCGKS TSIQLLERFY DPDQGKVMID 1140
GHDSKKVNVQ FLRSNIGIVS QEPVLFACSI MDNIKYGDNT KEIPMERVIA AAKQAQLHDF 1200
VMSLPEKYET NVGSQGSQLS RGEKQRIAIA RAIVRDPKIL LLDEATSALD TESEKTVQVA 1260
LDKAREGRTC IVIAHRLSTI QNADIIAVMA QGVVIEKGTH EELMAQKGAY YKLVTTGSPI 1320
S                                                                1321

SEQ ID NO: 4          moltype = DNA   length = 3966
FEATURE               Location/Qualifiers
source                1..3966
                      mol_type = genomic DNA
                      organism = Homo sapiens
SEQUENCE: 4
atgtctgact cagtaattct tcgaagtata aagaaatttg gagaggagaa tgatggtttt   60
gagtcagata aatcatataa taatgataag aaatcaaggt tacaagatga aagaaaggt  120
gatggcgtta gagttggctt cttcaattg tttcggtttt cttcatcaac tgacatttgg  180
ctgatgtttt tgggaagttt gtgtgcattt ctccatggaa tagcccagcc aggcgtgcta  240
ctcattttg gcacaatgac agatgttttt attgactacg acgttgagtt acaagaactc  300
cagattccag gaaaagcatg tgtgaataac accattgtat ggactaacag ttccctcaac  360
cagaacatga caaatggaac acgttgtggg ttgctgaaca tcgagagcga atgatcaaa  420
tttgccagtt actatgctgg aattgctgtc gcagtactta tcacaggata tattcaaata  480
tgcttttggg tcattgccgc agctcgtcag atacagaaaa tgagaaaatt ttacttagg   540
agaatgatga gaatggaaat agggtggttt gactgcaatt cagtggggga gctaataca  600
agattctctg atgatattaa taaaatcaat gatgccatag ctgaccaaat ggcccttttc  660
attcagcgca tgacctcgac catctgtggt ttcctgttgg atttttcag gggttggaaa  720
ctgaccttgg ttattatttc tgtcagccct ctcattggga ttggagcagc caccattggt  780
ctgagtgtgt ccaagtttac ggactatgag ctgaaggcct atgccaaagc aggggtggtg  840
gctgatgaag tcatttcatc aatgagaaca gtggctgctt ttggtggtga aaaagagag  900
gttgaaaggt atgagaaaaa tcttgtgttc gcccagcgtt ggggaattag aaaaggaata  960
gtgatgggat tctttactgg attcgtgtgg tgtctcatct ttttgtgtta tgcactggcc 1020
ttctggtacg gctccacact tgtcctggat gaaggaaat ataccaggg aacccttgg   1080
cagattttcc tcagtgtcat agtaggagct ttaaatcttg gcaatgcctc tccttgtttg 1140
gaagcctttg caactggacg tgcagcagcc accagcattt tgagacaat agacaggaaa 1200
cccatcattg actgcatgtc agaagatggt tacaagttgg atcgaatcaa gggtgaaatt 1260
gaattccata atgtgacctt ccattatcct tccagaccag aggtgaagat tctaaatgac 1320
ctcaacatgg tcattaaacc aggggaaatg acagctctgg taggaccag tggagctgga 1380
aaaagtacag cactgcaact cattcagcga ttctatgacc cctgtgaagg aatggtgacc 1440
gtggatggcc atgacattcg ctctcttaac attcagtggc ttagagatca gattgggata 1500
gtggagcaag agccagttct gttctctacc accattgcga aaaatattcg ctatggcaga 1560
gaagatgcaa caatggaaga catagtccaa gctgccaagg aggccaatgc ctacaacttc 1620
atcatggacc tgccacagca atttgacacc cttgttggag aaggaggagg ccagatgagt 1680
ggtggccaga acaaagggt agctatcgcc agagccctca tccgaaatcc caagattctg 1740
ctttggaca tggccacctc agctctggac aatgagagtg aagcaatggt gcaagaagtg 1800
ctgagtaaga ttcagcatgg gcacacaatc atttcagttg ctcatcgctt gtctacggtc 1860
agagctgcag ataccatcat tggttttgaa catggcactg cagtgaaag agggacccat 1920
gaagaattac tggaaggaa aggtgtttac ttcactctag tgactttgca aagccaggga 1980
aatcaagctc ttaatgaaga ggacataaag gatgcaactg aagatgacat gcttgcgagg 2040
accttagca gagggagcta ccaggatagt ttaagggct ccatccggca acgtctcaag 2100
tctcagcttt cttacctggt gcacgaacct ccattagctg ttgtagatca taagtctacc 2160
tatgaagaag atagaagga caaggacatt ctgtgcagg aagaagttga acctgcccca 2220
gttaggagga ttctgaaatt cagtgctcca gaatggccct acatgctggt agggtctgtg 2280
ggtgcagctg tgaacgggac agtcacaccc ttgtatgcct ttttattcag ccagattctt 2340
gggacttttt caattcctga taagaggaa caaggtcac agatcaatgg tgtgtgccta 2400
ctttttgtag caatgggctg tgtatctctt ttcacccaat ttctacaggg atatgccttt 2460
gctaaatctg gggagctcct aacaaaagg ctacgtaaat ttggtttcag gcaatgctg  2520
gggcaagata ttgcctggtt tgatgacctc agaaatagcc ctggagcatt gacaacaaga  2580
cttgctacag atgcttccca agttcaaggg gctgccggct ctcagatcgg gatgatagtc  2640
aattccttca ctaacgtcac tgtggccatg atcattgcct tctcctttag ctggaagctg  2700
agcctggtca tcttgtgctt cttccccttc ttggctttat caggagccac acagaccagg  2760
atgttgacag gatttgcctc tcgagataag caggccctgg agatggtggg acagattaca  2820
aatgaagccc tcagtaacat ccgcactgtt gctggaattg aaaggagag gcggttcatt  2880
gaagcactta gactgagctg ggaagagccc ttcaagacag cattcagaa agccaatatt  2940
tacggattct gctttgcctt tgcccagtgc atcatgttta ttgcgaattc tgcttcctac  3000
agatatggag gttactaat ctccaatgag gggctccatt tcagctatgt gttcagggtg  3060
atctctgcaa ttgtactgag tgcaacagct cttggaagag cctctctta cacccccaagt  3120
tatgcaaaag ctaaaatatc agctgcacgc tttttttcaac tgctgaccg acaacccca  3180
atcagtgtat acaatactgc aggtgaaaaa tgggacaact tccaggggaa gattgatttt  3240
```

-continued

```
gttgattgta aatttacata tccttctcga cctgactcgc aagttctgaa tggtctctca 3300
gtgtcgatta gtccagggca gacactggcg tttgttggga gcagtggatg tggcaaaagc 3360
actagcattc agctgttgga acgtttctat gatcctgatc aagggaaggt gatgatagat 3420
ggtcatgaca gcaaaaaagt aaatgtccag ttcctccgct caaacattgg aattgtttcc 3480
caggaaccag tgttgtttgc ctgtagcata atggacaata tcaagtatgg agacaacacc 3540
aaagaaattc ccatggaaag agtcatagca gctgcaaaac aggctcagct gcatgattt 3600
gtcatgtcac tcccagagaa atatgaaact aacgttgggt cccaggggtc tcaactctct 3660
agaggggaga aacaacgcat tgctattgct cgggccattg tacgagatcc taaaatcttg 3720
ctactagatg aagccacttc tgccttagac acagaaagtg aaaagacggt gcaggttgct 3780
ctagacaaag ccagagaggg tcggacctgc attgtcattg cccatcgctt gtccaccatc 3840
cagaacgcgg atatcattgc tgtcatggca caggggtgg tgattgaaaa ggggacccat 3900
gaagaactga tggcccaaaa aggagcctac tacaaactag tcaccactgg atcccccatc 3960
agttga                                                            3966
```